US012681541B2

(12) United States Patent
Cho et al.

(10) Patent No.: US 12,681,541 B2
(45) Date of Patent: Jul. 14, 2026

(54) SLIDABLE HOUSING INCLUDING WATERPROOF STRUCTURE AND ELECTRONIC DEVICE INCLUDING THE SAME

(71) Applicant: SAMSUNG ELECTRONICS CO., LTD., Suwon-si (KR)

(72) Inventors: Sunggun Cho, Suwon-si (KR);
Hwamok Pak, Suwon-si (KR);
Jinwook Baik, Suwon-si (KR);
Byounguk Yoon, Suwon-si (KR);
Joongyeon Cho, Suwon-si (KR);
Junyoung Choi, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 109 days.

(21) Appl. No.: 18/899,110

(22) Filed: Sep. 27, 2024

(65) Prior Publication Data

US 2025/0024615 A1     Jan. 16, 2025

Related U.S. Application Data

(63) Continuation of application No. PCT/KR2023/003400, filed on Mar. 14, 2023.

(30) Foreign Application Priority Data

Mar. 31, 2022 (KR) ........................ 10-2022-0040832
May 30, 2022 (KR) ........................ 10-2022-0066346

(51) Int. Cl.
*G06F 1/16* (2006.01)
*H04M 1/02* (2006.01)

(52) U.S. Cl.
CPC .......... *G06F 1/1656* (2013.01); *G06F 1/1624* (2013.01); *G06F 1/1652* (2013.01); *H04M 1/0237* (2013.01); *H04M 1/0268* (2013.01)

(58) Field of Classification Search
CPC .... G06F 1/1624; G06F 1/1652; G06F 1/1656; H04M 1/0235–0239; H04M 1/0268; H04M 1/0269
See application file for complete search history.

(56) References Cited

U.S. PATENT DOCUMENTS 9,872,408 B2     1/2018   Choi et al.
12,072,742 B2 *  8/2024   Kim ...................... G06F 1/1618
(Continued)

FOREIGN PATENT DOCUMENTS

CN      113194179 A     7/2021
EP       3826277 A1     5/2021
(Continued)

OTHER PUBLICATIONS

European Search Report for European Patent Application No. 237812078.8 dated May 12, 2025.

*Primary Examiner* — Patrick F Marinelli
(74) *Attorney, Agent, or Firm* — CANTOR COLBURN LLP

(57) ABSTRACT

An electronic device including a first housing including a first frame and a first cover which faces and is coupled to the first frame, a second housing including a second frame slidable relative to the first frame and a second cover which faces and is coupled to the second frame, a flexible display module including a first area on the first frame and slidable together with the first housing relative to the second housing, and a second area slidable along the second frame and slidable together with the first area, a first waterproof member which is between the first frame and the first cover, and a second waterproof member between the second frame and the second cover.

20 Claims, 29 Drawing Sheets

(56)            References Cited

U.S. PATENT DOCUMENTS

| | | | | |
|---|---|---|---|---|
| 12,108,552 B2 * | 10/2024 | Cho | .................. | H04M 1/0237 |
| 12,133,348 B2 * | 10/2024 | Cho | .................. | G06F 1/1626 |
| 12,261,972 B2 * | 3/2025 | Lee | .................. | G06F 1/1652 |
| 12,368,465 B2 * | 7/2025 | Cho | .................. | G06F 1/1652 |
| 12,395,582 B2 * | 8/2025 | An | .................. | H04M 1/18 |
| 2011/0110022 A1 * | 5/2011 | Kumagai | .................. | H04M 1/18 |
| | | | | 361/679.01 |
| 2015/0195927 A1 | 7/2015 | Lee et al. | | |
| 2017/0148826 A1 | 5/2017 | Choi | | |
| 2017/0318690 A1 * | 11/2017 | Jung | .................. | H05K 5/03 |
| 2019/0254129 A1 * | 8/2019 | Cho | .................. | H10K 59/8722 |
| 2020/0162596 A1 | 5/2020 | Kim et al. | | |
| 2020/0264660 A1 | 8/2020 | Song et al. | | |
| 2021/0159585 A1 * | 5/2021 | Choi | .................. | H01Q 1/243 |
| 2022/0037600 A1 | 2/2022 | Song et al. | | |
| 2022/0137667 A1 * | 5/2022 | Kim | .................. | G06F 1/1616 |
| | | | | 361/679.21 |
| 2022/0150613 A1 * | 5/2022 | Cho | .................. | G01P 1/00 |
| 2022/0150619 A1 * | 5/2022 | Park | .................. | H04R 1/2819 |
| 2022/0386491 A1 * | 12/2022 | Cho | .................. | H05K 5/0017 |
| 2023/0051260 A1 * | 2/2023 | An | .................. | H04M 1/18 |
| 2023/0291820 A1 * | 9/2023 | Lee | .................. | G09F 9/30 |
| 2024/0267073 A1 * | 8/2024 | Cho | .................. | H05K 5/06 |
| 2025/0024615 A1 * | 1/2025 | Cho | .................. | G06F 1/1656 |
| 2025/0185193 A1 * | 6/2025 | Cho | .................. | G06F 1/263 |
| 2025/0216907 A1 * | 7/2025 | Cho | .................. | H04M 1/18 |

FOREIGN PATENT DOCUMENTS

| | | |
|---|---|---|
| EP | 4024827 B1 | 12/2023 |
| JP | 2010154445 A | 7/2010 |
| JP | 5386981 B2 | 1/2014 |
| JP | 5598961 B2 | 10/2014 |
| KR | 20110032325 A | 3/2011 |
| KR | 20160012821 A | 2/2016 |
| KR | 20210029507 A | 3/2021 |

* cited by examiner

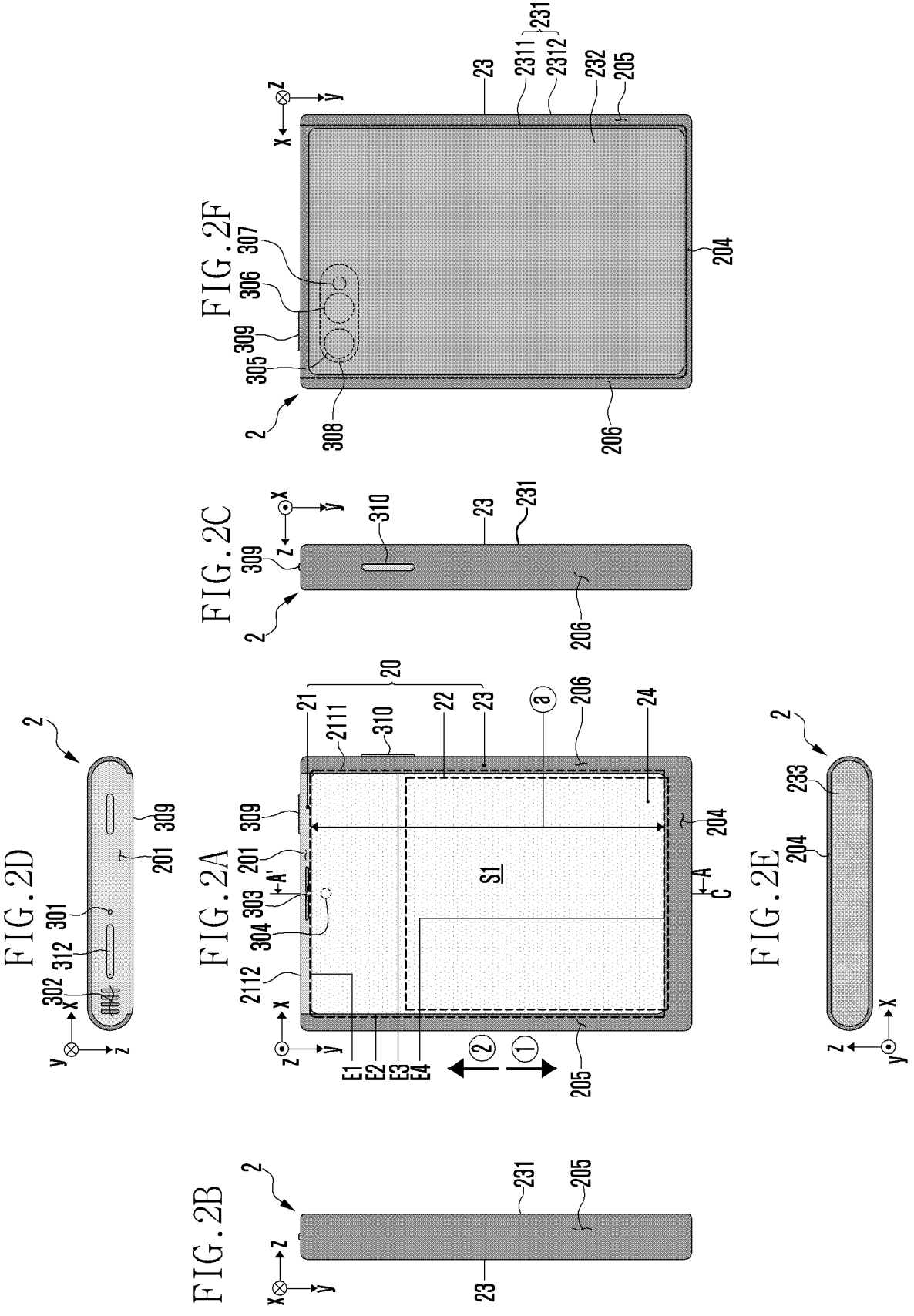

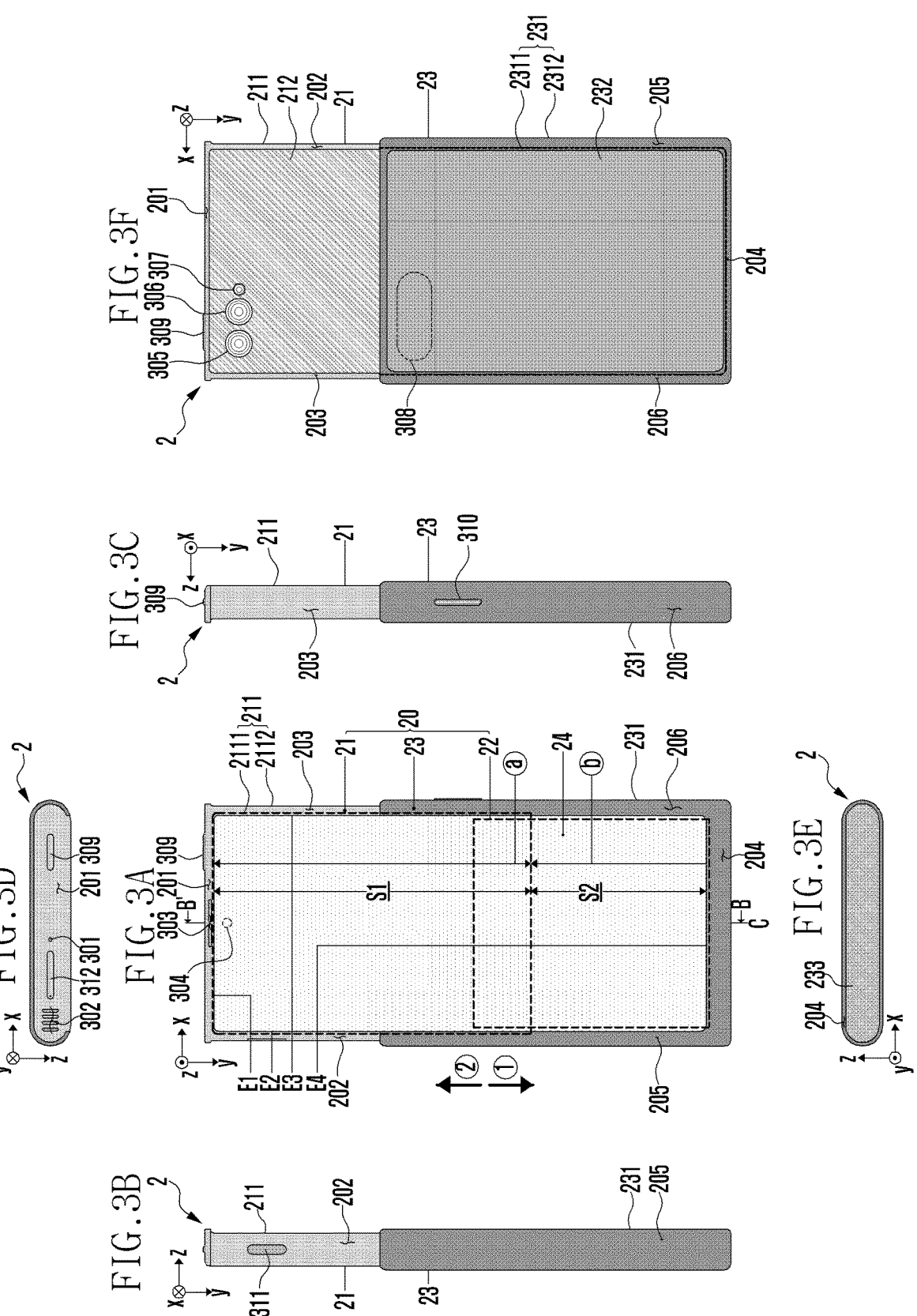

SLIDABLE HOUSING INCLUDING WATERPROOF STRUCTURE AND ELECTRONIC DEVICE INCLUDING THE SAME

CROSS-REFERENCE TO RELATED APPLICATIONS

This application is a continuation application of International Application No. PCT/KR2023/003400 designating the United States, filed on Mar. 14, 2023, in the Korean Intellectual Property Receiving Office and claiming priority to Korean Patent Application No. 10-2022-0040832, filed on Mar. 31, 2022, and Korean Patent Application No. 10-2022-0066346, filed on May 30, 2022, in the Korean Intellectual Property Office, the disclosures of which are incorporated by reference herein in their entireties.

BACKGROUND

(1) Field

The disclosure relates to a slidable electronic device including a waterproof structure.

(2) Description of the Related Art

With the development of digital technologies, electronic devices are being provided in various forms, such as a smartphone, a tablet personal computer (PC), and a personal digital assistant (PDA). Electronic devices are being designed to provide larger screens while being portable.

The above-mentioned information may be provided as related art for the purpose of aiding understanding of the disclosure. No claim or determination is made as to whether any of the foregoing may be applied as prior art with respect to the disclosure.

SUMMARY

An electronic device can provide screen expansion by moving a flexible display in a sliding manner. Since the inner space of the electronic device changes during sliding, it is difficult to design a waterproof structure.

Embodiments of the disclosure may provide a slidable electronic device including a waterproof structure.

The technical problems to be addressed by the disclosure are not limited to those described above, and other technical problems, which are not described above, will be understood by a person ordinarily skilled in the related art to which this disclosure belongs.

According to an embodiment of the disclosure, a slidable electronic device may include a flexible display module, a first housing including a first frame on which a first area of the flexible display module is disposed, and a first cover coupled to the first frame, a second housing including a second frame configured to be capable of sliding relative to the first frame and to support a second area of the flexible display module, and a second cover coupled to the second frame, a sliding driver connected to the first frame and the second frame and including a motor configured to provide a driving force for the sliding, a first waterproof member disposed between the first frame and the first cover, and a second waterproof member disposed between the second frame and the second cover.

A slidable electronic device including a waterproof structure according to various embodiments of the disclosure can be improved in terms of waterproof performance and reliability.

In addition, effects which may be obtained or predicted by various embodiments of the disclosure may be directly or implicitly disclosed in the detailed description of the embodiments of the disclosure.

BRIEF DESCRIPTION OF THE DRAWINGS

The above and other aspects, features, and advantages of embodiments of the disclosure will become more apparent from the following detailed description taken in conjunction with the accompanying drawings.

FIGS. 2A to 2F are views of a slidable electronic device in a closed state according to an embodiment of the disclosure.

FIGS. 3A to 3F are views illustrating the slidable electronic device in an open state according to an embodiment of the disclosure.

FIG. 11 is a cross-sectional view of the slidable electronic device according to an embodiment of the disclosure taken along line A-A' in FIG. 2A.

FIG. 12 is a cross-sectional view of the slidable electronic device according to an embodiment of the disclosure taken along line B-B' in FIG. 3A.

FIG. 13 is an enlarged cross-sectional view illustrating the portion indicated by reference numeral "1300" in FIG. 11, according to an embodiment of the disclosure.

FIG. 16 is a cross-sectional view illustrating a slidable electronic device in an open state according to various embodiments of the disclosure.

FIG. 17 is an enlarged cross-sectional view illustrating the portion indicated by reference numeral "1700" in FIG. 15, according to various embodiments of the disclosure.

DETAILED DESCRIPTION

Hereinafter, various example embodiments of the disclosure disclosed herein will be described in greater detail with reference to the accompanying drawings.

Figure 1:
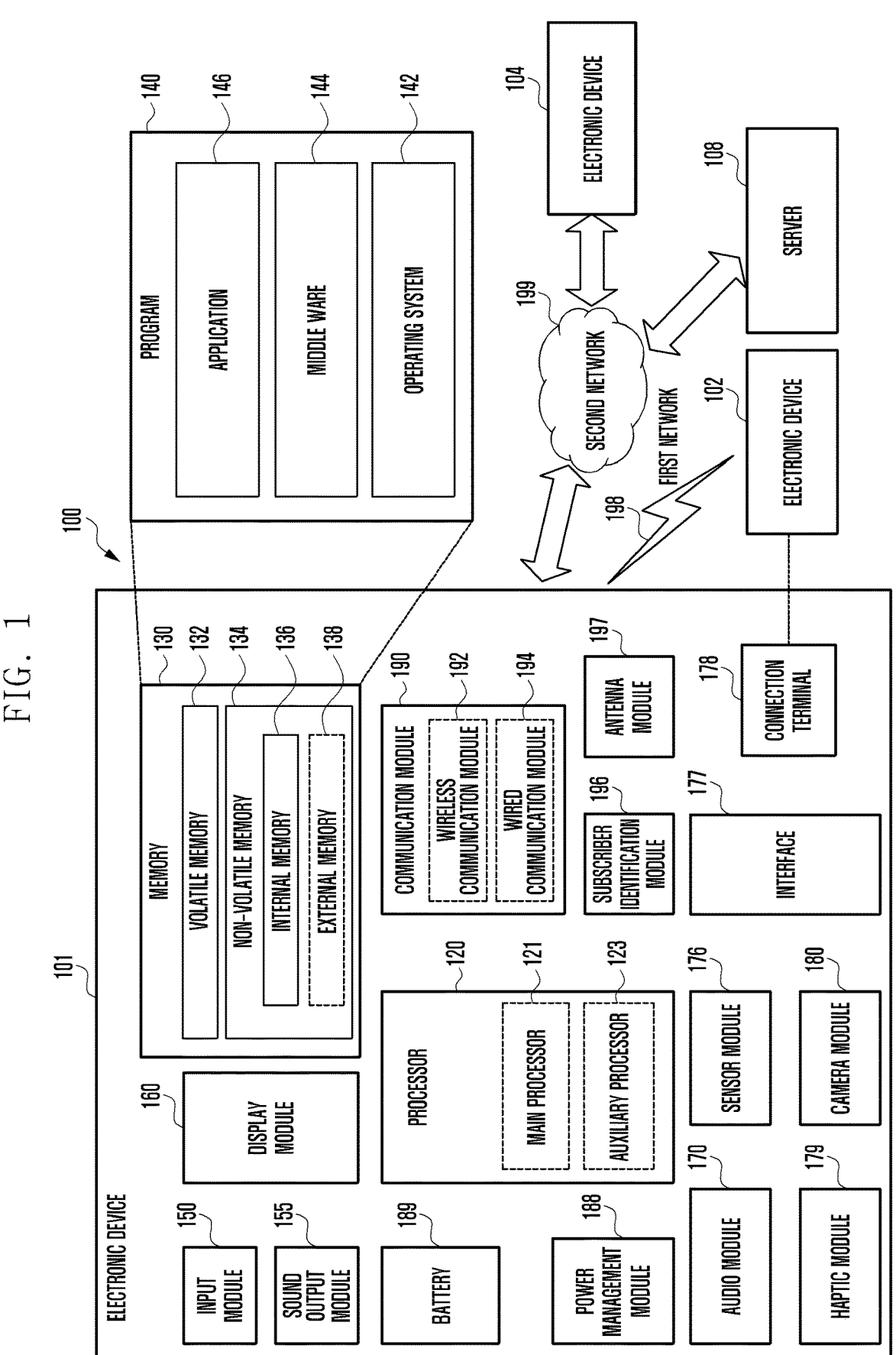
FIG. 1 is a block diagram of an electronic device according to an embodiment of the disclosure in a network environment.

FIG. 1 is a block diagram of an electronic device 101 in a network environment 100 according to an embodiment of the disclosure.

Referring to FIG. 1, the electronic device 101 in the network environment 100 may communicate with an external electronic device 102 via a first network 198 (e.g., a short-range wireless communication network), or at least one of an external electronic device 104 or a server 108 via a second network 199 (e.g., a long-range wireless communication network). The electronic device 101 may communicate with the external electronic device 104 via the server 108. The electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, and/or an antenna module 197. In some embodiments of the disclosure, at least one (e.g., the connection terminal 178) of the components may be omitted from the electronic device 101, or one or more other components may be added in the electronic device 101. In some embodiments of the disclosure, some of the components may be implemented as single integrated circuitry. For example, the sensor module 176, the camera module 180, or the antenna module 197 may be implemented as embedded in single component (e.g., the display module 160).

The processor 120 may execute, for example, software (e.g., a program 140) to control at least one other component (e.g., a hardware or software component) of the electronic device 101 coupled with the processor 120, and may perform various data processing or computation. As at least part of the data processing or computation, the processor 120 may load a command or data received from another component (e.g., the sensor module 176 or the communication module 190) in a volatile memory 132, process the command or the data stored in the volatile memory 132, and store resulting data in a non-volatile memory 134. The processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display module 160, the sensor module 176, or the communication module 190) among the components of the electronic device 101, instead of the main processor 121 while the main processor 121 is in an inactive (e.g., a sleep) state, or together with the main processor 121 while the main processor 121 is in an active state (e.g., executing an application). The auxiliary processor 123 (e.g., an ISP or a CP) may be implemented as part of another component (e.g., the camera module 180 or the communication module 190) functionally related to the auxiliary processor 123. According to an embodiment of the disclosure, the auxiliary processor 123 (e.g., a neural network processing device) may include a hardware structure specified for processing an artificial intelligence model. The artificial intelligence model may be created through machine learning. Such learning may be performed, for example, in the electronic device 101 itself on which the artificial intelligence model is performed, or may be performed through a separate server (e.g., the server 108). The learning algorithms may include, for example, supervised learning, unsupervised learning, semi-supervised learning, or reinforcement learning, but is not limited thereto. The artificial intelligence model may include a plurality of artificial neural network layers. The artificial neural network may be any of a deep neural network (DNN), a convolutional neural network (CNN), a recurrent neural network (RNN), a restricted Boltzmann machine (RBM), a deep belief network (DBN), a bidirectional recurrent DNN (BRDNN), a deep Q-network, or a combination of two or more of the above-mentioned networks, but is not limited the above-mentioned examples. In addition to the hardware structure, the artificial intelligence model may additionally or alternatively include a software structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 and/or the non-volatile memory 134.

The program 140 may be stored in the memory 130 as software, and may include, for example, an operating system (OS) 142, middleware 144, and/or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record, and the receiver may be used for incoming calls. The receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. The display module 160 may include touch circuitry (e.g., a touch sensor) adapted to detect a touch, or sensor circuitry (e.g., a pressure sensor) adapted to measure the intensity of force incurred by the touch.

The audio module 170 may convert a sound into an electrical signal and vice versa. The audio module 170 may obtain the sound via the input module 150, or output the sound via the sound output module 155 or a headphone of an external electronic device (e.g., the external electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. The sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the external electronic device 102) directly (e.g., wiredly) or wirelessly. The interface 177 may include, for example, a high-definition multimedia interface (HDMI), a universal serial bus (USB) interface, a secure digital (SD) card interface, and/or an audio interface.

The connecting terminal 178 may include a connector via which the electronic device 101 may be physically connected with the external electronic device (e.g., the external electronic device 102). The connecting terminal 178 may include, for example, an HDMI connector, a USB connector, an SD card connector, and/or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. The haptic module 179 may include, for example, a motor, a piezoelectric element, or an electric stimulator.

The camera module 180 may capture a still image or moving images. The camera module 180 may include one or more lenses, image sensors, ISPs, or flashes.

The power management module 188 may manage power supplied to or consumed by the electronic device 101. The power management module 188 may be implemented as at least part of, for example, a power management integrated circuit (PMIC).

The battery 189 may supply power to at least one component of the electronic device 101. The battery 189 may include, for example, a primary cell which is not rechargeable, a secondary cell which is rechargeable, and/or a fuel cell.

The communication module 190 may support establishing a direct (e.g., wired) communication channel or a wireless communication channel between the electronic device 101 and the external electronic device (e.g., the external electronic device 102, the external electronic device 104, or the server 108) and performing communication via the established communication channel. The communication module 190 may include one or more CPs that are operable independently from the processor 120 (e.g., the AP) and supports a direct (e.g., wired) communication or a wireless communication. The communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as BLUETOOTH, wireless-fidelity (Wi-Fi) direct, or IR data association (IrDA)) or the second network 199 (e.g., a long-range communication network, such as a legacy cellular network, a 5th generation (5G) network, a next generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network, after a 4th generation (4G) network, and next-generation communication technology, e.g., new radio (NR) access technology. The NR access technology may support high-speed transmission of high-capacity data (i.e., enhanced mobile broadband (eMBB)), minimization of terminal power and connection of multiple terminals (massive machine type communications (mMTC)), or high reliability and low latency (ultra-reliable and low-latency communications (URLLC)). The wireless communication module 192 may support a high-frequency band (e.g., a mm Wave band) to achieve, for example, a high data transmission rate. The wireless communication module 192 may support various technologies for securing performance in a high-frequency band, such as beamforming, massive multiple-input and multiple-output (MIMO), full-dimensional MIMO (FD-MIMO), array antenna, analog beam-forming, or large-scale antenna. The wireless communication module 192 may support various requirements specified in the electronic device 101, an external electronic device (e.g., external the electronic device 104), or a network system (e.g., the second network 199). According to an embodiment of the disclosure, the wireless communication module 192 may support a peak data rate for implementing eMBB (e.g., 20 Gbps or more), loss coverage for implementing mMTC (e.g., 164 dB or less), or U-plane latency for realizing URLLC (e.g., 0.5 ms or less for each of downlink (DL) and uplink (UL) or 1 ms or less for round trip).

The antenna module 197 may transmit or receive a signal or power to or from the outside (e.g., the external electronic device) of the electronic device 101. The antenna module 197 may include an antenna including a radiating element including a conductive material or a conductive pattern formed in or on a substrate (e.g., a printed circuit board (PCB)). The antenna module 197 may include a plurality of antennas (e.g., an antenna array). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. Another component (e.g., a radio frequency integrated circuit (RFIC)) other than the radiating element may be additionally formed as part of the antenna module 197.

According to various embodiments of the disclosure, the antenna module 197 may form a mmWave antenna module. According to an embodiment of the disclosure, the mm Wave antenna module may include a PCB, an RFIC that is disposed on or adjacent to a first surface (e.g., the bottom surface) of the PCB and is capable of supporting a predetermined high-frequency band (e.g., a mmWave band), and a plurality of antennas (e.g., array antennas) that is disposed on or adjacent to a second surface (e.g., the top surface or the side surface) of the PCB and is capable of transmitting or receiving a signal of the predetermined high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

Commands or data may be transmitted or received between the electronic device 101 and the external electronic device 104 via the server 108 coupled with the second network 199. Each of the external electronic devices 102 or 104 may be a device of a same type as, or a different type, from the electronic device 101. All or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide an ultra-low delay service using, for example, distributed computing or MEC. In another embodiment of the disclosure, the external electronic device 104 may include an internet of things (IoT) device. The server 108 may be an intelligent server using machine learning and/or neural networks. According to an embodiment of the disclosure, the external electronic device 104 or the server 108 may be included in the second network 199. The electronic device 101 may be applied to an intelligent service (e.g., smart home, smart city, smart car, or healthcare) based on 5G communication technology or IoT-related technology.

An electronic device according to an embodiment of the disclosure may be one of various types of electronic devices. The electronic devices may include a portable communication device (e.g., a smartphone), a computer device, a portable multimedia device, a portable medical device, a camera, a wearable device, or a home appliance. However, the electronic device is not limited to any of those described above.

Various embodiments of the disclosure and the terms used herein are not intended to limit the technological features set forth herein to particular embodiments and include various changes, equivalents, or replacements for a corresponding embodiment. With regard to the description of the drawings, similar reference numerals may be used to refer to similar or related elements.

It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases.

As used herein, such terms as "1st" and "2nd," or "first" and "second" may be used to simply distinguish a corresponding component from another, and does not limit the components in other aspect (e.g., importance or order). If an element (e.g., a first element) is referred to, with or without the term "operatively" or "communicatively," as "coupled with," "coupled to," "connected with," or "connected to" another element (e.g., a second element), the element may be coupled with the other element directly (e.g., wiredly), wirelessly, or via a third element.

The term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment of the disclosure, the module may be implemented in a form of an application-specific integrated circuit (ASIC).

Various embodiments as set forth herein may be implemented as software (e.g., the program 140) including one or more instructions that are stored in a storage medium (e.g., an internal memory 136 or an external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

A method according to an embodiment of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PLAY-STORE™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

Each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In such a case, the integrated component may perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

It will be understood that when an element is referred to as being related to another element such as being "on," "coupled to" or "connected to" another element, it can be directly on the other element or intervening elements may be present therebetween. In contrast, when an element is referred to as being related to another element such as being "directly on," "directly coupled to" or "directly connected to" another element there are no intervening elements present.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. Thus, reference to "an" element in a claim followed by reference to "the" element is inclusive of one element and a plurality of the elements. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

FIGS. 2A to 2F are views of a slidable electronic device 2 according to an embodiment of the disclosure in a closed state. FIGS. 3A to 3F are views of the slidable electronic device 2 according to an embodiment of the disclosure in an open state. In various embodiments of the disclosure, for convenience of description, the direction in which a screen (e.g., an externally visible display area or active area of the flexible display module 24) is visible (e.g., the +z-axis direction) is referred to as the front of the slidable electronic device, and the opposite direction (e.g., the −z-axis direction) is referred to as the rear of the slidable electronic device 2.

Referring to FIGS. 2A to 2F and 3A to 3F, the slidable electronic device 2 may include a slidable housing 20 and a flexible display module 24. The slidable housing 20 may include, for example, a first housing (or a first housing part or a first housing structure) 21, a second housing (or a second housing part or a second housing structure) 22, and/or a third housing (or a third housing part or third housing structure) 23. The second housing 22 may be connected to the first housing 21 to be slidable relative to the first housing 21. The sliding of the second housing 22 relative to the first housing 21 refers to a change in the relative position between the first housing 21 and the second housing 22, and may be interpreted as sliding of the first housing 21 relative to the second housing 22 or as mutual sliding between the first housing 21 and the second housing 22. The first housing 21 and the third housing 23 may be external housings which substantially provide the exterior of the slidable electronic device 2, and the second housing 22 may be a hidden internal housing positioned inside the slidable electronic device 2 corresponding to the third housing 23. The third housing 23 may be coupled to the second housing 22 and may move together with the second housing 22 when the second housing 22 slides relative to the first housing 21. The slidable housing 20 is implemented to enable mutual sliding between the housing structure including the second housing 22 and the third housing 23 and the first housing 21, in which a sliding structure for mutually stable sliding (e.g., a sliding structure including a guide rail) may be provided for the first housing 21 and the second housing 22, or may be provided for the first housing 21 and the third housing 23. The flexible display module 24 may include a first area ⓐ positioned corresponding to the first housing 21, and a second area ⓑ extending from the first area ⓐ and positioned corresponding to the second housing 22. The first area ⓐ may be disposed in the first housing 21 and may be supported by the first housing 21. The area ⓐ may be exposed to the outside, and the slidable electronic device 2 may provide a first screen area S1 via the first area ⓐ. The second area ⓑ may be supported by the second housing 22 which is slidable relative to the first housing 21. When the second housing 22 slides in the first direction ①️ (e.g., the +y axis direction) relative to the first housing 21, at least a portion of the second area ⓑ may be pulled out from the space between the second housing 22 and the third housing 23 to the outside (a position on the slidable electronic device 2 visible from the outside) to be visible externally. When the second housing 22 slides with relative to the first housing 21 in the second direction ②️ (e.g., the −y-axis direction), which is opposite to the first direction ①️, at least a portion of the second area ⓑ may be retracted into the space between the second housing 22 and the third housing 23 to be hidden. The slidable electronic device 2 may provide a screen area in which a second screen area (or second display area) S2 is added to a first screen area (or first display area) S1 using at least a portion of the second area ⓑ pulled out to the outside. The ratio of the portion of the second area ⓑ which is pulled out to the outside and the size of the screen corresponding thereto may vary depending on the position or distance where the second housing 22 is slid relative to the first housing 21. FIGS. 2A to 2F illustrates the slidable electronic device 2 in the state in which the screen is not expanded, and FIGS. 3A to 3F illustrates the slidable electronic device 2 in the state in which the screen is expanded. The state in which the screen is not expanded is the state in which the second housing 22 is not moved in the first direction ①️ relative to the first housing 21, and may be referred to as the "closed state" of the slidable electronic device 2. The state in which the screen is expanded is the state in which the second housing 22 is moved to its maximum in the first direction ①️ where it is no longer movable, and may be referred to as the "open state" of the slidable electronic device 2. In various embodiments, the open state may include a fully open state (see FIGS. 3A to 3F) or an intermediate state. The intermediate state may refer to a state between the closed state (see FIGS. 2A to 2F) and the fully open state. When the second housing 22 is moved at least partially in the first direction ①️ relative to the first housing 21, this may be referred to as the "slide-out" of the second housing 22 or the flexible display module 24. When the second housing 22 is moved at least partially in the second direction ②️, which is opposite to the first direction ①️, relative to the first housing 21, this may be referred to as the "slide-in" of the second housing 22 or the flexible display module 24. The second area ⓑ may be disposed to have a bending portion such that, during the sliding of the second housing 22 relative to the first housing 21, the second area ⓑ may change direction and move when pulled out to the outside from the space between the second housing 22 and the third housing 23 or when introduced from the outside into the space between the second housing 22 and the third housing 23. The second area ⓑ may be referred to by other terms such as "bendable area" or "bendable section". In the slidable electronic device 2 which provides an expandable screen in response to mutual sliding between the first housing 21 and the second housing 22, the flexible display module 24 (or flexible display) may be referred to by other terms such as "expandable display", "slidable display", or "slide-out display". The slidable electronic device 2, which provides the expandable screen in response to mutual sliding between the first housing 21 and the second housing 22, may be referred to by other terms such as "stretchable electronic device" or "rollable electronic device".

According to an embodiment, in the open state of the slidable electronic device 2 (see FIGS. 3A to 3F), a screen including the first screen area S1 provided by the first area ⓐ of the flexible display module 24 and the second area S2 provided by the second area ⓑ of the flexible display module 24 may be provided in a substantially planar form. The direction in which the front surface of the slidable electronic device 2 is oriented may be the direction in which the planar screen is oriented. The first area ⓐ of the flexible display module 24 may be disposed on the first housing 21 substantially flat, and the first area ⓐ may provide the planar first screen area S1 corresponding thereto. The second area ⓑ of the flexible display module 24 may be disposed to have a bending portion. The bending portion may be a portion of the second area ⓑ which is disposed and maintained in a bent form such that, during the sliding of the second housing 22 relative to the first housing 21, the second area ⓑ changes direction to move in a direction different from that of the first area ⓐ. The portion of the second area ⓑ which provides the bending portion may vary depending on the position or distance where the second housing 22 is slid relative to the first housing 21, but the shape of the bending portion may be provided substantially the same. The size of the portion between the bending portion of the second area ⓑ and the first area ⓐ may increase when the second housing 22 slides out, and may decrease when the second housing 22 slides in. In the open state of the slidable electronic device 2, the second screen area S2 may be provided via the portion between the bending portion of the second area ⓑ and the first area ⓐ. The portion between the bending portion of the second area ⓑ and the first area ⓐ may be disposed substantially flat and smoothly connected to the first area ⓐ without lifting. In an embodiment, the slidable electronic device 2 may include a tension device which allows the portion between the bending portion of the second area ⓑ and the first area ⓐ to be disposed substantially flat while reducing the phenomenon in which the portion lifts due to the elasticity of the flexible display module 24.

According to an embodiment, the screen of the slidable electronic device 2 may be provided in a rectangular shape which may include, for example, a first edge E1, a second edge E2, a third edge E3, and a boundary E4 with the bending portion of the second area ⓑ. When viewed from above the screen, the first edge E1 may be positioned to be spaced apart from the boundary E4 with the bending portion in the second direction ②️ (e.g., the slide-in direction) and may be substantially parallel to the boundary E4 with the bending portion. The second edge E2 may extend from one end of the first edge E1 to the boundary E4 with the bending portion and may be substantially perpendicular to the first edge E1. The third edge E3 may extend from the other end of the first edge E1 to the boundary E4 with the bending portion and may be substantially parallel to the first edge E2. When the second housing 22 slides out, due to the expansion of the screen, the distance of the boundary E4 with the bending portion from the first edge E1 in the first direction ①️ may increase, and the second edge E2 and the third edge E3 may become longer.

According to an embodiment, the first housing 21 may include a first frame (or first frame structure, first framework, or first case) 211, and/or a first cover 212 disposed on the first frame 211. The first frame 211 may include a first support portion 2111 and a first side wall portion (or a first bezel, a first side wall bezel, or a first side wall bezel structure) 2112 connected to the first support portion 2111. In an embodiment, the first area ⓐ of the flexible display module 24 may be disposed on the first support portion 2111, and the first support portion 2111 may support the first area ⓐ. The first side wall portion 2112 may include a first side wall 201, a second side wall 202, and/or a third side wall 203. The first side wall 201 may be positioned corresponding to the first edge E1 of the screen. The second side wall 202 may be positioned corresponding to the second edge E2 of the screen. The third side wall 203 may be positioned corresponding to the third edge E3 of the screen. When viewed from above on the front surface of the slidable electronic device 2, the second side wall 202 may extend in the first direction ① from one end of the first side wall 201 (e.g., the slide-out direction), and the third side wall 203 may extend from the other end of the first side wall 201 in the first direction ①. When viewed from above the front surface of the slidable electronic device 2, the second side wall 202 and the third side wall 203 may be substantially parallel to each other and may be substantially perpendicular to the first side wall 201. The first frame 211 may be provided as an integrated member or structure including the first support portion 2111 and a first side wall portion 2112. As another example, the first support portion 2111 may be provided separately from the first side wall portion 2112 and may be connected to the first side wall portion 2112 using mechanical fastening such as screw fastening (or bolt fastening), or bonding which includes an adhesive material (or bonding material). In some embodiments, the first support portion 2111 may be defined or interpreted as a separate element from the first frame 211 or the first housing 21. The first cover 212 may be positioned on the rear surface side of the slidable electronic device 2, and may be referred to by a term such as "first back cover" or "first rear surface plate". Various electronic components such as a printed circuit board may be disposed on the first support portion 2111, for example, between the first support portion 2111 (or the first area ⓐ of the flexible display module 24) and the first cover 212. In an embodiment, the first cover 212 may be disposed on the first side wall portion 2112. The first side wall portion 2112 may include, for example, a first cover placement area provided corresponding to a border area of the first cover 212. The first cover placement area may be, for example, a stepped portion provided on the first side wall portion 2112 such that the first cover 212 can be fitted and seated on the first side wall portion 2112. As another example, the first cover placement area may be provided as a substantially planar area (or planar portion). The first cover 212 may be placed in the first cover placement area using screw fastening. As another example, the first cover 212 may be placed in the first cover placement area using snap-fit fastening (e.g., a manner in which a hook is fastened to a hook fastener). As another example, in order to place the first cover 212 on the first side wall portion 2112, an adhesive material (or bonding material) may be disposed between the first cover placement area and the border area of the first cover 212. In some embodiments, the first cover placement area may be expanded to at least partially overlap the first cover 212 when viewed from above the rear surface of the slidable electronic device 2. In some embodiments, the first cover arrangement area corresponding to the border area of the first cover 212 may be provided by the first support portion 2111. A portion of the outer surface of the slidable electronic device 2 provided by the first side wall portion 2112 may be smoothly connected to a portion of the outer surface of the slidable electronic device 2 provided by the first cover 212. In some embodiments, the first cover 212 may be omitted, and the first frame 211 may be provided in a form which further includes a portion corresponding to the first cover 212. In some embodiments, the first cover 212 may be defined or interpreted as a separate element from the first housing 21.

According to an embodiment, the third housing 23 may provide the exterior of the slidable electronic device 2 together with the first housing 21 in a movable assembly provided by a combination of the first housing 21 and the second housing 22 slidably connected to each other, and the flexible display module 24 operatively disposed on the first and second housings. The third housing 23 may include, for example, a third frame (or third frame structure, third framework, or third case) 231, a third cover 232 disposed on the third frame 231, and/or a fourth cover 233 disposed on the third frame 231. The third frame 231 may be provided as an integrated member or structure including a third support portion (or bottom portion or bottom) (e.g., a plate) 2311 and a second side wall portion 2312. As another example, the third support portion 2311 may be provided separately from the second side wall portion 2312, and may be connected to the second side wall portion 2312 using a method such as screw fastening (or bolt fastening). The second side wall portion 2312 may extend from a border of the third support portion 2311. Due to the combination of the third support portion 2311 and the second side wall portion 2312, the third housing 23 may have a space capable of accommodating the first housing 21 and the second housing 22. The second side wall portion 2312 may include, for example, a fourth side wall 204, a fifth side wall 205, and/or a sixth side wall 206. The fourth side wall 204 may be positioned to be spaced apart from the first side wall 201 in the first direction ① (e.g., the slide-out direction), and may be substantially parallel to the first side wall 201. When viewed from above the front surface of the slidable electronic device 2 (e.g., when viewed in the −z-axis direction), the fifth side wall 205 may be positioned corresponding to the second side wall 202, and may extend from one end of the fourth side wall 204 in the second direction ② (e.g., the slide-in direction). The sixth side wall 206 may be positioned corresponding to the third side wall 203, and may extend from the other end of the fourth side wall 204 in the second direction ②. When viewed from above the front surface of the slidable electronic device 2, the fifth side wall 205 and the sixth side wall 206 may be substantially parallel to each other, and may be substantially perpendicular to the fourth side wall 204. The distance of the fourth side wall 204 from the first side wall 201 in the first direction ①, the area where the fifth side wall 205 covers the second side wall 202, and the area where the sixth side wall 206 covers the third side wall 203 may increase when the second housing 22 slides in and decrease when the second housing 22 slides out. In an embodiment, the third cover 232 may be positioned on the rear surface side of the slidable electronic device 2, and may be referred to by a term such as "third back cover" or "third rear surface plate". The third support portion 2311 may include a third surface which substantially faces the front surface of the slidable electronic device 2, and a fourth surface which substantially faces the rear surface of the slidable electronic device 2. The third cover 232 may be disposed on the fourth surface of the third support portion 2311. The fourth surface of the third support portion 2311 may include a seating structure for the third cover 232. The seating structure may include, for example, a recess which allows the third cover 232 to be stably disposed on the third support portion 2311, and the third cover 232 may be inserted into the recess. The third cover 232 may be coupled to the third support portion 2311 using screw fastening. As another example, the third cover 232 may be coupled to the third support portion 2311 using snap fit fastening. As another example, the third cover 232 may be coupled to the third support portion 2311 using an adhesive material (or bonding material). A portion of the outer surface of the slidable electronic device 2 provided by the third support portion 2311 may be smoothly connected to a portion of the outer surface of the slidable electronic device 2 provided by the third cover 232. When the slidable electronic device 2 is viewed from above the rear surface (e.g., when viewed in the +z-axis direction), an area where the first cover 212 and the third cover 232 (or the third support portion 2311) overlap may increase when the second housing 22 slides out and decrease when the second housing 22 slides in. In some embodiments, the third cover 232 may be omitted, and the third support portion 2311 may be provided in a form which further includes a portion corresponding to the third cover 232. In some embodiments, the third cover 232 may be defined or interpreted as a separate element from the third housing 23. In an embodiment, the fourth cover 233 may be disposed on the fourth side wall 204, and may be referred to as a "side cover". A portion of the outer surface of the slidable electronic device 2 provided by the fourth side wall 204 may be smoothly connected to a portion of the outer surface of the slidable electronic device 2 provided by the fourth cover 233. In some embodiments, the fourth cover 233 may be omitted, and the second side wall portion 2312 may be provided in a form which further includes a portion corresponding to the fourth cover 233.

According to various embodiments, the third cover 232 may be disposed on the second side wall portion 2312. The second side wall portion 2312 may include, for example, a third cover placement area provided corresponding to a border area of the third cover 232. The third cover placement area may be, for example, a stepped portion provided on the second side wall portion 2312 such that the third cover 232 can be fitted and seated on the second side wall portion 2312. As another example, the third cover placement area may be provided as a substantially planar area (or planar portion). The third cover 232 may be placed in the third cover placement area using screw fastening. As another example, the third cover 232 may be placed in the third cover placement area using snap fit fastening. As another example, in order to place the third cover 232 on the second side wall portion 2312, an adhesive material (or bonding material) may be disposed between the third cover placement area and the border area of the third cover 232.

According to various embodiments, the second housing 22 may be defined or interpreted as a portion of the third housing 23. In this case, the portion including the third frame 231, the third cover 232, and the fourth cover 233 of the third housing 23 may be referred to by a term such as "cover housing", and the third housing 23 may be referred to by a term such as "support", "support portion", "support member", or "sliding structure" accommodated in the third housing 23.

According to an embodiment, in the closed state of the slidable electronic device 2 (see FIGS. 2A to 2F), a portion of the outer surface of the slidable electronic device 2 by the slidable housing 20 may be provided by the first side wall 201 and the third housing 23. For example, in the closed state of the slidable electronic device 2, the remaining portion of the first housing 21 may be covered by the third housing 23 and not exposed to the outside. In the closed state of the slidable electronic device 2, a portion of the outer surface of the slidable electronic device 2 provided by the first side wall 201 may be smoothly connected to a portion of the outer surface of the slidable electronic device 2 provided by the third housing 23. When the slidable electronic device 2 is switched from the closed state to the open state (see FIGS. 3A to 3F), a portion of the outer surface of the slidable electronic device 2 by the slidable housing 20 may further include an outer surface area provided by the second side wall 202, the third side wall 203, and the first cover 212. In some embodiments, in the closed state of the slidable electronic device 2, a portion of the first housing 21 may protrude in the second direction ② relative to the third housing 23. In this case, in the closed state of the slidable electronic device 2, a portion of the first housing 21 protruding in the second direction ② relative to the third housing 23 (e.g., a portion of the second side wall 202, a portion of the third side wall 203, and a portion of the first cover 212) may provide a portion of the outer surface of the slidable electronic device 2.

According to an embodiment, a combination of the first side wall portion 2112 of the first housing 21 and the second side wall portion 2312 of the third housing 23 may provide a bezel (or bezel structure, screen bezel, or screen bezel structure) surrounding the screen. For example, when the slidable electronic device 2 (see FIGS. 2A to 2F) in the closed state is viewed from above the screen, a combination of the first side wall 201, the fourth side wall 204, the fifth side wall 205, and the sixth bezel 206 may provide a bezel surrounding the screen. For example, when the slidable electronic device 2 in the open state (see FIGS. 3A to 3F) is viewed from above the screen, a combination of the first side wall 201, the second side wall 202, the third side wall 203, the fourth side wall 204, the fifth side wall 205, and the sixth side wall 206 may provide a bezel surrounding the screen.

According to an embodiment, the second housing 22 may include a first support surface (reference numeral "22A" in FIGS. 4A and 4B) facing the front surface of the slidable electronic device 2, a second support surface (reference numeral "22B" in FIGS. 4A and 4B) corresponding to the bending portion of the second area ⓑ included in the flexible display module 24, and a third support surface facing the rear surface of the slidable electronic device 2. The first support surface and the second support surface may support the second area ⓑ of the flexible display module 24. In some embodiments, the second housing 22 is an element which support the second area ⓑ of the flexible display module 24, and may be referred to by various terms such as "display support", "display support member", "display support structure", "display support plate", or "display support board". A portion of the second area ⓑ providing the second screen area S2 may be supported by the first support surface. The second support surface may face the bending portion of the second area ⓑ, and may include a curved surface corresponding to the bending portion of the second area ⓑ. The second support surface may support the bending portion of the second area ⓑ. In an embodiment, various electronic components, such as a battery, may be disposed on the third support surface. The bending portion of the second area ⓑ may be positioned between the second support surface and the fourth side wall 204 of the third housing 23. In an embodiment, one surface of the fourth side wall 204 facing the bending portion of the second area ⓑ may include a curved surface corresponding to the bending portion. When the second housing 22 slides out, at least a portion of the second area ⓑ may be pulled out to the outside (e.g., an externally visible position in the slidable electronic device 2) from the space between the second housing 22 and the third housing 23 through the curved space between the fourth side wall 204 and the second support surface. When the second housing 22 slides in, at least a portion of the second area ⓑ may be introduced into the space between the second housing 22 and the third housing 23 from the outside through the curved space between the fourth side wall 204 and the second support surface.

According to various embodiments, when viewed from above the rear surface of the slidable electronic device 2 in the state in which the second area ⓑ of the flexible display module 24 is at least partially introduced into the space between the second housing 22 and the third housing 23 (e.g., in the closed state of FIGS. 2A to 2F), an additional screen in which a portion of the second area ⓑ is visible through the first cover 212 of the first housing 21 may be provided. In this case, an area of the third housing 23 corresponding to the additional screen may be provided as transparent or translucent. In some embodiments, when there is a member positioned between the third support portion 2311 and the second area ⓑ in the closed state of the slidable electronic device 2, the area of the member corresponding to the additional screen may include an opening or may be provided as transparent or translucent.

According to an embodiment, at least a portion of the first housing 21, at least a portion of the second housing 22, or at least a portion of the third housing 23 may include a metallic material and/or a non-metallic material. The first housing 21 or the third housing 23 may include, for example, at least one conductive structure including a metallic material, and at least one non-conductive structure including a non-metallic material and connected to the at least one conductive structure. The metallic material contained in the first housing 21, the second housing 22, or the third housing 23 may vary, for example, as magnesium, magnesium alloy, aluminum, aluminum alloy, zinc alloy, copper alloy, titanium, amorphous alloy, metal-ceramic composite (e.g., cermet), or stainless steel (STS). The non-metallic material contained in the first housing 21, second housing 22, or third housing 23 may vary, for example, as ceramic or polymer. In some embodiments, the first housing 21 and the third housing 23 may contain the same metallic or non-metallic material. In some embodiments, the first housing 21 and the third housing 23 may contain different metallic or non-metallic materials.

According to an embodiment, at least one conductive portion (or conductive area) included in the first housing 21 or the third housing 23 may be electrically connected to a wireless communication circuit (e.g., the wireless communication module 192) included in the slidable electronic device 2 to be used as an antenna radiator.

According to an embodiment, the sliding structure which allows the second housing 22 to slide relative to the first housing 21 may include a sliding driving part which is capable of providing a driving force for sliding the second housing 22 relative to the first housing 21 from an electrical signal. The sliding driving part may include, for example, a motor and at least one gear operatively connected to the motor. When a signal is generated via an input module included in the slidable electronic device 2, the sliding driving part allows the slidable electronic device 2 to switch between the closed state (see FIGS. 2A to 2F) and the open state (see FIGS. 3A to 3F). For example, when a signal is generated via a hardware button or a software button provided via the screen, the slidable electronic device 2 may be switched from the closed state to the open state or from the open state to the closed state. As another embodiment, when signals are generated from various sensors such as a pressure sensor, the slidable electronic device 2 may be switched from the closed state to the open state or from the open state to the closed state. When carrying or holding the slidable electronic device 2 by hand, a squeeze gesture in which a portion of the hand (e.g., the palm or fingers) presses the slidable electronic device 2 within a predetermined section may be detected by a sensor, and in response thereto, the slidable electronic device 2 may be switched from the closed state to the open state or from the open state to the closed state. The sliding driving part is not limited to a motor and may include various actuators, such as a solenoid or hydraulic cylinder. The solenoid may include, for example, a coil and a plunger positioned relative to the coil and produce mechanical movement of the plunger when an electric current is supplied to the coil.

According to an embodiment, the slidable electronic device 2 may include at least one of one or more audio modules (e.g., the audio module 170 in FIG. 1), one or more sensor modules (e.g., the sensor module 176 in FIG. 1), one or more camera modules (e.g., the camera module 180 in FIG. 1), one or more light-emitting modules, one or more input modules (e.g., the input module 150 in FIG. 1), and/or one or more connection terminal modules (e.g., the interface 177 or the connection terminal 178 in FIG. 1). In some embodiments, at least one of the above-mentioned components may be omitted from the slidable electronic device 2 or other components may be additionally included in the electronic device 101. The positions or number of components may vary.

One of the one or more audio modules may include, for example, a microphone positioned inside the slidable electronic device 2 and a microphone hole 301 provided on the exterior of the slidable electronic device 2 corresponding to the microphone. In the illustrated example, the microphone hole 301 may be provided in the first side wall 201. The positions or number of audio modules in terms of the microphones may vary without being limited to the illustrated example.

One of the one or more audio modules may include, for example, a first speaker for multimedia playback (or recording playback) positioned inside the slidable electronic device 2, and a first speaker hole 302 provided on the exterior of the slidable electronic device 2 corresponding to the first speaker. One of the one or more audio modules may include, for example, a second speaker (e.g., a call receiver) positioned inside the slidable electronic device 2 for calls and a second speaker hole 303 (e.g., a receiver hole) provided on the exterior of the slidable electronic device 2 corresponding to the second speaker. In the illustrated example, the first speaker hole 302 and the second speaker hole 303 may be provided on the first side wall 201. The positions or number of audio modules relative to the speaker may vary. In some embodiments, the microphone hole and the speaker hole may be implemented as a single hole. In some embodiments, the speaker-related audio module may include a piezo speaker in which a speaker hole is omitted.

The one or more sensor modules may generate, for example, electrical signals or data values corresponding to an internal operating state of the slidable electronic device 2 or an external environmental state. In an embodiment, one of the one or more sensor modules may include an optical sensor positioned in the inner space of the housing 20 corresponding to the screen. The optical sensor may be disposed to overlap at least a portion of the screen when viewed from above on the front surface of the slidable electronic device 2 (e.g., when viewed in the −z-axis direction). In this case, the position of the optical sensor or the optical sensor itself may allow the sensing function to be executed while the optical sensor remains visually indistinguishable (or unexposed). The optical sensor may include, for example, a proximity sensor or an illuminance sensor. In an embodiment, the optical sensor may be positioned on the rear surface of the first area (a) included in the flexible display module 24 or below or beneath the first area (a), and the position of the optical sensor or the optical sensor itself may be visually indistinguishable (or unexposed). In some embodiments, the optical sensor may be positioned in alignment with a recess provided on the rear surface of the first area (a), or may be at least partially inserted into the recess. A portion of the first area (a) which at least partially overlaps the optical sensor may include a different pixel structure and/or wiring structure compared to other areas. For example, the portion of the first region (a) which at least partially overlaps the optical sensor may have a different pixel density compared to other areas. The pixel structure and/or wiring structure provided in the portion of the first area (a) which at least partially overlap the optical sensor may reduce the loss of light between the outside and the optical sensor. As another example, multiple pixels may not be disposed in the portion of the first area (a) which at least partially overlaps the optical sensor.

According to various embodiments, the optical sensor may be positioned in alignment with the opening provided in the first area (a), or may be at least partially inserted into the opening. External light may reach the optical sensor through the transparent cover and the opening provided in the first area (a). The transparent cover serves to protect the flexible display module 24, and may include, for example, a flexible film or flexible plate such as a plastic film (e.g., polyimide film) or ultra-thin glass (UTG).

According to various embodiments, without being limited to the optical sensor such as a proximity sensor or a luminance sensor, various other sensors may be positioned on the rear surface of the first area (a) or below or beneath the first area (a), or may be positioned corresponding to an opening provided in the first area (a) of the flexible display module 24. For example, an optical, electrostatic, or ultrasonic biometric sensor (e.g., a fingerprint sensor) may be positioned on the rear surface of the first area (a) of the flexible display module 24 or below or beneath the first area (a), or may be positioned corresponding to an opening provided in the first area (a). In various embodiments, the slidable electronic device 2 may include various other sensors (e.g., a gesture sensor, a gyro sensor, a barometric pressure sensor, a magnetic sensor, an acceleration sensor, a grip sensor, a color sensor, an infrared (IR) sensor, a temperature sensor, or humidity sensor), and the positions thereof may vary.

According to an embodiment, the one or more camera modules may include one or more lenses, an image sensor, and/or an image signal processor. One of the one or more camera modules may include, for example, a first camera module 304 (e.g., a front camera module) positioned corresponding to the front surface of the slidable electronic device 2. In an embodiment, the first camera module 304 may be positioned in the inner space of the housing 20 corresponding to the screen. The first camera module 304 may be disposed to overlap at least a portion of the screen when viewed from above the front surface of the slidable electronic device 2 (e.g., when viewed in the −z-axis direction). In this case, the position of the first camera module 304 or the first camera module 304 itself may allow the image capturing function to be executed while the first camera module 304 remains visually indistinguishable (or unexposed). In an embodiment, the first camera module 304 may be positioned on the rear surface of the first area (a) included in the flexible display module 24 or below or beneath the first area (a), and the position of the first camera module 304 or the first camera module 304 itself may be visually indistinguishable (or unexposed). In some embodiments, the first camera module 304 may be positioned in alignment with a recess provided on the rear surface of the first area (a), or may be at least partially inserted into the recess. The first camera module 304 may include, for example, a hidden display rear camera (e.g., an underdisplay camera (UDC)). A portion of the first area (a) which at least partially overlaps the first camera module 304 may include a different pixel structure and/or wiring structure compared to other areas. For example, the portion of the first region (a) which at least partially overlaps the first camera module 304 may have a different pixel density compared to other areas. The pixel structure and/or wiring structure provided in the portion of the first area (a) which at least partially overlap the first camera module 304 may reduce the loss of light between the outside and the first camera module 304. As another example, multiple pixels may not be disposed in the portion of the first area (a) which at least partially overlaps the first camera module 304.

According to various embodiments, the first camera module 304 may be positioned in alignment with an opening provided in the first area (a), or may be at least partially inserted into the opening. External light may reach the first camera module 304 through the transparent cover (e.g., polyimide film or ultra-thin glass) which protects the flexible display module 24 from the outside and the opening provided in the first area (a). The opening of the first area (a) which is aligned with or overlaps the first camera module 304 may be provided in the form of a through hole or a notch. In some embodiments, the first camera module 304 may be positioned corresponding to a camera hole provided in the fourth side wall 204 when viewed from above the front surface of the slidable electronic device 2. In various embodiments, the slidable electronic device 2 may include a light-emitting module (e.g., a light-emitting diode (LED), an IR LED, or a xenon lamp) capable of providing status information of the slidable electronic device 2 in an optical form. In some embodiments, the light-emitting module may provide a light source which operates in conjunction with the operation of the first camera module 304.

According to an embodiment, the slidable electronic device 2 may include a second camera module 305, a third camera module 306, and/or a light-emitting module 307 (e.g., a flash) positioned in the first housing 21 corresponding to the first cover 212. The first cover 212 may include a first opening (e.g., a first camera hole) provided corresponding to the second camera module 305 (e.g., the first rear camera module), a second opening (e.g., a second camera hole) provided corresponding to the third camera module 306 (e.g., the second rear camera module), and/or a third opening (e.g., a flash hole) provided corresponding to the light-emitting module 307. The second camera module 305 may be positioned in the first housing 21 corresponding to the first opening. The third camera module 306 may be positioned in the first housing 21 corresponding to the second opening. The light-emitting module 307 may be positioned in the first housing 21 corresponding to the third opening. In the open state of the slidable electronic device 2 (see FIGS. 3A to 3F), the second camera module 305, the third camera module 306, and the light-emitting module 307 may not overlap a portion of the third housing 23 which includes the third support portion 2311 and the third cover 232 when viewed from above the rear surface of the slidable electronic device 2 (e.g., when viewed in the +z-axis direction), and may be exposed to the outside. In an embodiment, in the closed state of the slidable electronic device 2 (see FIGS. 2A to 2F), the portion of the third housing 23 which includes the third support portion 2311 and the third cover 232 may overlap the second camera module 305, the third camera module 306, and the light emitting module 307 when viewed from above the rear surface of the device 2. The portion of the third housing 23 which includes the third support 2311 and the third cover 232 may include a light transmission area 308 corresponding to the second camera module 305, the third camera module 306, and the light emitting module 307. The light transmission area 308 may overlap the second camera module 305, the third camera module 306, and the light emitting module 307 in the closed state of the slidable electronic device 2. In the closed state of the slidable electronic device 2, external light may reach the second camera module 305 or the third camera module 306 through the light transmission area 308. In the closed state of the slidable electronic device 2, light output from the light-emitting module 307 may travel to the outside of the slidable electronic device 2 through the light transmission area 308. In an embodiment, the light-emitting module 307 may include a light source for the second camera module 305 and/or the third camera module 306. The light-emitting module 307 may include, for example, an LED or xenon lamp. In some embodiments, a portion of the third housing 23 which includes the third support portion 2311 and the third cover 232 may include an opening in the form of a through hole or a notch in place of the light transmission area 308. The number or positions of rear camera modules or light-emitting modules positioned in the first housing 21 corresponding to the first cover 212 is not limited to the illustrated example, and may vary. As another example, the second camera module 305 or the third camera module 306 may be omitted. In an embodiment, the second camera module 305 and the third camera module 306 may have different properties (e.g., angles of view) or functions. Although a dual camera module is illustrated, an example including more camera modules (e.g., a triple camera module) may be provided without being limited thereto. Two or more camera modules (e.g., rear camera modules) may have different properties (e.g., angles of view) or functions. Two or more camera modules may provide different angles of view (or lenses of different angles of view), and the slidable electronic device 2 may selectively use the corresponding camera module based on a user's selection regarding the angle of view. One of the two or more camera modules may include a wide-angle camera module, a telephoto camera module, a color camera module, a monochrome camera module, or an infrared (IR) camera (e.g., a time of flight (TOF) camera, or structured light camera) module. In some embodiments, the IR camera module may operate as at least a portion of a sensor module.

According to an embodiment, one or more input modules may include a first key input device 309 or a second key input device 310. In the illustrated example, the first key input device 309 may be positioned on the first side wall 201, and the second key input device 310 may be positioned on the sixth side wall 206. The positions or number of input modules may vary without being limited to the illustrated example. In some embodiments, the slidable electronic device 2 may not include some or all of the key input devices, and the not included key input devices may be implemented as soft keys using the screen. In some embodiments, the input module or the key input device may include at least one sensor module.

One of the one or more connection terminal modules (or connector modules or interface terminal modules) may include, for example, a connector (or an interface terminal), and a connector hole 311 provided in the exterior of the slidable electronic device 2 corresponding to the connector. In the illustrated example, the connector hole 311 may be provided in the second side wall 202. The positions or number of connection terminal modules may vary. The slidable electronic device 2 may transmit/receive power and/or data to/from an external electronic device electrically connected to the connector. In an embodiment, the connector may include a USB connector or an HDMI connector. In various embodiments, one of the one or more connection terminals may include an audio connector (e.g., a headphone connector or an earset connector) positioned inside the slidable electronic device 2, and a connector hole provided in the exterior of the slidable electronic device 2 corresponding to the audio connector. In various embodiments, one of the one or more connection terminal modules may include a connector for a memory card positioned inside the slidable electronic device 2, and a connector hole provided on the exterior of the slidable electronic device 2 corresponding to the connector for the memory card. In the illustrated example, the connector for the memory card may be positioned inside the slidable electronic device 2 corresponding to the first side wall 201, and the connector hole may be covered with a detachable cover 312.

Figures 4A, 4B:
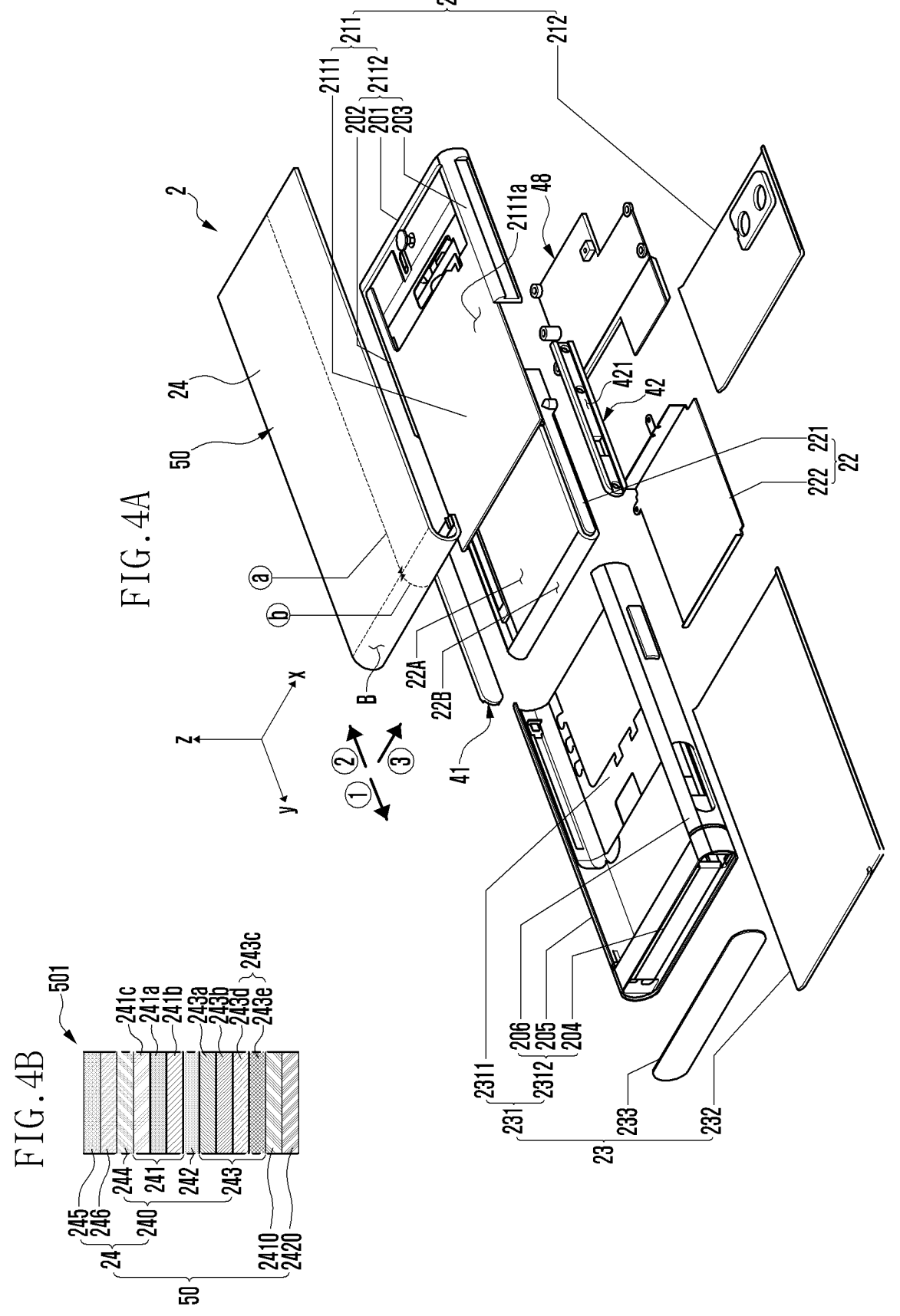
FIGS. 4A and 5 are exploded perspective views of the slidable electronic device according to an embodiment of the disclosure.
FIG. 4B is an enlarged cross-sectional view of a flexible display module according to an embodiment of the disclosure.
Figure 5:
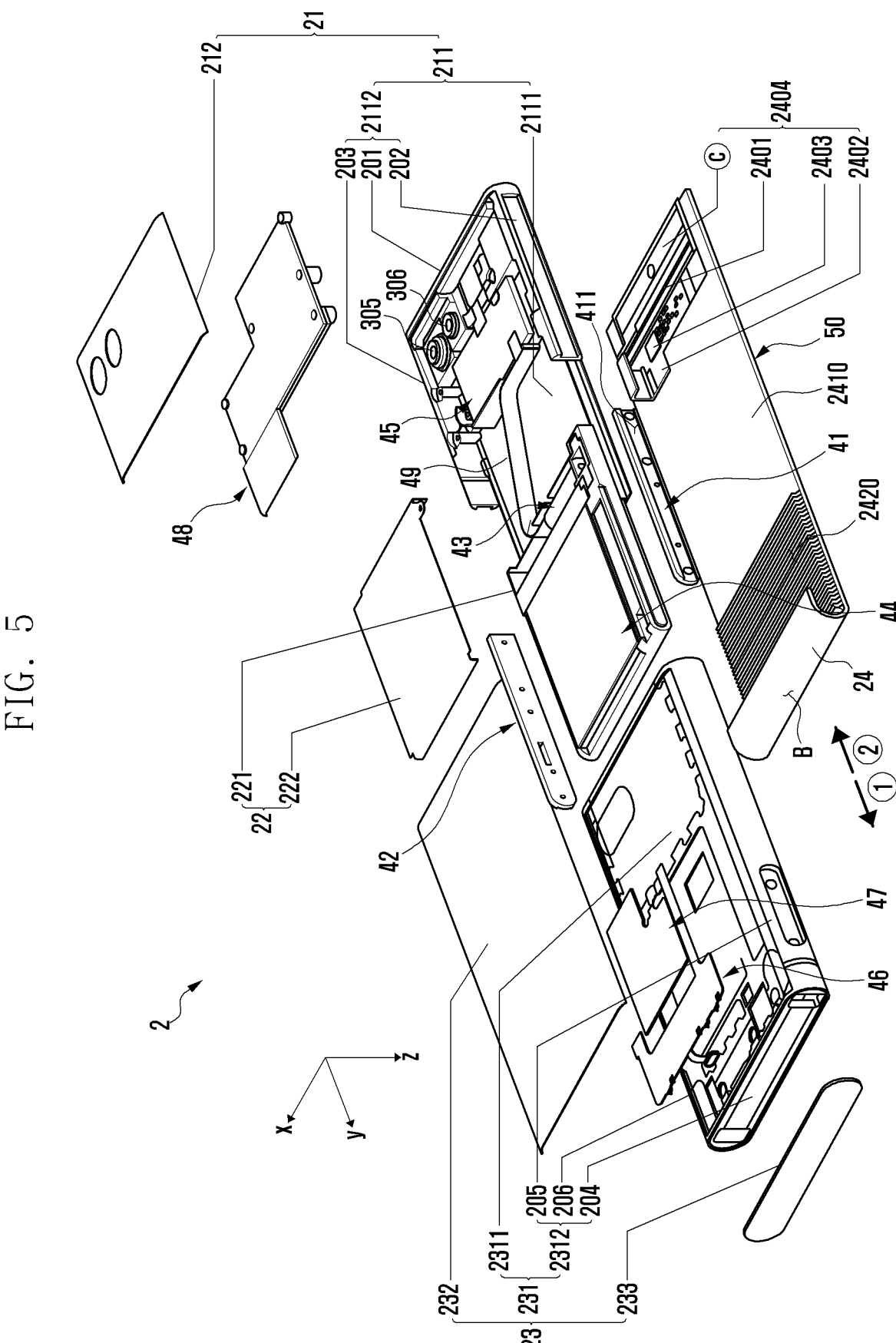
Figure 6:
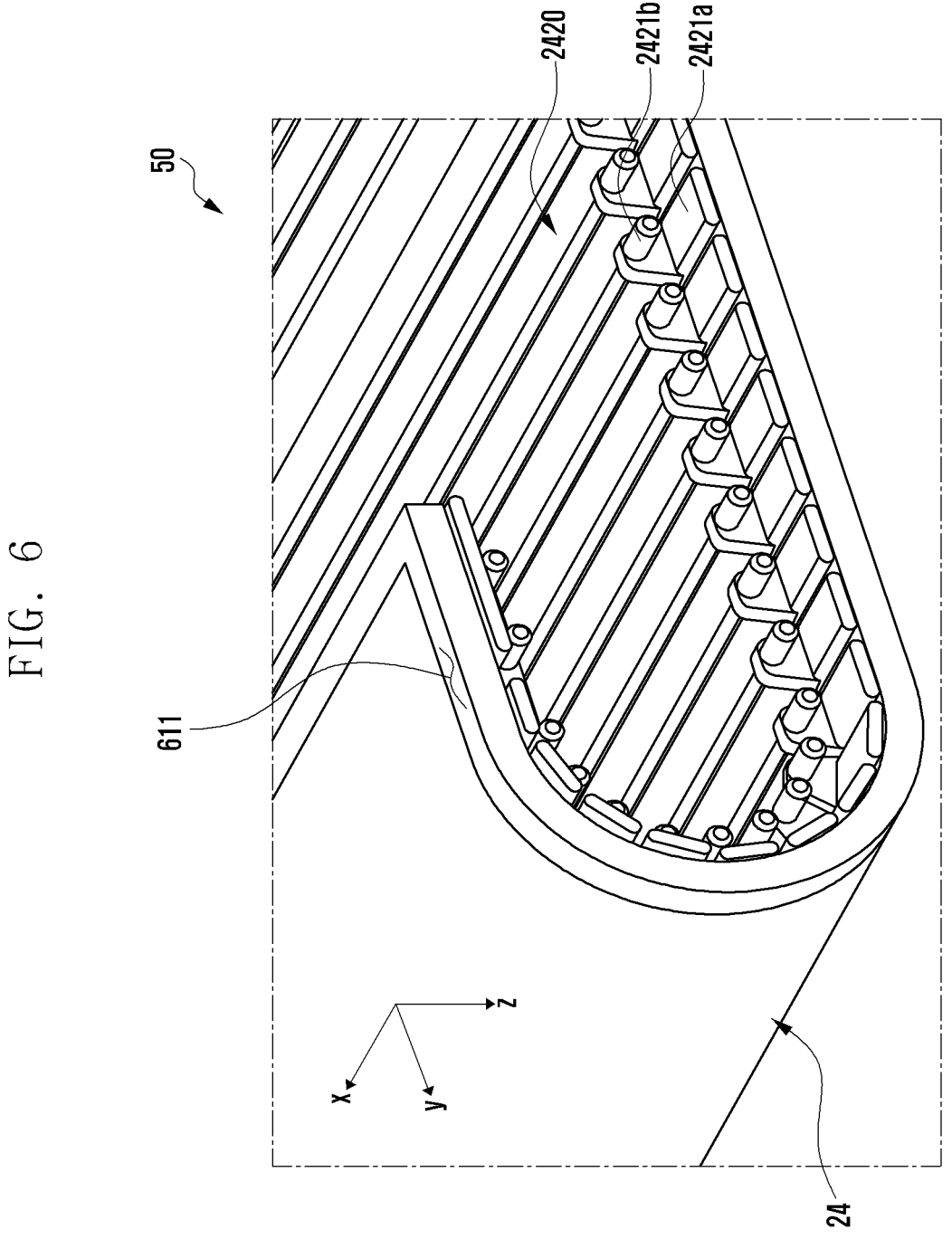
FIG. 6 is a partial perspective view of a display assembly according to an embodiment of the disclosure.
Figure 7:
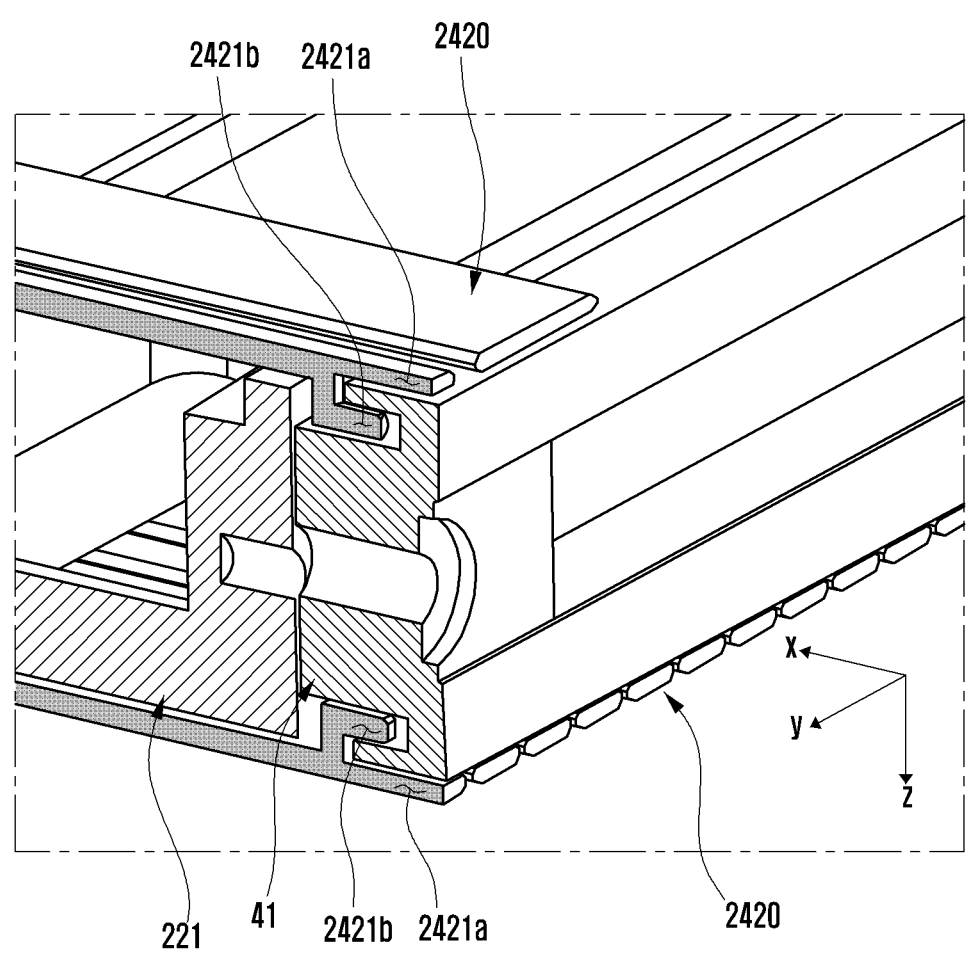
FIG. 7 is a partial cross-sectional perspective view of the slidable electronic device according to an embodiment of the disclosure.
Figure 8:
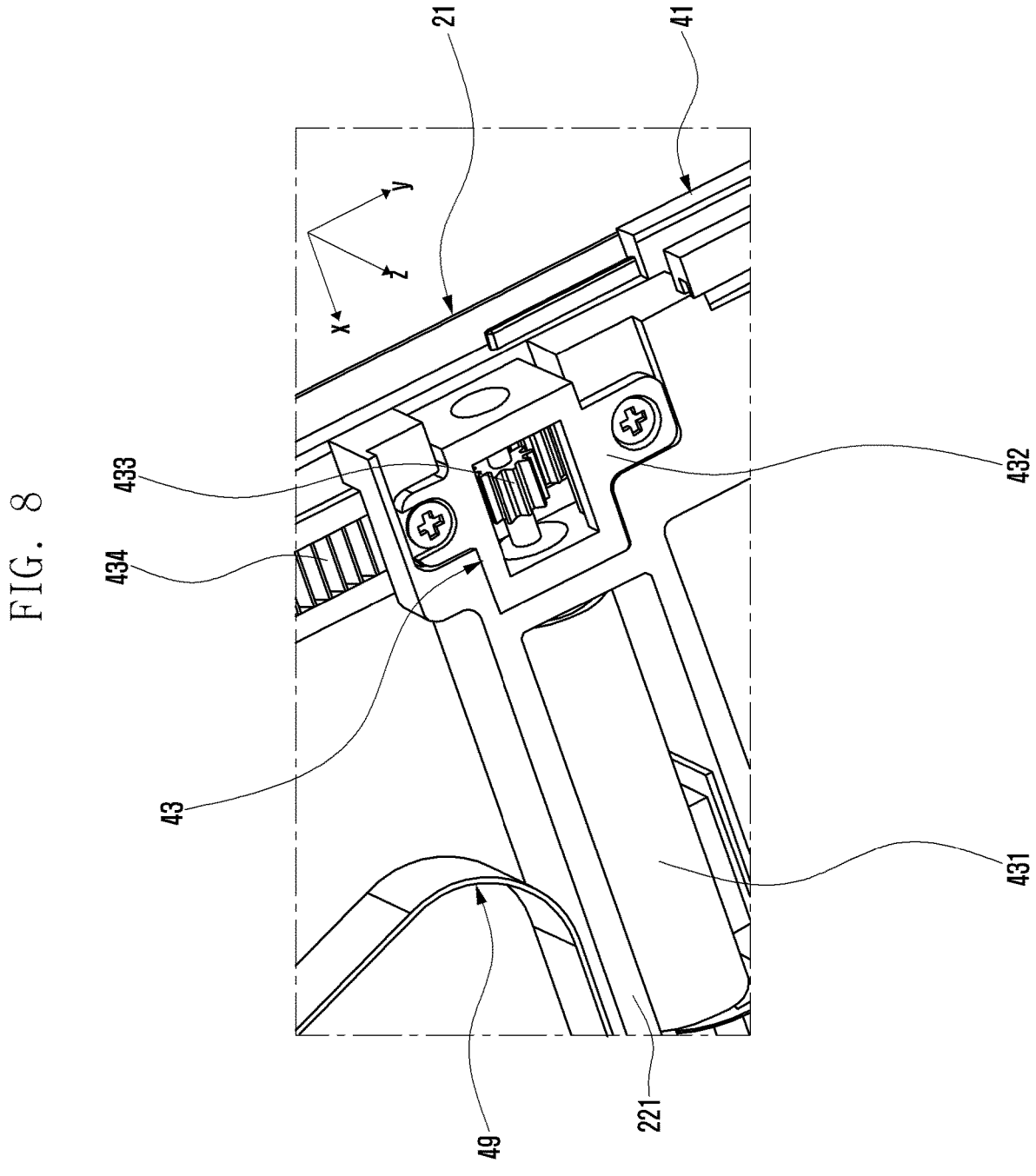
FIG. 8 is a partial perspective view illustrating a first frame of the first housing, a second frame of the second housing, and a first guide rail according to an embodiment of the disclosure.

FIGS. 4A, 4B and 5 are exploded perspective views of a slidable electronic device 2 according to an embodiment of the disclosure. FIG. 6 is a partial perspective view of a display assembly 50 according to an embodiment of the disclosure. FIG. 7 is a partial cross-sectional perspective view of the slidable electronic device 2 according to an embodiment of the disclosure. FIG. 8 is a partial perspective view illustrating a first frame 211 of a first housing 21, a second frame 221 of a second housing 22, and a first guide rail 41 according to an embodiment of the disclosure.

Referring to FIGS. 4A, 4B, 5, 6, 7, and 8, the slidable electronic device 2 may include a first housing 21, a second housing 22, a third housing 23, a display assembly 50, a first guide rail 41, a second guide rail 42, a sliding driver 43, a battery 44, a first printed circuit board 45, a second printed circuit board 46, an antenna structure 47, a support member 48, and/or a flexible printed circuit board (FPCB) 49.

According to an embodiment, the first frame 211 of the first housing 21 may be provided as an integrated structure including a first support portion 2111 and a first side wall portion 2112. The first support portion 2111 of the first frame 211 may be positioned inside the slidable electronic device 2 corresponding to the first housing 21. At least a portion of the first support portion 2111 may include a metallic material and/or a non-metallic material. Electronic components, or various members related to the electronic components may be disposed on or supported by the first frame 211. In an embodiment, a first area ⓐ of the flexible display module 24 may be disposed on the first support portion 2111. The first support portion 2111 may provide a first surface 2111a facing the front surface of the slidable electronic device 2, and the first area ⓐ of the flexible display module 24 may be disposed on the first surface 2111a. In some embodiments, the first support portion 2111 may be referred to by various other terms such as "bracket", "support", "internal support", "support member", "support structure", or "internal support structure". The first support portion 2111 may be defined or interpreted as a portion of the first housing 21 or as an element separate from the first housing 21. The first cover 212 may be disposed on the first frame 211 of the first housing 21. The first cover 212 of the first housing 21 may be a plate which includes, for example, a first rear surface facing the front surface of the slidable electronic device 2, and a first rear surface providing at least a portion of the rear surface of the slidable electronic device 2.

According to an embodiment, the second housing 22 may include a second frame (or a second frame structure, a second framework, or a second case) 221, and a second cover 222 disposed on the second frame 221. The second frame 221 may be operatively connected to the first housing 21 to be slidable relative to the first housing 21. The second frame 221 may support a second area ⓑ of the flexible display module 24. The second cover 222 may be positioned facing a bottom portion 2311 included in the third frame 231 of the third housing 23. The second cover 222 may be referred to by a term such as 'second back cover' or 'second rear surface plate'. The second cover 222 may be, for example, a plate which includes a second front surface facing the front surface of the slidable electronic device 2 and a second rear surface facing the rear surface of the slidable electronic device 2. The second cover 222 may be positioned away from the bottom portion 2311 of the third housing 23 in the direction where the front surface of the slidable electronic device 2 is oriented (e.g., the +z-axis direction). At least a portion of the second housing 22 may include a metallic material and/or a non-metallic material.

According to an embodiment, the third housing 23 may have a space provided by a combination of the third support portion 2311 and the second side wall portion 2312 of the third frame 231. The second housing 22 may be positioned in the space of the third housing 23 and coupled with the third housing 23. At least a portion of the second housing 23 may include, for example, a metallic material and/or a non-metallic material. The third cover 232 and/or the fourth cover 233 may be disposed on the third frame 231. The third cover 232 may be, for example, a plate which includes a third front surface facing the front surface of the slidable electronic device 2 and a third rear surface facing the rear surface of the slidable electronic device 2. In some embodiments, the fourth cover 233 may be omitted, and the second side wall portion 2312 may be provided in a form which further includes a portion corresponding to the fourth cover 233.

According to an embodiment, when viewed from above the front surface of the slidable electronic device (e.g., when viewed in the −z-axis direction), the area where the first support portion 2111 of the first housing 21 and the second frame 221 of the second housing 22 overlap may decrease when the second housing 22 slides out, and may increase when the second housing 22 slides in.

According to an embodiment, the first area ⓐ of the flexible display module 24 may be disposed on the first support portion 2111 of the first housing 21. The first area ⓐ of the flexible display module 24 may be disposed on the first support portion 2111 using, for example, a heat-reactive adhesive material (or heat-reactive bonding material), a photo-reactive adhesive material (or photo-reactive bonding material), a general adhesive material (or general bonding material), double-sided tape, or an organic adhesive material (or organic bonding material). In some embodiments, the first area ⓐ of the flexible display module 24 may be inserted into the first frame 211 in the first direction ① in a sliding manner to be disposed in a recess provided on the first surface 2111*a* of the first support portion 2111. Since the first area ⓐ of the flexible display module 24 is disposed in the first housing 21, the second area ⓑ of the flexible display module 24 may be pulled out from the space between the second housing 22 and the third housing 23 to the outside (e.g., an externally visible position in the slidable electronic device 2).

According to an embodiment, the second frame 221 of the second housing 22 may include a first support surface 22A and a second support surface 22B which support the second area ⓑ of the flexible display module 24. The first support surface 22A may include a planar area. When viewed from above the front surface of the slidable electronic device (e.g., when viewed in the −z-axis direction), an area where the first support surface 22A faces the first support portion 2111 of the first housing 21 may decrease when the second housing 22 slides out, and may increase when the second housing 22 slides in. In the closed state (see FIGS. 2A to 2F) or the open state (see FIGS. 3A to 3F) of the slidable electronic device 2, or in the sliding of the second housing 22 relative to the first housing 21, at least a portion of the first support surface 22A which faces and overlaps the first support portion 2111 may support the first support portion 2111 of the first housing 21. In the open state of the slidable electronic device 2 or in the sliding of the second housing 22 relative to the first housing 21, the first support surface 22A may support a portion of the second area ⓑ of the flexible display module 24 which provides the screen. When the second housing 22 slides out, the area of the first support surface 22A, which is not covered by the first support portion 2111 of the first housing 21 to support the second area ⓑ of the flexible display module 24, may increase. In an embodiment, the second support surface 22B may include a curved area (or a curved support area). The second support surface 22B may be positioned corresponding to the fourth side wall 204 of the third housing 23. The second support surface 22B may support of the bending portion B of the second area ⓑ of the flexible display module 24. The bending portion B of the flexible display module 24 may be a portion of the second area ⓑ which is disposed and maintained in a bent form so that the second area ⓑ changes direction and moves when the second housing 22 slides relative to the first housing 21. During the slide-out of the second housing 22, due to the relative position between the first housing 21 coupled with the first area ⓐ and the second housing 22 corresponding to the second area ⓑ, at least a portion of the second area ⓑ may be pulled out from the inside of the slidable electronic device 2 through the curved space between the fourth side wall 204 and the second support surface 22B of the second housing 22. During the slide-in of the second housing 22, due to the relative position between the first housing 21 coupled with the first area ⓐ and the second housing 22 corresponding to the second area ⓑ, at least a portion of the second area ⓑ may be introduced into the inside of the slidable electronic device 2 through the curved space between the fourth side wall 204 and the second support surface 22B of the second housing 22.

According to various embodiments, a rotation member such as a roller or a pulley may be positioned to replace the portion of the second housing 22 which provides the second support surface 22B. For example, one end and the other end of the rotation shaft related to the rotation member may be rotatably coupled to the second housing 22 or the third housing 23. In some embodiments, the rotation member may be interpreted as a curved member, a curved support member, or a curved support structure implemented to be rotatable based on friction with the display support structure 2420 (e.g., a multi-bar structure).

According to an embodiment, referring to a cross-sectional view 501 of the display assembly 50, the display assembly 50 may include a flexible display module 24, a support sheet 2410, and/or a display support structure 2420.

According to an embodiment, the flexible display module 24 may include a flexible display 240, a transparent cover 245, and/or an optically transparent adhesive member (or an optically transparent bonding member) 246. For example, the flexible display 240 may be coupled to the transparent cover 245 using an optically transparent adhesive member 246 (e.g., an optical clear adhesive (OCA), an optical clear resin (OCR), or a super view resin (SVR)). The transparent cover 245 (e.g., a window) may cover the flexible display 240 to protect the flexible display 240 from the outside. The transparent cover 245 may be implemented in the form of a flexible thin film (e.g., a thin film layer). The transparent cover 245 may include, for example, a plastic film (e.g., a polyimide film) or thin film glass (e.g., ultra-thin glass). In some embodiments, the transparent cover 245 may include multiple layers. For example, the transparent cover 245 may be in the form in which various coating layers are disposed on a plastic film or thin film glass. The transparent cover 245 may be, for example, in the form in which at least one protective layer or coating layer including a polymer material (e.g., polyester (PET), polyimide (PI), or thermoplastic polyurethane (TPU)) is disposed on a plastic film or a thin film glass. In some embodiments, the transparent cover 245 and the optically transparent adhesive member 246 may be defined or interpreted as a portion of the flexible display 240. The flexible display 240 may include, for example, a display panel 241, a base film 242, a lower panel 243, or an optical layer 244. The display panel 241 may be positioned between the optical layer 244 and the base film 242. The base film 242 may be positioned between the display panel 241 and the lower panel 243. The optical layer 244 may be positioned between the optically transparent adhesive member 246 and the display panel 241. Between the display panel 241 and the base film 242, between the base film 242 and the lower panel 243, and/or between the display panel 241 and the optical layer 244, various polymer gluing materials (or gluing members) or adhesive materials (or adhesive members) may be disposed. The display panel 241 may include, for example, a light-emitting layer 241a, a thin film transistor (TFT) film (or TFT substrate) 241b, and/or an encapsulation (e.g., a thin-film encapsulation (TFE)) 241c. The light-emitting layer 241a may include, for example, multiple pixels implemented by light-emitting elements such as organic light-emitting diodes (OLEDs) or micro-LEDs. The light-emitting layer 241a may be disposed on the TFT film 241b through organic evaporation. The TFT film 241b may be positioned between the light-emitting layer 241a and the base film 242. The TFT film 241b may refer to a film structure in which at least one TFT is disposed on a flexible substrate (e.g., a PI film) through a series of processes such as deposition, patterning, and/or etching. At least one TFT may control current to the light-emitting elements of the light-emitting layer 241a to turn on or off the pixels or to adjust brightness of the pixels. The at least one TFT may be implemented as, for example, an amorphous silicon (a-Si) TFT, a liquid crystalline polymer (LCP) TFT, a low-temperature polycrystalline oxide (LTPO) TFT, or a low-temperature polycrystalline silicon (LTPS) TFT. In an embodiment, the display panel 241 may include a storage capacitor, which may maintain a voltage signal to the pixels, maintain the voltage applied to the pixels within one frame, or reduce a change in the gate voltage of the TFT due to leakage current during the light emission time. By a routine for controlling the at least one TFT (e.g., initialization or data write), the storage capacitor may maintain the voltage applied to the pixels at regular time intervals. In an embodiment, the display panel 241 may be implemented based on OLEDs, and the encapsulation 241c may cover the light-emitting layer 241a. The organic materials and electrodes which emit light in the OLEDs may react very sensitively to oxygen and/or moisture and may lose light-emitting properties thereof. Thus, in order to reduce or prevent this phenomenon, the encapsulation 241c may seal the light-emitting layer 241a to prevent oxygen and/or moisture from penetrating into the OLEDs. The base film 242 may include a flexible film made of a polymer or plastic such as polyimide or polyester (PET). The base film 242 may support and protect the display panel 241. In some embodiments, the base film 242 may be referred to as a "protective film", a "back film", or a "back plate". The lower panel 243 may include multiple layers for various functions. Various polymeric adhesive materials (or bonding materials) (not illustrated separately) may be disposed between adjacent ones of the multiple layers included in the lower panel 243. The lower panel 243 may include, for example, a light-blocking layer 243a, a buffer layer 243b, and/or a lower layer 243c. The light-blocking layer 243a may be positioned between the base film 242 and the buffer layer 243b. The buffer layer 243b may be positioned between the light-blocking layer 243a and the lower layer 243c. The light-blocking layer 243a may block at least some of light incident from the outside. For example, the light-blocking layer 243a may include an embossed layer. The embossed layer may be a black layer including an uneven pattern. The buffer layer 243b may alleviate an external impact applied to the flexible display 240. For example, the buffer layer 243b may include a sponge layer or a cushion layer. The lower layer 243c may diffuse, disperse, or dissipate heat generated from the slidable electronic device 2 or the flexible display 240. The lower layer 243c may absorb or block electromagnetic waves. The lower layer 243c may alleviate an external impact applied to the slidable electronic device 2 or the flexible display 240. For example, the lower layer 243c may include a composite sheet 243d or a copper sheet 243e. In an embodiment, the composite sheet 243d may be a sheet obtained by combining layers or sheets with different properties. For example, the composite sheet 243d may include at least one of polyimide or graphite. The composite sheet 243d may also be replaced with a single sheet including a single material (e.g., polyimide or graphite). The composite sheet 243d may be positioned between the buffer layer 243b and the copper sheet 243e. The copper sheet 243e may be replaced with various other metal sheets. In some embodiments, at least a portion of the lower layer 243c is a conductive member (e.g., a metal plate), which may help reinforce the rigidity of the slidable electronic device 2 and may be used to block ambient noise and to dissipate heat emitted from surrounding heat-emitting components (e.g., a display driving circuit) (e.g., a display drive integrated circuit (DDI)). For example, the conductive layer may include at least one of copper (Cu), aluminum (Al), stainless steel (SUS), or a CLAD (e.g., a lamination member in which SUS and Al are alternately disposed). The lower layer 243c may include various layers for various other functions. According to an embodiment (not illustrated), at least one additional polymer layer (e.g., a layer including PI, PET, or TPU) may be further disposed on the rear surface of the display panel 241 in addition to the base film 242. In some embodiments, at least one of the multiple layers included in the lower panel 243 (e.g., the light-blocking layer 243a, the buffer layer 243b, the composite sheet 243d, and the copper sheet 243e) may be omitted. In some embodiments, the arrangement order of the multiple layers included in the lower panel 243 is not limited to the illustrated embodiment and may be variously changed. The optical layer 244 may include, for example, a polarizing layer (or a polarizer) or a phase retardation layer (or a phase retarder). The polarizing layer and the phase retardation layer may improve outdoor visibility of the screen. For example, the optical layer 244 may selectively allow light which is emitted from a light source of the display panel 241 and oscillates in a predetermined direction to pass therethrough. In some embodiments, a single layer in which the polarizing layer and the phase retardation layer are combined may be provided, and such a layer may be interpreted as a "circular polarizing layer". The optically transparent adhesive member 246 may be positioned between the transparent cover 245 and the optical layer 244. In some embodiments, the polarizing layer (or the circular polarizing layer) may be omitted, in which case, a black pixel define layer (PDL) and/or a color filter may be provided in place of the polarizing layer. The slidable electronic device 2 may include a touch detection circuit (e.g., a touch sensor) (not illustrated). The touch-sensitive circuit may be implemented as a transparent conductive layer (or a film) based on various conductive materials such as indium tin oxide (ITO). In an embodiment, the touch-sensitive circuit may be disposed between the transparent cover 245 and the optical layer 244 (e.g., an add-on type). In another embodiment, the touch-sensitive circuit may be disposed between the optical layer 244 and the display panel 241 (e.g., an on-cell type). In another embodiment, the display panel 241 may include a touch-sensitive circuit or a touch-sensitive function (e.g., an in-cell type). In some embodiments, the display panel 241 may be based on an OLED, and may include an encapsulation 241c disposed between the light-emitting layer 241a and the optical layer 244. The encapsulation 241c may serve as a pixel protection layer for protecting multiple pixels of the light-emitting layer 241a. In some embodiments (not illustrated), the flexible display 240 may include a conductive pattern such as a metal mesh (e.g., an aluminum metal mesh) as a touch-sensitive circuit disposed on the encapsulation layer 241c between the encapsulation layer 241c and the optical layer 244. For example, to cope with the bending of the flexible display 240, the metal mesh may have greater durability than the transparent conductive layer made of ITO. In some embodiments, the flexible display 240 may further include a pressure sensor (not illustrated) capable of measuring the intensity (pressure) of a touch. Multiple layers included in the display panel 241 or the lower panel 243, or a laminating structure or laminating order thereof may vary. The flexible display 240 may be implemented by omitting some of the components or adding other components depending on its provided form or convergence trend.

According to an embodiment, the support sheet (or a support plate or support layer) 2410 may be disposed on the rear surface of the flexible display module 24. The rear surface of the flexible display module 24 may refer to a surface positioned on a surface opposite to the surface from which light from the display panel 241 including multiple pixels is emitted. For example, the support sheet 2410 may be disposed (e.g., attached) on the rear surface of the lower panel 243 to cover at least a portion of the lower panel 243 of the flexible display module 24. The support sheet 2410 may be coupled with the lower panel 243 using an adhesive material or bonding material. The support sheet 2410 may be positioned between bottom panel 243 and the display support structure 2420, and the display support structure 2420 may be coupled with support sheet 2410. The display support structure 2420 may be coupled with the support sheet 2410 using an adhesive material or bonding material. The adhesive material (or bonding material) between the flexible display 240 and the support sheet 2410, and/or the adhesive material (or bonding material) between the support sheet 2410 and the display support structure 2420 may include, for example, a heat-reactive adhesive material (or heat-reactive bonding material), a photo-reactive adhesive material (or photo-reactive bonding material), a general adhesive material (or general bonding material), or double-sided tape. As another example, the adhesive material (or bonding material) may include various polymers such as triazine thiol, dithio pyrimidine, or a silane-based compound, or an organic adhesive material (or organic bonding material) such as a sealant. The support sheet 2410 may contribute to durability (e.g., rigidity reinforcement) of the flexible display module 24. The support sheet 2410 may reduce the influence of load or stress which may occur when the second housing 22 slides relative to the first housing 21 on the flexible display module 24. The support sheet 2410 may reduce or prevent the flexible display module 24 from being damaged by force transmitted when the second housing 22 slides relative to the first housing 21. In an embodiment, the support sheet 2410 may include a metallic material. The support sheet 2410 may include, for example, stainless steel. The support sheet 2410 may include various other metal materials. In some embodiments, the support sheet 2410 may include engineering plastic.

According to an embodiment, the support sheet 2410 may include a lattice structure which at least partially overlaps the second area ⓑ of the flexible display module 24. The lattice structure may include, for example, multiple openings (or slits) penetrating between one surface of the support sheet 2410 facing the display support structure 2420 and the other surface of the support sheet 2410 facing the lower panel 243 of the flexible display module 24. The lattice structure may refer to a pattern structure in which multiple openings are regularly arranged. The multiple openings may be provided periodically, may have substantially the same shape, and may be repeatedly arranged at regular intervals. The lattice structure may contribute to the flexibility of the second area ⓑ, and the second area ⓑ may be more flexible than the first area ⓐ due to the lattice structure. In some embodiments, the lattice structure including multiple openings may be referred to by another term, such as "opening pattern", "hole pattern", or "lattice pattern". In some embodiments, the support sheet 2410 may include a recess pattern (not illustrated) including multiple recesses in place of the lattice structure. The recess pattern may refer to a pattern structure in which multiple indented recesses are formed and regularly arranged on the surface of the support sheet 2410 facing the display support structure 2420 or on the surface of the support sheet 2410 facing the lower panel 243 of the flexible display module 24. In some embodiments, the lattice structure or recess pattern may be expanded to the first area ⓐ of the flexible display module 24. In some embodiments, the support sheet 2410 including the lattice structure or the recess pattern, or a conductive member corresponding thereto, may be configured in multiple layers. The support sheet 2410 may reduce or prevent the phenomenon in which the components (e.g., the display support structure 2420) positioned inside the slidable electronic device 2 are visible from the outside of the slidable electronic device 2 through the flexible display module 24. The lattice structure of the support sheet 2410 corresponding to the second area ⓑ of the flexible display module 24 includes multiple openings, but may transmit light to a level which makes the display support structure 2420 substantially invisible through the flexible display module 24.

According to various embodiments, the support sheet 2410 may reduce electromagnetic interference (EMI) related to the flexible display module 24. In some embodiments, the support sheet 2410 may diffuse or dissipate heat emitted from a heat-emitting component (e.g., a display driving circuit such as a DDI or a DDI chip).

According to an embodiment, the display support structure (or display support member) 2420 may be disposed or coupled to the support sheet 2410. When the support sheet 2410 is omitted, the display support structure 2420 may be disposed or coupled to the rear surface of the flexible display module 24. The display support structure 2420 may be positioned between the second area ⓑ of the flexible display module 24 and the first support surface 22A of the second housing 22 to support the second area ⓑ. When the second housing 22 slides out, the area of the first support surface 22A of the second housing 22 which is not covered by the first support portion 2111 of the first housing 21 and supports the display support structure 2420 may increase. When the second housing 22 slides in, the area of the first support surface 22A of the second housing 22 which is not covered by the first support portion 2111 of the first housing 21 and supports the display support structure 2420 may decrease. The display support structure 2420 may support the bending portion B of the flexible display module 24 between the bending portion B of the flexible display module 24 and the second support surface 22B of the second housing 22. During the slide-out or slide-in of the second housing 22, the second housing 22 and the display support structure 2420 may move while mutually rubbing against each other.

According to an embodiment, the display support structure 2420 may reduce the lifting phenomenon of the screen (see FIGS. 2A to 2F or 3A to 3F) due to the elasticity of the flexible display module 24 and/or the elasticity of the support sheet 2410, thereby contributing to providing a smooth screen. The display support structure 2420 may support the second area ⓑ of the flexible display module 24 to prevent it from lifting due to the elasticity of the flexible display module 24 and/or the elasticity of the support sheet 2410, thereby contributing to maintaining the second area ⓑ in the form of being smoothly connected to the first area ⓐ. The display support structure 2420 may support the second area ⓑ of the flexible display module 24 to ensure which the second area ⓑ is maintained in the form of being smoothly connected to the first area ⓐ of the flexible display module 24. The display support structure 2420 may contribute to smooth movement of the flexible display module 24 when the second housing 22 is slid relative to the first housing 21. The display support structure 2420 may contribute to allowing the second area ⓑ of the flexible display module 24 to move while maintaining the form of being smoothly connected with the first area ⓐ of the flexible display module 24 during the sliding of the second housing 22 relative to the first housing 21.

According to an embodiment, the display support structure 2420 may include a multi-bar structure (or multiple bars or a multi-bar assembly). The multi-bar structure may include, for example, multiple support bars extending in a third direction ③ orthogonal to the first direction ① (e.g., the slide-out direction) and the direction in which the front side of the and slidable electronic device 2 is oriented. The multi-bar structure may include the form in which the multiple support bars are arranged on the other surface of the display support structure 2420, which is positioned opposite to one surface facing the second area ⓑ of the flexible display module 24. The multi-bar structure may have flexibility due to portions having a relatively small thickness among the multiple support bars. In some embodiments, the multi-bar structure may be provided without a connecting portion between two neighboring support bars. The multi-bar structure may also be referred to by another term such as "flexible track". The display support structure 2420 may include a metallic material, such as stainless steel, and/or a non-metallic material, such as a polymer. The support sheet 2410 corresponding to the second area ⓑ of the flexible display module 24 may provide a lattice structure including multiple openings, but, compared to a comparative example in which the support sheet 2410 is omitted, the phenomenon in which the multiple support bars of the multi-bar structure protrude through the flexible display module 24 to be visible may be reduced or prevented.

According to various embodiments, the display support structure 2420 may serve as the support sheet 2410, in which case the support sheet 2410 may be omitted.

According to various embodiments, the support sheet 2410 may be defined or interpreted as a display support structure different from the display support structure 2420.

According to various embodiments, the support sheet 2410 may be defined or interpreted as a portion of display support structure 2420.

According to an embodiment, in order to reduce friction between the display support surface (e.g., the first support surface 22A and the second support surface 22B) of the second housing 22 and the display support structure 2420, a lubricant (e.g., grease) may be disposed (e.g., applied) between the display support surface of the second housing 22 and the display support structure 2420. In some embodiments, a lubricating coating (e.g., a coating using various lubricating materials such as Teflon) may be formed on the display support surface of the second housing 22 or the surface of the display support structure 2420.

According to an embodiment, the display assembly 50 or the flexible display module 24 may include a display driving circuit 2401. The display driving circuit 2401 may include, for example, a display drive integrated circuit (DDI) or a DDI chip. The display driving circuit 2401 may be disposed on the flexible display 240 using a chip-on panel (COP) method. The flexible display module 24 may include a third area ⓒ extending from the first area ①. The third area ⓒ may extend from, for example, the first area ⓐ of the flexible display module 24 on the side of the first side wall 201. The third area ⓒ may be bent to be positioned between the support sheet 2410 and the first support portion 2111 of the first housing 21 so as to be disposed on the support sheet 2410. An adhesive material or bonding material may be disposed between the third area ⓒ and the support sheet 2410. When the support sheet 2410 is not expanded to the rear surface of the first area ⓐ or the support sheet 2410 is omitted, the third area ⓒ may be disposed on the lower panel 243 of the flexible display 240 using an adhesive material or bonding material. The display driving circuit 2401 is disposed in the third area ⓒ. The third area ⓒ may be electrically connected to the first printed circuit board 45 via a flexible printed circuit board 2402. The flexible printed circuit board 2402 may be penetrated through an opening (not illustrated) provided in the first support portion 2111 of the first housing 21 to be electrically connected to the first printed circuit board 45 disposed on the surface of the first support portion 2111 facing the rear surface of the slidable electronic device 2. In an embodiment, a touch sensor integrated circuit (IC) 2303 electrically connected to a touch-sensitive circuit included in the flexible display module 24 may be further disposed on the flexible printed circuit board 2402. The touch sensor IC 2403 may be positioned between the rear surface of the first area ⓐ and the first surface 2111*a* of the first support portion 2111. In some embodiments, the display driving circuit 2401 may be disposed on the flexible display module 24 using a chip-on film (COF) method. For example, the third area ⓒ of the flexible display module 24 may be a flexible film board electrically interconnecting the display panel 241 (see FIGS. 4A and 4B) and the flexible printed circuit board electrically connected to the first printed circuit board 45. The display driving circuit 2401 may be disposed on the film board. Hereinafter, the third area ⓒ, the display driving circuit 2401, the flexible printed circuit board 2402, and the touch sensor IC 2403 of the flexible display module 24 may be referred to as a "display circuit part 2404".

According to an embodiment, the first guide rail 41 and the second guide rail 42 may guide the movement of the display support structure 2420. The first guide rail 41 may include a first rail part on which one side portion of the display support structure 2420 is positioned such that its movement is guided. The second guide rail 42 may include a second rail part on which the other side portion of the display support structure 2420 is positioned such that its movement is guided. The first rail part and the second rail part may each include, for example, a recess which provides a pattern corresponding to the movement path of the display assembly 50 during the sliding of the second housing 22 relative to the first housing 21. The first guide rail 41 may be positioned between the second frame 221 of the second housing 22 and the fifth side wall 205 of the third housing 23, and may be disposed on the second frame 221 using a method such as screw fastening. The second guide rail 42 may be positioned between the second frame 221 of the second housing 22 and the sixth side wall 206 of the third housing 23, and may be disposed on the second frame 221 using a method such as screw fastening. The first guide rail 41 may be coupled to the fifth side wall 205 of the third housing 23 using a method such as screw fastening. The second guide rail 42 may be coupled to the sixth side wall 206 of the third housing 23 using a method such as screw fastening.

In an embodiment, referring to FIGS. 6 and 7, the multiple support bars included in the display support structure 2420 may each include a first support portion 2421*a* which supports a first edge area (or first border area) 611 of the flexible display module 24 positioned corresponding to the first guide rail 41. The multiple support bars may each include a first pin 2421*b* extending from the first support portion 2421*a* and inserted into the first rail part of the first guide rail 41. The multiple support bars may each include a second support portion (not illustrated) which supports a second edge area (or second border area) (not illustrated) of the flexible display module 24 positioned corresponding to the second guide rail 42, and a second pin (not illustrated) extending from the second support portion and inserted into the second rail part of the second guide rail 42. In some embodiments, an integrated metallic or non-metallic member including the first support portion 2421*a* and the first pin 2421*b*, and an integrated metallic or non-metallic member including the second support portion and the second pin may be provided separately and may be coupled with a support bar.

According to various embodiments, the fifth side wall 205 of the third housing 23 may be implemented to include the first guide rail, in which case the first guide rail 41 may be omitted. The sixth side wall 206 of the third housing 23 may be implemented to include the second guide rail, in which case the second guide rail 42 may be omitted.

According to an embodiment, the sliding driver 43 may include a motor assembly 431, a bracket (or motor bracket) 432, a circular gear (or round gear) 433, and/or a linear gear (or linear gear structure) 434.

According to an embodiment, the motor assembly 431 may provide power (or driving force) for sliding the second housing 22 relative to the first housing 21. The motor assembly 431 may be disposed on the second frame 221 of the second housing 22. The motor assembly 431 may be disposed on, for example, one surface of the second frame 221 facing the rear surface of the slidable electronic device 2. The motor assembly 431 may be disposed on the second frame 221 between the second frame 221 and the second cover 222. The motor assembly 431 may provide power for sliding the second housing 22 relative to the first housing 21. When the second housing 22 is slid relative to the first housing 21 due to the power provided by the motor assembly 431, there may be a relative position change between the first guide rail 41 and one side portion of the structure 2420 positioned on the first guide rail 41, and a relative position change between the second guide rail 42 and the other side of the display support structure 2420 positioned on the second guide rail 42. Since the flexible display assembly 50 is coupled to the first support portion 2111 of the first housing 21, the relative position change between the first housing 21 and the second housing 22, the relative position change between the first guide rail 41 and the one side of the display support structure 2420, and the relative position change between the second guide rail 42 and the other side of the display support structure 2420 may act as a force to move the portion of the display support structure 2420 on which the second area ⓑ of the flexible display module 24 is disposed.

According to an embodiment, the motor assembly 431 may include a motor and a gear structure operatively connected to the motor. The motor may include, for example, a step motor. The motor may be implemented in various other types, and there are no restrictions on its configuration. The gear structure may operatively interconnect, for example, the motor and the circular gear 433 between the motor and the circular gear 433. The gear structure may be connected to a first rotation shaft (or first shaft or input shaft) of the motor. The gear structure may be connected to a second rotation shaft (or second shaft or output shaft) of the circular gear 433 or may include a second rotation shaft connected to the circular gear 433. The first rotation shaft and the second rotation shaft may be substantially parallel to the third direction ③. The rotation center line of the first rotation shaft and the rotation center line of the second rotation shaft may substantially coincide. In some embodiments, the center line of the first rotation shaft and the center line of the second rotation shaft may be spaced apart and parallel to each other. In some embodiments, the first rotation shaft and the second rotation shaft may not be parallel to each other, and accordingly, the motor assembly 431 may be modified and positioned differently from the illustrated example. For example, the first rotation shaft and the second rotation shaft may be orthogonal (or intersect), and the gear structure may be implemented to transmit power or motion from the first rotation shaft to the second rotation shaft using conical gears (e.g., bevel gears). In an embodiment, the gear structure may include a reduction gear. The gear structure may, for example, allow the second rotation shaft to rotate at a slower rotation speed or smaller number of rotations than the first rotation shaft. The gear structure may reduce the power of the first rotation shaft to increase the torque of the second rotation shaft. The gear structure (e.g., a reduction gear) may contribute to stable sliding of the second housing 22 relative to the first housing 21 by increasing torque while reducing the speed of the second rotation shaft relative to the first rotation shaft. The power for sliding the second housing 22 relative to the first housing 21 is output from the second rotation shaft, and the second rotation shaft may be defined or interpreted as the rotation shaft, driving shaft, or power transmission shaft of the sliding driver 43. In some embodiments, the circular gear 433 may be defined or interpreted as a portion of the gear structure. In some embodiments, the motor may be implemented as an integrated form including the gear structure. In some embodiments, the gear structure may be omitted, in which case the first rotation shaft of the motor may be connected with the circular gear 433.

According to an embodiment, the motor assembly 431 may be disposed on (or connected to) the second frame 221 of the second housing 22 using the bracket 432. The bracket 432 may contribute to ensuring that the motor assembly 431 is stably positioned on the second frame 221. The bracket 432 may contribute to the durability of motor assembly 431. In an embodiment, the bracket 432 may be coupled to the gear structure of the motor assembly 431 and may be coupled to the second frame 221 using screw fastening. For example, the circular gear 433 may be accommodated in the bracket 432, and the rotation shaft of the circular gear 433 may be rotatably supported on the bracket 432. The bracket 432 is an element for stably positioning the motor assembly 431 on the second frame 221, and may be referred to by various other terms such as "connection structure", "connection member", "motor assembly support member", "motor assembly support structure", or "frame".

According to an embodiment, the circular gear 433 may include a rotation body in the shape of a circular cylinder or a disk, and multiple gear teeth provided along the circumference of the rotation body. The linear gear 434 may be a gear structure in which multiple gear teeth are arranged linearly in the first direction ① (e.g., the slide-out direction). The linear gear 434 may be, for example, in the form of a plate including one surface including multiple gears and another surface positioned opposite to the one surface. The linear gear 434 may be disposed on the first support portion 2111 of the first housing 21. The linear gear 434 may be disposed on the second surface 2111b of the first support portion 2111 using various methods such as screw fastening or bonding. The circular gear 433 and the linear gear 434 may be in an engaged state. The circular gear 433 may perform rotation movement by driving the motor assembly 431, and the linear gear 434, which is engaged with the circular gear 433, may perform linear movement. The rotation movement of the circular gear 433 may be converted into the linear movement of the linear gear 434 to provide mutual sliding between the first housing 21 coupled with the linear gear 434 and the second housing 22 coupled with the motor assembly 431. When viewed from above the front surface of the slidable electronic device 2 (e.g., when viewed in the −z-axis direction), the area where the second housing 22 covers the first support portion 2111 of the first housing 21 and the linear gear 434 disposed on the first support portion 2111 may decrease when the second housing 22 slides out and increase when the second housing 22 slides in.

In some embodiments, the circular gear 433 may be referred to as "pinion" or "pinion gear", and the linear gear 434 may be referred to as "rack" or "rack gear". The circular gear 433 and the linear gear 434 may be made of a material (e.g., metal or engineering plastic) which has rigidity or strength sufficient to resist substantial deformation against the force acting on the mutual sliding between the first housing 21 and the second housing 22.

According to various embodiments, the first support portion 2111 of the first housing 21 may be provided in an integrated form including the linear gear 434.

According to an embodiment, in order to reduce the loss of movement transmission or power transmission, a lubricant (e.g., grease) may be placed between the circular gear 433 and the linear gear 434 to ensure smooth movement and/or durability between the circular gear 433 and the linear gear 434. In some embodiments, the circular gear 433 and/or the linear gear 434 may be lubricated with a coating (e.g., a coating using various lubricating materials such as a Teflon coating) to reduce friction during movement.

According to various embodiments, the motor assembly 431 and circular gear 433 may be disposed on the first support portion 2111 of the first housing 21 using the bracket 432, and the linear gear 434 may be disposed in the second housing 22.

According to an embodiment, the slidable electronic device 2 may include a motor-driving circuit (e.g., a motor controller or a motor driver) electrically connected to the motor assembly 431. The motor-driving circuit may control the motor assembly 431 based on a control signal received from a processor (e.g., the processor 120 in FIG. 1), and the rotation direction, rotation angle, rotation amount, rotation speed, rotation acceleration, or rotation angular speed of the circular gear 433 operatively connected to the motor assembly 431 may be adjusted. In an embodiment, the motor-driving circuit may include a motor encoder for detecting the driving state of the motor. The motor encoder may include, for example, a disk coupled to the rotation shaft of the motor, and a detector capable of electronically detecting the scale and markings provided on the disk to determine the rotation direction, rotation angle, rotation amount, rotation speed, rotation acceleration, or rotation angular velocity of the rotation shaft. The processor may control the motor-driving circuit based on instructions related to mutual sliding between the first housing 21 and the second housing 22 stored in memory (e.g., the memory 130 in FIG. 1).

When the slidable electronic device 2 switches from the closed state (see FIGS. 2A to 2F) to the open state (see FIGS. 3A to 3F) or from the open state to the closed state, if the sliding speed (or movement speed) of the second housing 22 relative to the first housing 21 is not zero at the completion of the state switching, a collision phenomenon may occur in which the relatively moving first housing 21 and second housing 22 strongly interact for a relatively short period of time. The collision phenomenon may make it difficult to provide a smooth sliding motion to the user, or the impact due to the collision phenomenon may cause damage to the components (or driving elements) included in the sliding driver 43. In an embodiment, the slidable electronic device 2 may control the rotation speed of the circular gear 433 to reduce collision phenomenon by controlling the motor-driving circuit. For example, when the slidable electronic device 2 is switched from the closed state to the open state, or from the open state to the closed state, the rotation speed of the circular gear 433 may be controlled such that the second housing 22 can reduce its sliding speed relative to the first housing 21 and stop at the completion of state switching.

According to an embodiment, the slidable electronic device 2 may include a sliding structure for stable and smooth sliding between the first housing 21 and the second housing 22. The sliding structure may include, for example, a linear motion (LM) guide interconnecting the first housing 21 and the second housing 22. Through the LM guide, the second housing 22 can be smoothly and seamlessly moved linearly in the first direction ① or the second direction ② relative to the first housing 21. The LM guide may include, for example, a rail, a block, and/or a bearing. The rail may be in the form of a bar extending from a first end to a second end in the direction in which the second housing 22 slides relative to the first housing 21 (e.g., the first direction ①). The rail and the block may be slidably coupled to each other. The bearing may be positioned between the rail and the block to reduce friction between the rail and the block. The bearing may include, for example, multiple bearing balls and a retainer. In some embodiments, the block may be provided in a form which includes a bearing. In an embodiment, although not illustrated, the slidable electronic device 2 may include a first LM guide and a second LM guide. A first end of the rail of the first LM guide may be coupled to the second side wall 202 of the first housing 21, and the block of the first LM guide may be disposed on (or coupled to) one surface of the second frame 221 of the second housing 22 corresponding to the first guide rail 41. The first guide rail 41 may include a first recess 411 provided corresponding to the rail of the first LM guide. When the second housing 22 coupled with the block of the first LM guide slides out or slides in relative to the first housing 21 coupled with the rail, the first recess 411 may ensure that the first guide rail and the rail of the first LM do not interfere with each other. A first end of the rail of the second LM guide may be coupled to the third side wall 203 of the first housing 21, and the block of the second LM guide may be disposed on (or coupled to) one surface of the second frame 221 of the second housing 22 corresponding to the second guide rail 42. The first LM guide and the second LM guide may be symmetrically arranged with respect to the center line C (see FIGS. 2A to 2F and 3A to 3F) of the slidable electronic device 2 when viewed from above the rear surface of the slidable electronic device 2 (e.g., when viewed in the +z-axis direction). The center line C of the slidable electronic device 2 may be positioned between a second edge E2 and a third edge E3 of a screen when viewed from above (e.g., in the −z axis direction), and may be an imaginary straight line positioned at substantially the same distance from the second edge E2 and the third edge E3. The second guide rail 42 may include a second recess 421 provided corresponding to the rail of the second LM guide. When the second housing 22 coupled with the block of the second LM guide slides out or slides in relative to the first housing 21 coupled with the rail, the second recess 421 may ensure that the second guide rail and the rail of the second LM do not interfere with each other. Depending on the relative position between the first housing 21 and the second housing 22, the extent to which the rail of the first LM guide is positioned in the first recess 411 of the first guide rail 41, and the extent to which the rail of the second LM guide is positioned in the second recess 421 of the second guide rail 42, may vary.

According to various embodiments, the rails of the LM guides may be coupled to the first support portion 2111 of the first housing 21.

According to various embodiments, the rails of the LM guides may be coupled to the second frame 221 of the second housing 22, and the blocks of the LM guides may be coupled to the first frame 211 of the first housing 21.

The structure for smooth mutual sliding between the first housing 21 and the second housing 22 may be provided in various other ways. The inner space of the slidable electronic device 2 may increase when the second housing 22 slides out, and may decrease when the second housing 22 slides in. The components accommodated in the inner space of the slidable electronic device 2 may be positioned so as not to interfere with the mutual sliding between the first housing 21 and the second housing 22.

According to an embodiment, the slidable electronic device 2 may include a tension device for smoothly and seamlessly sliding the second housing 22 relative to the first housing 21. The tension device may enable smooth and seamless sliding by ensuring that the movement or force between the driving elements related to the sliding of the second housing 22 relative to the first housing 21 is smoothly transmitted. The tension device may enable smooth and seamless sliding of the slidable electronic device 2, thereby reducing the stress effect on the driving elements to reduce or prevent the damage to the driving elements.

According to an embodiment, the battery 44 may be positioned between the second frame 221 of the second housing 22 and the third support portion 2311 of the third housing 23. The battery 44 may be disposed on the second frame 221. For example, the second frame 221 may include a battery seating structure provided on one surface facing the rear surface of the slidable electronic device 2. The battery seating structure may include, for example, a fitting structure or a recess structure which allows the battery 44 to be stably positioned in the second housing 22. The battery 44 is a device for supplying power to at least one component of the slidable electronic device 2 and may include, for example, a non-rechargeable primary battery, a rechargeable secondary battery, or a fuel cell.

According to various embodiments, the slidable electronic device 2 may further include an additional battery disposed in the first housing 21.

According to an embodiment, the first printed circuit board 45 may be positioned between the first support portion 2111 and the first cover 212 of the first housing 21. The first printed circuit board 45 may be disposed on the first support portion 2111 of the first housing 21. One surface of the first support portion 2111 facing the rear surface of the slidable electronic device 2 may provide a board seating structure. The board seating structure may include a fitting structure or a recess structure which allows the first printed circuit board 45 to be stably positioned on the first support portion 2111. The first printed circuit board 45 may be disposed on the board seating structure using various methods such as screw fastening. Various electronic components (e.g., some of the components in FIG. 1) may be disposed on the first printed circuit board 45. Various components electrically connected to the first printed circuit board 45 may be disposed in the first housing 21. For example, components such as the second camera module 305 or the third camera module 306 may be disposed on the first support portion 2111 between the first support portion 2111 and the first cover 212.

According to an embodiment, the second printed circuit board 46 may be positioned between the third support portion 2311 and the third cover 232 of the third housing 23. The second printed circuit board 46 may be disposed on the third support portion 2311 of the third housing 23. The surface of the third support portion 2311 facing the third cover 232 may include the board seating structure. The board seating structure may include a fitting structure or a recess structure which allows the second printed circuit board 46 to be stably positioned on the third support portion 2311. The second printed circuit board 46 may be disposed on the board seating structure using various methods such as bonding or screw fastening. Various electronic components (e.g., some of the components in FIG. 1) may be disposed on the second printed circuit board 46. The first printed circuit board 45 or the second printed circuit board 46 may include, for example, a printed circuit board (PCB), a flexible PCB (FPCB), or a rigid-flexible PCB (RFPCB). The second printed circuit board 46 may be electrically connected to the first printed circuit board 45 using an electrical connection member. For example, the first printed circuit board 45 may be electrically connected to the second printed circuit board 46 via a flexible RF cable (FRC).

According to an embodiment, the antenna structure 47 may be at least partially positioned between the third support portion 2311 of the third housing 23 and the third cover 232. The antenna structure 47 may be disposed on the third support portion 2311 of the third housing 23, or may be disposed on the third cover 232. The position of the antenna structure 47 is not limited to this and may vary. The antenna structure 47 may be implemented, for example, in the form of a film such as an FPCB. The antenna structure 47 may include at least one conductive pattern used as a loop-type radiator. For example, the at least one conductive pattern may include a planar spiral conductive pattern (e.g., a planar coil or pattern coil). In an embodiment, the at least one conductive pattern included in the antenna structure 47 may be electrically connected to a wireless communication circuit (e.g., the wireless communication module 192 in FIG. 1) disposed on the first printed circuit board 45 or the second printed circuit board 46. For example, the at least one conductive pattern may be utilized for short-range wireless communication such as near-field communication (NFC). As another example, the at least one conductive pattern may be utilized for magnetic secure transmission (MST) for transmitting and/or receiving magnetic signals. In some embodiments, the at least one conductive pattern included in the antenna structure 47 may be electrically connected to a power transmission/reception circuit disposed on the first printed circuit board 45 or the second printed circuit board 46. The power transmission/reception circuit may wirelessly receive power from an external electronic device or wirelessly transmit power to an external electronic device using the at least one conductive pattern. The power transmission/reception circuit may include a power management module and may include, for example, a power management integrated circuit (PMIC) or a charger integrated circuit (IC). The power transmission/reception circuit may charge the battery 44 using power wirelessly received using the conductive pattern.

According to various embodiments, a processor (e.g., the processor 120 in FIG. 1) electrically connected to a wireless communication circuit (e.g., the wireless communication module 192 in FIG. 1) may perform a positioning function (e.g., angle of arrival (AOA)) for a signal source (e.g., a responder, transmitter, or transmitter (Tx) device) using the antenna structure 47. The processor may simultaneously perform positioning which measures an angle (AOA) and ranging which measures a distance (ranging). In an embodiment, the processor may determine (or estimate) the distance between the slidable electronic device 2 and a signal source using at least one antenna element (e.g., a first antenna element, a second antenna element, and/or a third antenna element) included in the antenna structure 47. In an embodiment, the processor may determine or estimate a reception angle of a signal with respect to a configured axis of the slidable electronic device 2 (e.g., the direction of a signal) using at least one of a difference in arrival times of response messages to request messages, a difference in arrival distances between received signals, or a phase difference the received signals through at least two antenna elements included in the antenna structure 47. The slidable electronic device 2 may support the positioning function using a wide bandwidth (e.g., ultra-wide band (UWB)). For example, the UWB may refer to a technology which communicates over a wide bandwidth and follows the international standard of IEEE 802.15.4. In an embodiment, the processor may determine or estimate the position of a signal source (e.g., a responder, transmitter, or Tx device) relative to the slidable electronic device 2 (e.g., an initiator, receiver, or Rx device) using the phase difference of the signals received through multiple antenna elements included in the antenna structure 47. The antenna structure 47 may be provided as a printed circuit board (e.g., a flexible printed circuit board (FPCB)) and may be, for example, a patch antenna which includes multiple patches (e.g., a first antenna element, a second antenna element, and a third antenna element).

According to an embodiment, the support member (or support, support portion, or support structure) 48 may be positioned between the first support portion 2111 and the first cover 212 of the first housing 21. The support member 48 may be disposed on the first frame 211 of the first housing 21. The support member 48 may cover and protect at least a portion of the first printed circuit board 45 disposed on the first support portion 2111. In some embodiments, the first frame 211 of the first housing 21 may be referred to as a "front case", and the support member 48 may be referred to as a "rear case". In some embodiments, the support member 48 may be interpreted as a portion of the first housing 21. In an embodiment, the support member 48 may include a metal material and may reduce electromagnetic interference (EMI) related to components such as the first printed circuit board 45 positioned in the first housing 21. In some embodiments, the support member 48 may include a non-metallic material. In some embodiments, a conductive pattern used as an antenna radiator may be disposed on the non-conductive support member 48.

According to an embodiment, the flexible printed circuit board 49 may electrically interconnect components positioned in the first housing 21 and components positioned in the second housing 22. The flexible printed circuit board 49 may be disposed to be bent depending on the relative position between the first housing 21 and the second housing 22.

Figure 9:
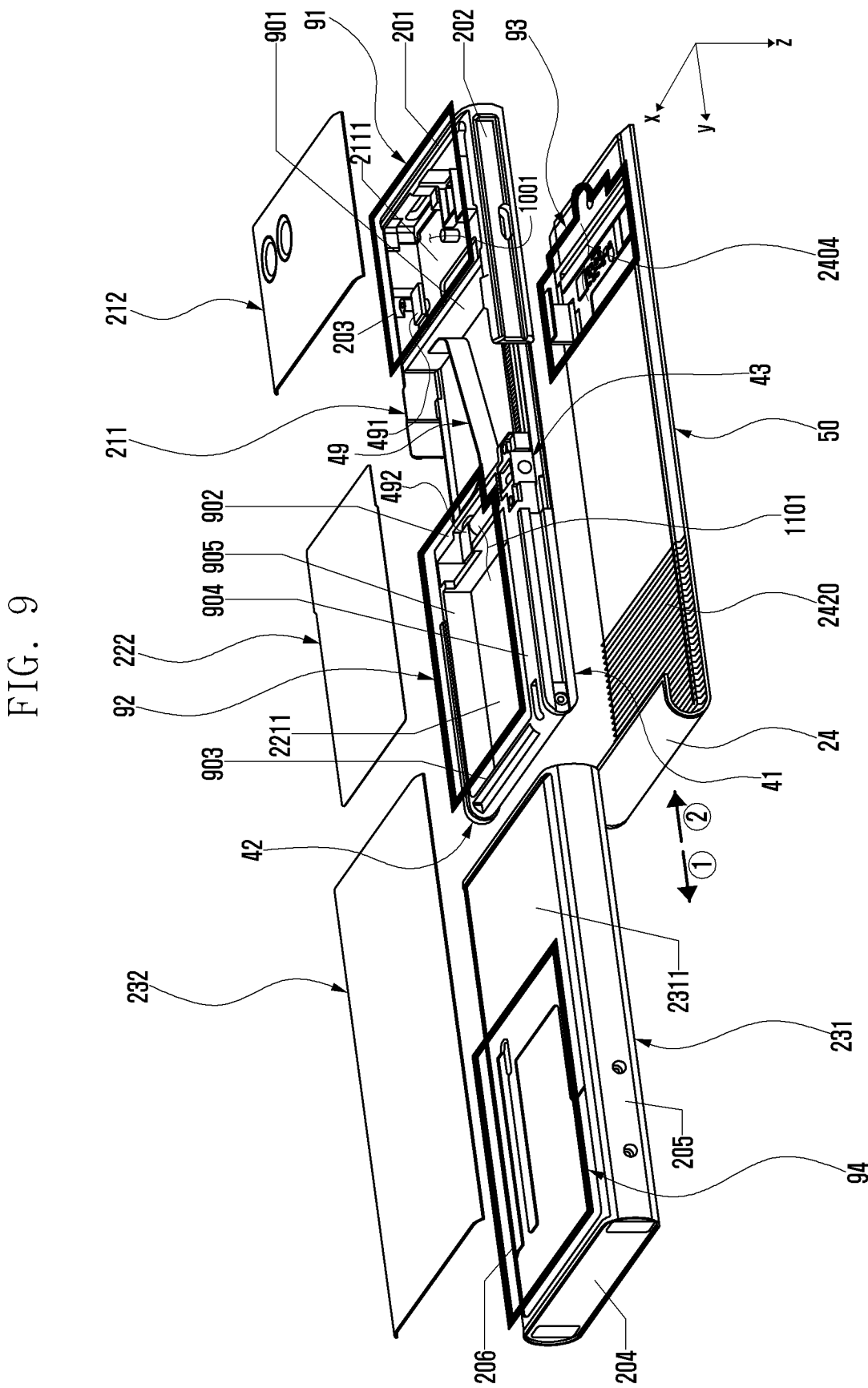
FIGS. 9 and 10 are exploded perspective views each illustrating a slidable electronic device according to an embodiment of the disclosure.
Figure 10:
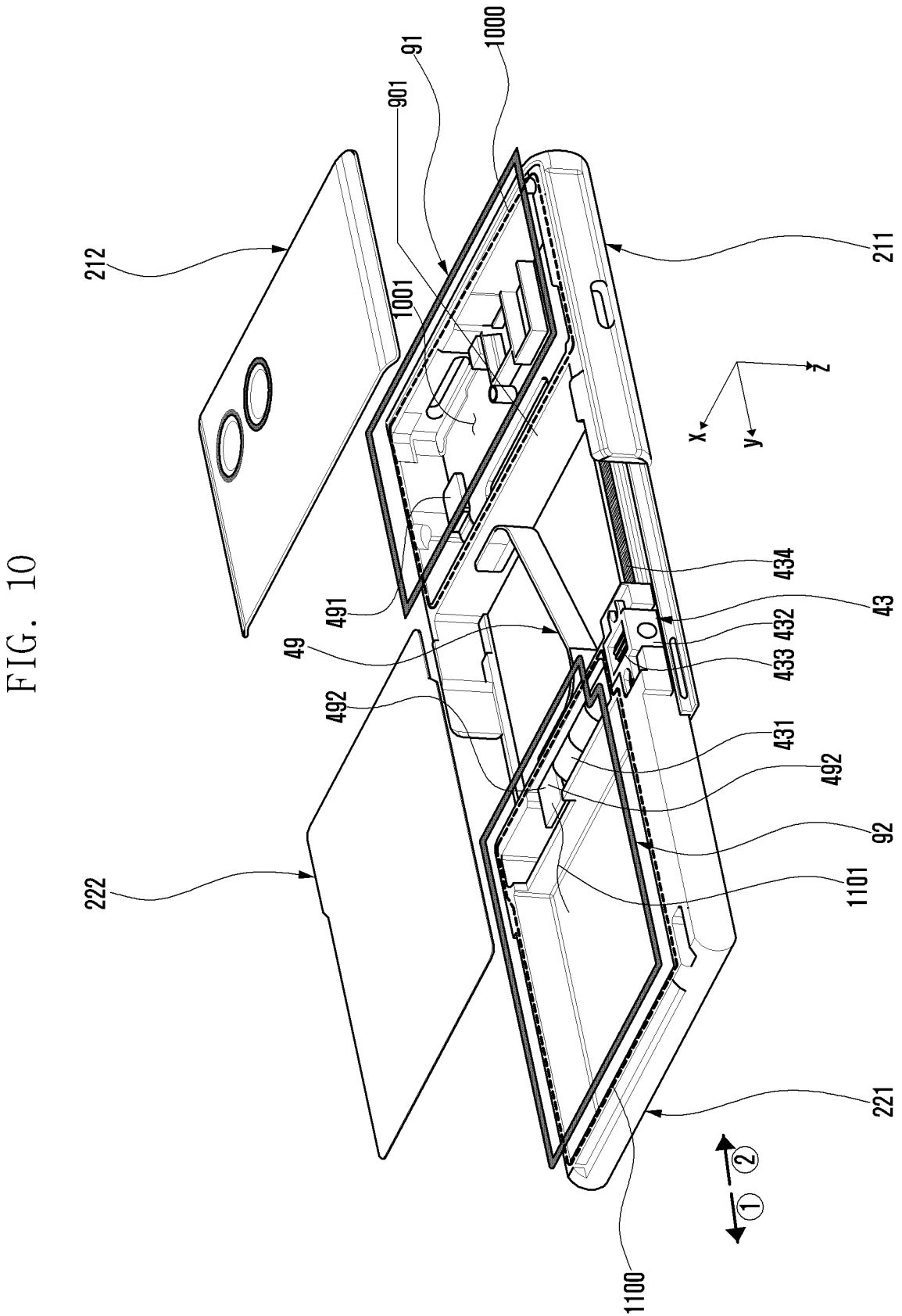
Figure 11:
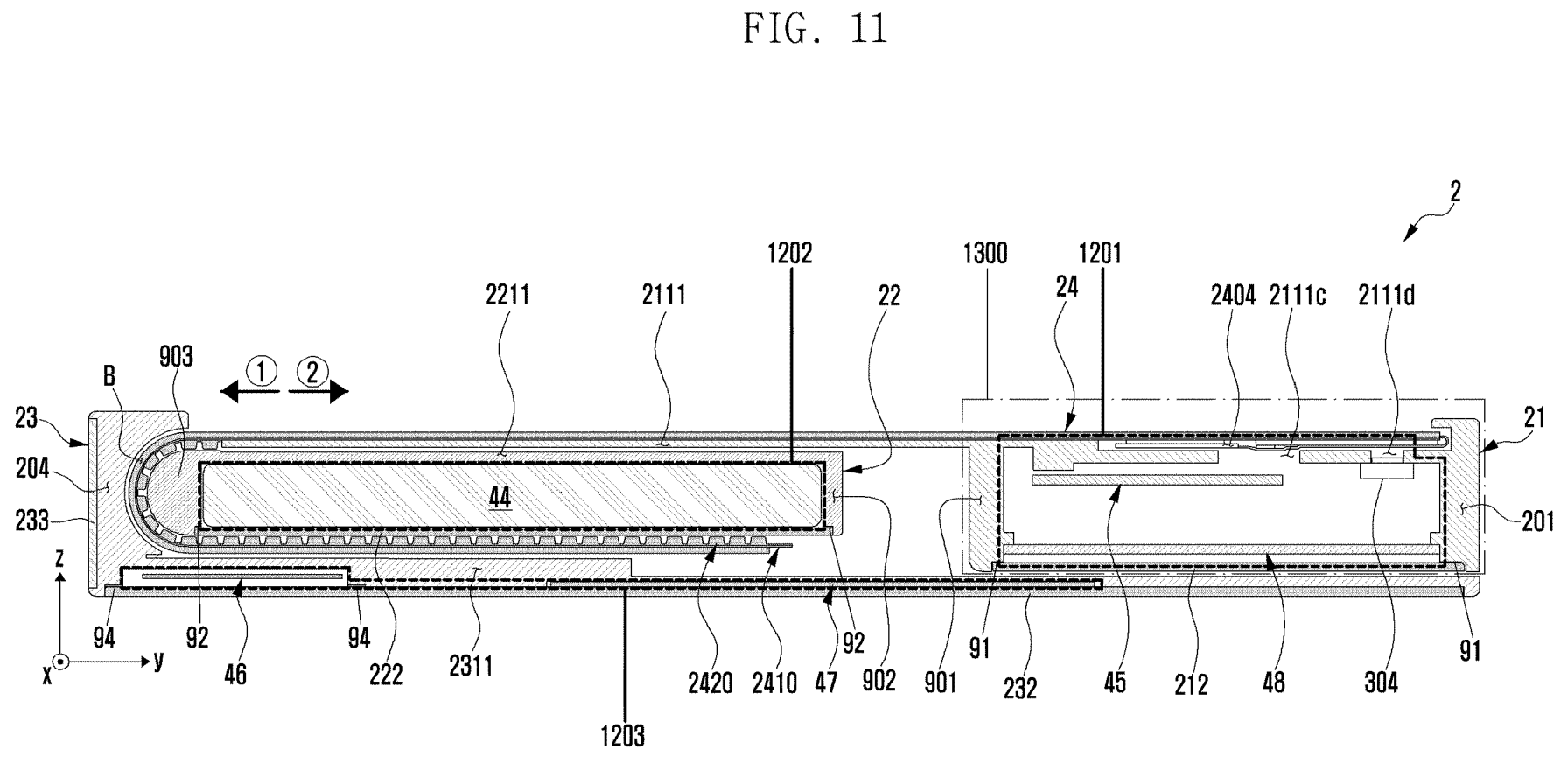
Figure 12:
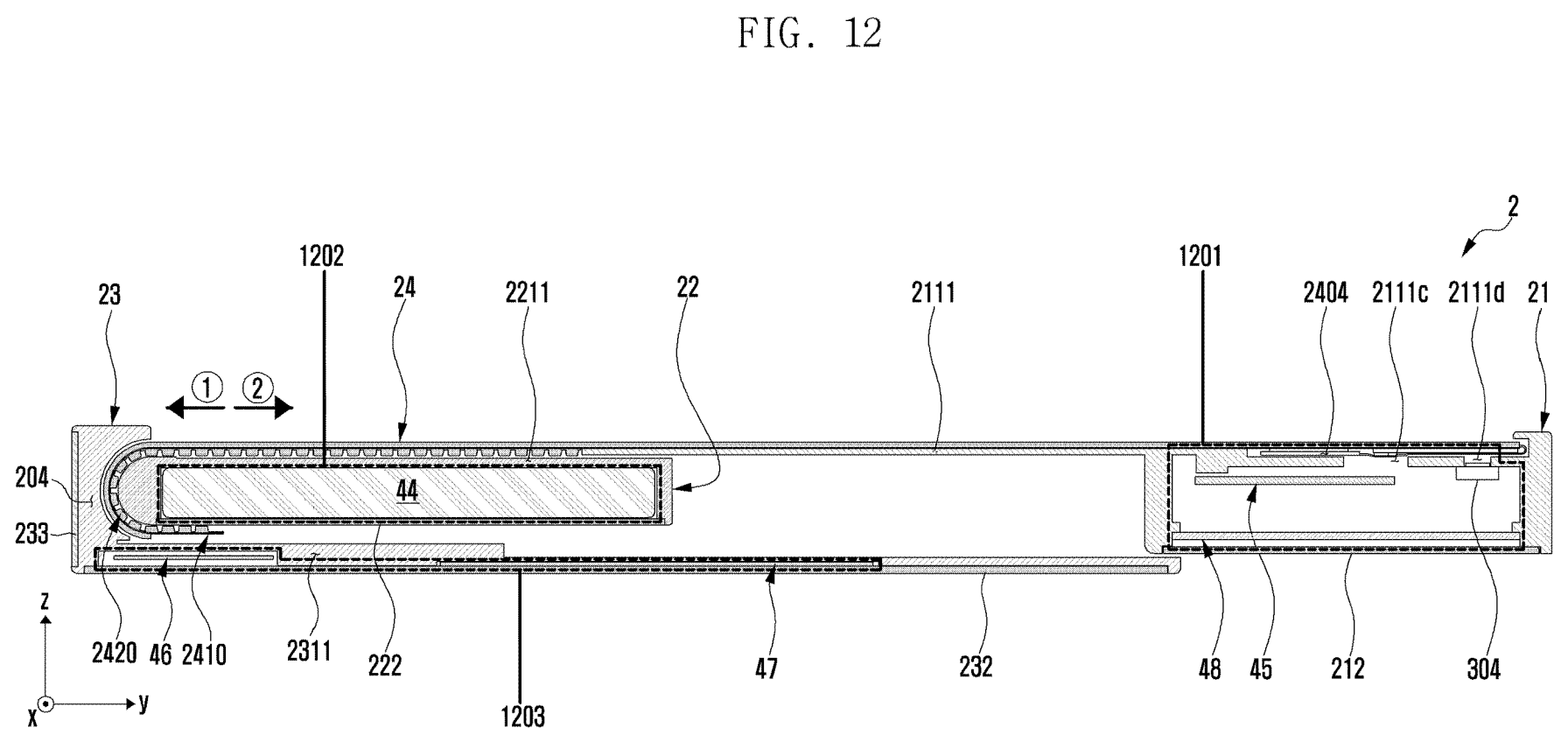
Figure 13:
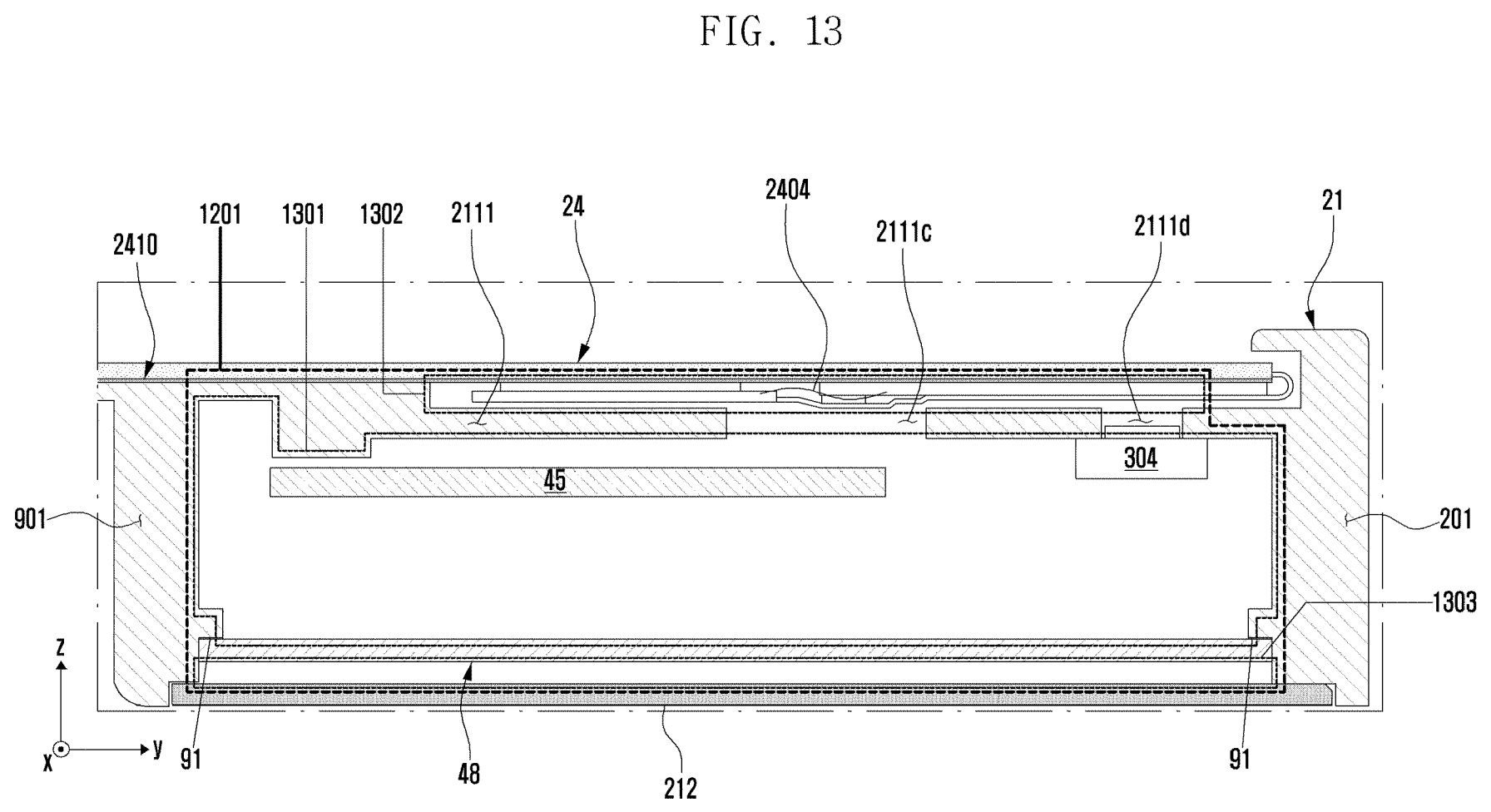
Figure 14:
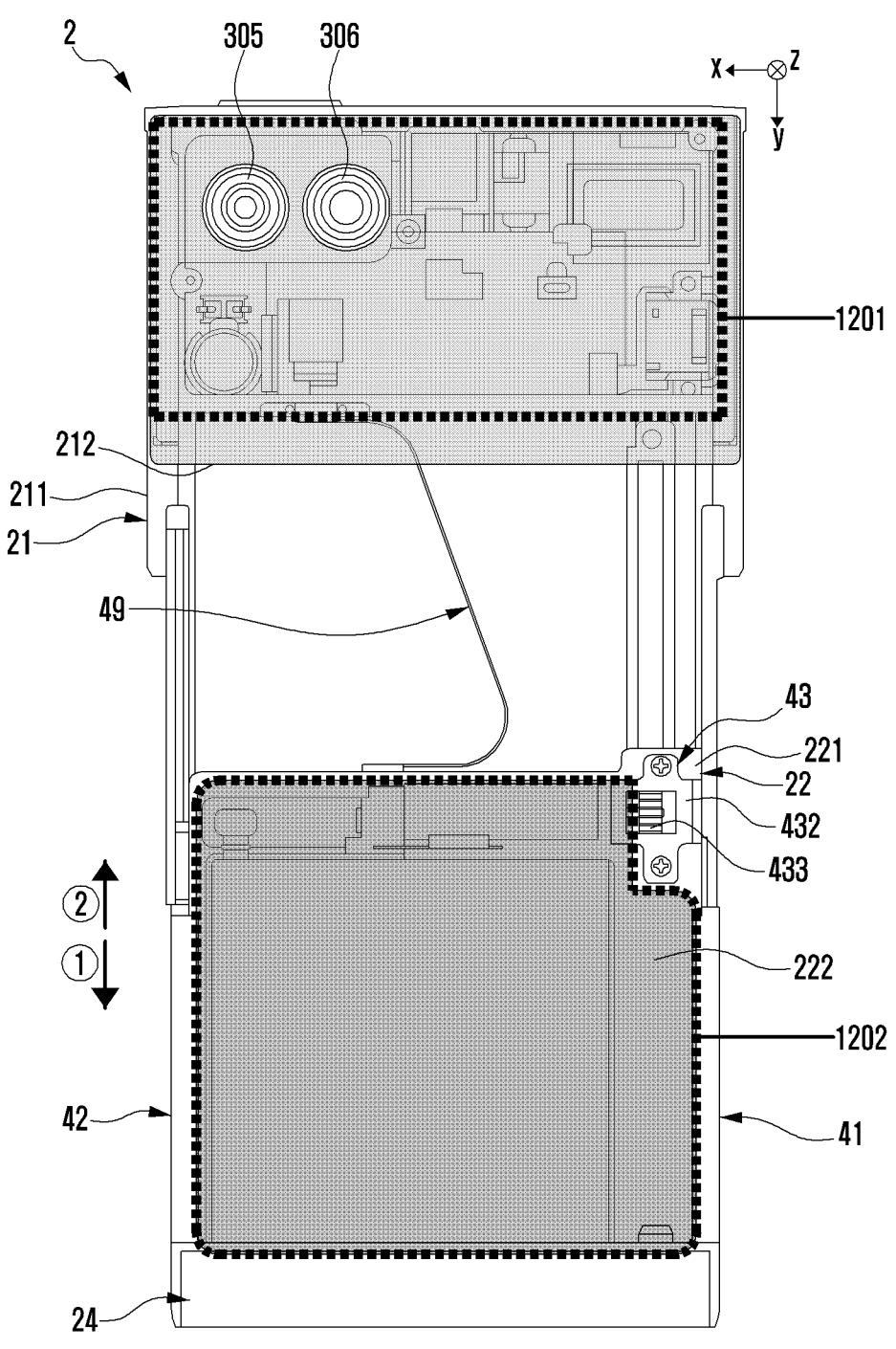
FIG. 14 is a plan view illustrating a slidable electronic device according to an embodiment of the disclosure.

FIGS. 9 and 10 are partially exploded perspective views of a slidable electronic device 2 according to an embodiment of the disclosure. FIG. 11 is a cross-sectional view of the slidable electronic device 2 according to an embodiment of the disclosure taken along line A-A' in FIGS. 2A to 2F. FIG. 12 is a cross-sectional view of the slidable electronic device 2 according to an embodiment of the disclosure taken along line B-B' in FIGS. 3A to 3F. FIG. 13 is an enlarged view of the portion indicated by reference numeral "1300" in FIG. 11, in an embodiment of the disclosure. FIG. 14 is a view illustrating the slidable electronic device 2 according to an embodiment of the disclosure.

Referring to FIGS. 9, 10, 11, 12, 13, and 14, the slidable electronic device 2 may include a first frame 211, a first cover 212, a support member (or rear case) 48, a second frame 221, a second cover 222, a third frame 231, a third cover 232, a first guide rail 41, a second guide rail 42, a display assembly 50, a sliding driver 43, a flexible printed circuit board 49, a first waterproof member (or first seal member) 91, a second waterproof member (or second seal member) 92, a third waterproof member (or third seal member) 93, and/or a fourth waterproof member (or fourth seal member) 94.

According to an embodiment, the first frame 211 may include a first wall (or first inner wall) 901 interconnecting a second side wall 202 and a third side wall 203. The first wall 901 may extend from a first support portion 2111 of the first frame 211 in a direction where the rear surface of the slidable electronic device 2 is oriented (e.g., the −z-axis direction). The first wall 901 may be substantially parallel to a first side wall 201 when viewed from above the rear surface of the slidable electronic device 2 (e.g., when viewed in the +z-axis direction). The first wall 901 may be positioned to be spaced apart from the first side wall in a first direction ①. The first side wall 901 may be positioned so as not to interfere with a second frame 221 when the second housing 22 is slid relative to a first housing 21 in a predetermined section. The first frame 211 may have a first wall structure 1000 provided by a combination of the first side wall 201, the second side wall 202, the third side wall 203, and the first wall 901. Due to the combination of the first wall structure 1000 and the first support portion 2111, the first frame 211 may provide a first space 1001 in the form of a recess into which components such as a first printed circuit board 45 may be accommodated. Without being limited to the illustrated example, the shape of the first space 1001 may vary, and the shape of the corresponding first wall structure 1000 or first support portion 2111 may vary. Various components, such as a printed circuit board, may be positioned in the first space 1001. The first cover 212 may be disposed on the first wall structure 1000. The first wall structure 1000 may extend from the first support portion 2111 in a direction in which the rear surface of the slidable electronic device 2 is oriented (e.g., the −z-axis direction), and its end coupled with the first cover 212 may be provided in the form of a substantially closed loop. The first wall structure 1000 may include a first cover placement area at the end coupled with the first cover 212. The first cover placement area may be provided corresponding to a border area of the first cover 212. The first cover placement area may be, for example, a stepped portion provided on the first wall structure 1000 such that the first cover 212 can be fitted and stably seated on the first wall structure 1000. As another example, the first cover placement area may be provided as a substantially planar area (or planar portion). The first cover 212 may be placed in the first cover placement area using screw fastening. As another example, the first cover 212 may be placed in the first cover placement area using snap-fit fastening (e.g., a manner in which a hook is fastened to a hook fastener). As another example, the first cover 212 may be placed in the first cover placement area via an adhesive member (or adhesive material) or a bonding member (or bonding material) disposed between the first cover 212 and the first cover placement area.

According to various embodiments, the first support portion 2111 may include a support structure such as a protrusion extending in a direction in which the rear surface of the slidable electronic device 2 is oriented (e.g., the −z-axis direction) so as to support the first cover 212.

According to an embodiment, the support member (or rear case) 48 may be disposed on the first wall structure 1000. The first wall structure 1000 may include a support member placement area corresponding to a border area of support member 48. The support member placement area may include, for example, a stepped portion provided on the first wall structure 1000 such that the support member 48 can be fitted and stably seated on the first wall structure 1000. The support member 48 may be placed in the support member placement area using screw fastening. As another example, the support member 48 may be placed in the support member placement area using snap-fit fastening (e.g., a manner in which a hook is fastened to a hook fastener). As another example, the support member 48 may be placed in the support member placement area via an adhesive member (or adhesive material) or a bonding member (or bonding material) disposed between the support member 48 and the support member placement area. In some embodiments, the first support portion 2111 of the first frame 211 may include a support structure such as a protrusion extending in a direction in which the rear surface of the slidable electronic device 2 is oriented (e.g., the −z-axis direction) so as to support the support member 48. In some embodiments, the support structure of the first support portion 2111 may include a screw fastening portion for screw fastening with the support member 48. The support member 48 may include a screw hole, and the screw fastening portion may be a boss including a female thread corresponding to the male thread of the screw corresponding to the screw hole. The screw may pass through the screw hole to be coupled to the screw fastening portion. The support member 48 disposed on the first wall structure 1000 may be at least partially positioned between the first cover 212 disposed on the first wall structure 1000 and the first support portion 2111 of the first frame 211. When viewed from above the rear surface of the slidable electronic device 2 (e.g., when viewed in the +z-axis direction), the first cover 212 may overlap the support member 48.

According to an embodiment, the slidable electronic device 2 may be provided with a first waterproof area (or first waterproof space) 1201 (see FIGS. 11, 12, 13, and 14) for the first housing 21. The first waterproof area 1201 may be a limited space between a first area ⓐ of the flexible display module 24 and the first cover 212. The first waterproof area 1201 may include, for example, a first partial waterproof area 1301, a second partial waterproof area 1302, and/or a third partial waterproof area 1303.

According to an embodiment, the first partial waterproof area 1301 may be a space limited by the first support portion 2111 of the first frame 211, the first wall structure 1000, and the support member (or rear case) 48. The first partial waterproof area 1301 may prevent a first circuit part positioned in the first partial waterproof area 1301 from being exposed to moisture, thereby reducing or preventing the first circuit part from malfunctioning or being damaged due to moisture. The first circuit part may include various electrical elements, such as a first printed circuit board 45.

According to an embodiment, the second partial waterproof area 1302 may be a limited space between the first area ⓐ of the flexible display module 24 and the first support portion 2111 of the first frame 211. The third waterproof member 93 may be disposed between the rear surface of the first area ⓐ of the flexible display module 24 and the first support portion 2111 of the first frame 211. The third waterproof member 93 may contribute to ensuring airtightness of the second partial waterproof area 1302 (or the first waterproof area 1201). The third waterproof member 93 may reduce or prevent moisture from flowing into the second partial waterproof area 1302 (or the first waterproof area 1201) through the space between the first area ⓐ of the flexible display module 24 and the first support portion 2111 of the first frame 211. The second partial waterproof area 1302 may prevent a second circuit part positioned in the second partial waterproof area 1302 from being exposed to moisture, thereby reducing or preventing the second circuit part from malfunctioning or being damaged due to moisture. The second circuit part may be at least a portion of the display circuit part 2404, but is not limited thereto. The third waterproof member 93 may include a flexible member such as rubber (e.g., a gasket), and may be elastically disposed between the first area (a) of the flexible display module 24 and the first support portion 2111 of the first frame 211 to increase airtightness. For another example, the third waterproof member 93 may be an adhesive member or a bonding member capable of coupling the first area (a) of the flexible display module 24 and the first support portion 2111 of the first frame 211.

According to an embodiment, the second partial waterproof area 1302 may include a recess provided in the first support portion 2111 of the first frame 211. The second circuit part (e.g., at least a portion of the display circuit part 2404) positioned in the second partial waterproof area 1302 may be inserted into the recess included in the first support portion 2111.

According to an embodiment, the third partial waterproof area 1303 may be a limited space between the support member (or rear case) 48 and the first cover 212. The first waterproof member 91 may be disposed between the first cover 212 and the first cover placement area of the first wall structure 1000. The first waterproof member 91 may contribute to ensuring airtightness of the third partial waterproof area 1303 (or the first waterproof area 1201). Referring to FIGS. 11 and 13, for example, the first waterproof member 91 may be disposed at an interface between the first cover 212 and the first cover placement area of the first wall structure 1000, such as at an overlapping area of the periphery of the first cover 212 and respective walls among the first side wall 201, the second side wall 202, the third side wall 203 and the first wall 901. The first waterproof member 91 may reduce or prevent moisture from flowing into the third partial waterproof area 1303 (or first waterproof area 1201) through the space between the first wall structure 1000 and the first cover 212. The third partial waterproof area 1303 may prevent a third circuit part positioned in the third partial waterproof area 1303 from being exposed to moisture, thereby reducing or preventing the third circuit part from malfunctioning or being damaged due to moisture. Between the non-conductive support member 48 or the non-conductive first cover 212, the third circuit part may include, for example, an antenna radiator disposed on the support member 48 or the first cover 212. Without being limited thereto, the third circuit part may include various other electrical elements such as a printed circuit board. The first waterproof member 91 may include a flexible member such as rubber (e.g., a gasket), and may be elastically disposed between the first cover 212 and the first wall structure 1000 to increase its airtightness. As another example, the first waterproof member 91 may be an adhesive member or bonding member capable of coupling the first cover 212 and the first wall structure 1000 to each other.

According to an embodiment, the first support portion 2111 of the first frame 211 may include multiple openings 2111c and 2111d. For example, the flexible printed circuit board 2402 of FIG. 5, which electrically interconnects the first printed circuit board 45 and the flexible display module 24, may be positioned through the opening 2111c. For example, the first camera module (e.g., a front camera module) 304 may be partially inserted or disposed (or positioned) in the opening 2111d so that the lens of the first camera module 304 can face the front surface of the slidable electronic device 2. Although not illustrated, the first support portion 2111 of the first frame 211 may further include various other openings. An opening included in the first support portion 2111 of the first frame 211 may be provided in such a way that it does not reduce the rigidity of the first support portion 2111 below a desired level.

According to an embodiment, the first partial waterproof area 1301 and the second partial waterproof area 1302 may be connected to each other through at least one opening 2111c included in the first support portion 2111. The space provided by a combination of the first partial waterproof area 1301, the second partial waterproof area 1302, and the at least one opening 2111c interconnecting the first and second partial proof areas may be defined or interpreted as an integrated waterproof area included in the first housing 21. In some embodiments, a seal member (or waterproof member) may be disposed in one or more openings included in the first support portion 2111 such that the first partial waterproof area 1301 and the second partial waterproof area 1302 are substantially separated.

According to various embodiments (not illustrated), the support member (or rear case) 48 may include at least one opening. For example, the portion electrically interconnecting the first circuit part (e.g., the first printed circuit board 45) positioned in the first partial waterproof area 1301 and the third circuit part (e.g., an antenna radiator) positioned in the third partial waterproof area 1303 may be positioned through an opening provided in the support member 48. The first partial waterproof area 1301 and the third partial waterproof area 1303 may be connected to each other through the at least one opening included in the support member 48. The space provided by a combination of the first partial waterproof area 1301, the third partial waterproof area 1303, and the at least one opening interconnecting the first and third partial proof areas may be defined or interpreted as an integrated waterproof area included in the first housing 21. In some embodiments, an opening included in support member 48 may be provided in such a way that it does not reduce the rigidity of support member 48 below a desired level. In some embodiments, a seal member (or waterproof member) may be disposed in one or more openings included in the support member 48 such that the first partial waterproof area 1301 and the third partial waterproof area 1303 are substantially separated. A watertight configuration for a structure including the first partial watertight area 1301, the third partial watertight area 1303, and at least one opening of the support member 48 may be implemented, for example, in a manner or structure substantially the same as or similar to the waterproof configuration for a structure including the first partial waterproof area 1301, the second partial waterproof area 1302, and at least one opening 2111c of the first support portion 2111.

According to various embodiments, the first support portion 2111 of the first frame 211 may include a support structure such as a protrusion extending in a direction in which the rear surface of the slidable electronic device 2 is oriented (e.g., the −z-axis direction) so as to support the support member 48. The support structure of the first support portion 2111 may include a screw fastening portion (e.g., a boss) for screw fastening with the support member 48, and the support member 48 may include a screw hole aligned with the screw fastening portion. The screw may pass through the screw hole to be coupled to the screw fastening portion. The fastening structure including the screw fastening portion of the first support portion 2111, the screw hole of the support member 48, and the screw may contribute to substantially separating the area 1301 and the third partial waterproofing area 1303 while improving the coupling force between the first support portion 2111 and the support member 48. In various embodiments, a flexible member such as a gasket may be disposed between the screw and the screw hole of the support member 48 to ensure airtightness.

According to various embodiments, the first partial waterproof area 1301 and the second partial waterproof area 1302 may be connected through at least one opening provided in the first support portion 2111 of the first frame 211, and the first partial waterproof area 1301 and the third partial waterproof area 1303 may be connected through at least one opening provided in the support member 48. In this case, the space provided by a combination of the first partial waterproof area 1301, the second partial waterproof area 1302, and the third partial waterproof area 1303 may be defined or interpreted as an integrated waterproof area included in the first housing 21.

According to an embodiment, the second frame 221 may include a second wall (or second inner wall) 902, a third wall (or third inner wall) 903, and a fourth wall (or fourth inner wall) 904, and/or a fifth wall (or fifth inner wall) 905. The second wall 902 may be positioned to face the first wall 901 of the first frame 211. The second wall 902 may extend in parallel to the first wall 901, but is not limited thereto. The shape of first wall 901 or the second wall 902 (e.g., extended shape or thickness) may vary. The third wall 903 may be positioned to be spaced apart from the first wall 901 in the first direction 1 (e.g., the slide-out direction). The third wall 903 may include a second support surface 22B (see FIGS. 4A and 4B) corresponding to the bending portion B (see FIGS. 4A and 4B) of the flexible display module 24. The fourth wall 904 may interconnect one end of the second wall 902 and one end of the third wall 903, and the first guide rail 41 may be disposed on the fourth wall 904. The fifth wall 905 may interconnect the other end of the second wall 902 and the other end of the third wall 903, and the second guide rail 42 may be disposed on the fifth wall 905.

According to an embodiment, the fourth wall 904 of the second frame 221 may include a recess so as to prevent the fourth wall from interfering with the linear gear 434 positioned in the first frame 211 when the second housing 22 slides in.

According to an embodiment, the second frame 221 may have a second wall structure 1100 provided by a combination of the second side wall 202, the third side wall 203, the fourth side wall 204, and the fifth side wall 205. The second frame 221 may include a second support portion 2211 which provides a first support surface 22A (see FIGS. 4A and 4B) for supporting the flexible display module 24, and the second wall structure 1100 may extend from the border of the second support portion 2211. The second frame 221 may have a second space 1101 in the form of a recess provided by a combination of the second wall structure 1100 and the second support portion 2211. Various components, such as the battery 44, may be accommodated in the second space 1101. Without being limited to the illustrated example, the shape of the second space 1101 may vary, and the shape of the corresponding second side wall structure 1100 or second support portion 2211 may vary. The second cover 222 may be disposed on the second wall structure 1100. The second wall structure 1100 may extend from the second support portion 2211 in a direction in which the rear surface of the slidable electronic device 2 is oriented (e.g., the −z-axis direction), and its end coupled with the second cover 222 may be provided in the form of a substantially closed loop.

The second wall structure 1100 may include a second cover placement area at the end coupled with the second cover 222. The second cover placement area may be provided to correspond to the border area of the first cover 222. The second cover placement area may be, for example, a stepped portion provided on the second wall structure 1100 such that the second cover 222 can be fitted and stably seated on the second wall structure 1100. As another example, the second cover placement area may be provided as a substantially planar area (or planar portion). The second cover 222 may be placed in the second cover placement area using screw fastening. As another example, the second cover 222 may be placed in the second cover placement area using snap-fit fastening (e.g., a manner in which a hook is fastened to a hook fastener). As another example, the second cover 222 may be placed in the second cover placement area via an adhesive member (or adhesive material) or a bonding member (or bonding material) disposed between the second cover 222 and the second cover placement area.

According to various embodiments, the second support portion 2211 may include a support structure such as a protrusion extending in a direction in which the rear surface of the slidable electronic device 2 is oriented (e.g., the −z-axis direction) so as to support the second cover 222.

According to an embodiment, the slidable electronic device 2 may be provided with a second waterproof area (or second waterproof space) 1202 (see FIGS. 11, 12, 13, and 14), which is a space limited by the second cover 222, the second support portion 2211, and the second wall structure 1100. The second waterproof member 92 may be disposed between the second cover 222 and the second cover placement area of the second wall structure 1100. The second waterproof member 92 may contribute to ensuring airtightness of the second waterproof area 1202. The second waterproof member 92 may reduce or prevent moisture from flowing into the second waterproof area 1202 through the space between the second wall structure 1100 and the second cover 222. The second waterproof area 1202 may prevent a fourth circuit part positioned in the second waterproof area 1202 from being exposed to moisture, thereby reducing or preventing the fourth circuit part from malfunctioning or being damaged due to moisture. The fourth circuit part may include a battery 44 and a motor assembly 431, but may vary without being limited thereto. The second waterproof member 92 may include a flexible member such as rubber (e.g., a gasket), and may be elastically disposed between the second cover 222 and the second wall structure 1100 to increase its airtightness. As another example, the second waterproof member 92 may be an adhesive member or bonding member capable of coupling the second cover 222 and the second wall structure 1100 to each other.

According to an embodiment, in the slidable electronic device 2, the limited space between the third frame 231 and the third cover 232 may provide a third waterproof area (or third waterproof space) 1203 (see FIGS. 11, 12, and 13). The fourth waterproof member 94 may be disposed between the third frame 231 and the third cover 232. The fourth waterproof member 94 may contribute to ensuring airtightness of the third waterproof area 1203. The fourth waterproof member 94 may reduce or prevent moisture from flowing into the third waterproof area 1203 through the space between the third frame 231 and the third cover 232. The third waterproof area 1203 may prevent a fifth circuit part positioned in the third waterproof area 1203 from being exposed to moisture, thereby reducing or preventing the fifth circuit part from malfunctioning or being damaged due to moisture. The fifth circuit part may include the second printed circuit board 46 and the antenna structure 47, but may vary without being limited thereto. The fourth waterproof member 94 may include a flexible member such as rubber (e.g., a gasket), and may be elastically disposed between the third frame 231 and the third cover 232 to increase its airtightness. As another example, the fourth waterproof member 94 may be an adhesive member or bonding member capable of coupling the frame 231 and the third cover 232 to each other.

According to an embodiment, the third waterproof area 1203 may include a recess provided in the third support portion 2311 of the third frame 231. The fifth circuit part (e.g., the second printed circuit board 46 or antenna structure 47 in FIG. 5) positioned in the third waterproof area 1203 may be inserted into the recess included in the third support portion 2311.

According to an embodiment, a first end 491 of the flexible printed circuit board 49 may be positioned in the first space 1001 (or first waterproof area 1201) of the first frame 211, and a second end 492 of the flexible printed circuit board 49 may be positioned in the second space 1101 (or second waterproof area 1202) of the second frame 221. The first end 491 may be electrically connected to a first component positioned in the first space 1001. The first component may include, for example, the first printed circuit board 45 of FIG. 5, but is not limited thereto. The second end 492 may be electrically connected to a second component (e.g., the motor assembly 431, the battery 44, a PCB, or various other electrical elements) positioned in the second space 1101. The second component may include, for example, the motor assembly 431 or a flexible printed circuit board extending from the motor assembly 431. As another example, the second component may be electrically connected to a third printed circuit board (not illustrated) disposed on the second frame 221. The third printed circuit board may be electrically connected to the second printed circuit board 46 of FIG. 5 via, for example, a flexible printed circuit board.

According to an embodiment, the flexible printed circuit board 49 may be positioned through a first opening (not illustrated) provided in the first wall 901 of the first frame 211. The flexible printed circuit board 49 may be positioned through a second opening (not illustrated) provided in the second wall 902 of the second frame 221. A seal material (or seal member) (e.g., a fifth waterproof member) may be disposed in the first opening through which the flexible printed circuit board 49 passes to reduce or prevent moisture from flowing into the first space 1001 through the first opening. The seal material positioned in the first opening may improve airtightness for the first waterproof area 1201 provided in the first housing 21. A seal material (or seal member) (e.g., a sixth waterproof member) may be disposed in the second opening through which the flexible printed circuit board 49 passes to reduce or prevent moisture from flowing into the second space 1101 through the second opening. The seal material positioned in the second opening may improve airtightness for the second waterproof area 1202 provided in the second housing 22.

According to an embodiment, the separation distance between the first wall 901 and the second wall 902 may increase when the second housing 22 slides out and decrease when the second housing 22 slides in. In the closed state of the slidable electronic device 2, the separation space is provided between the first wall 901 and the second wall 902, and the flexible printed circuit board 89 may be disposed in a curved state corresponding to the separation space between the first wall 901 and the second wall 902.

According to an embodiment, the first frame 211, the first cover 212, the support member 48, the second frame 221, the second cover 222, the third frame 231, or the third cover 232 may include at least one opening provided for the purpose of wiring between electrical elements or arranging electrical elements or mechanical elements. A seal member (or waterproof member) may be disposed in at least one opening, or a waterproof structure for the at least one opening may be provided, ensuring airtightness for the first waterproof area 1201, the second waterproof area 1202, or the third waterproof area 1203. For example, referring to FIGS. 3A to 3F, one or more openings may vary, for example, as openings for the microphone hole 301, the first speaker hole 302, the third speaker hole 303, the connector hole 311, or the key input device 309 or 310. A breathable waterproof member may be added, or an electronic component with a waterproof function and a waterproof structure using the same may be provided to substantially prevent moisture from flowing into the first space 1001 through the one or more openings.

According to an embodiment, the first waterproof area 1201, the second waterproof area 1202, and the third waterproof area 1203 may be predetermined spaces within the slidable electronic device, the volumes of which do not change when the second housing 22 slides relative to the first housing 21.

Figure 15:
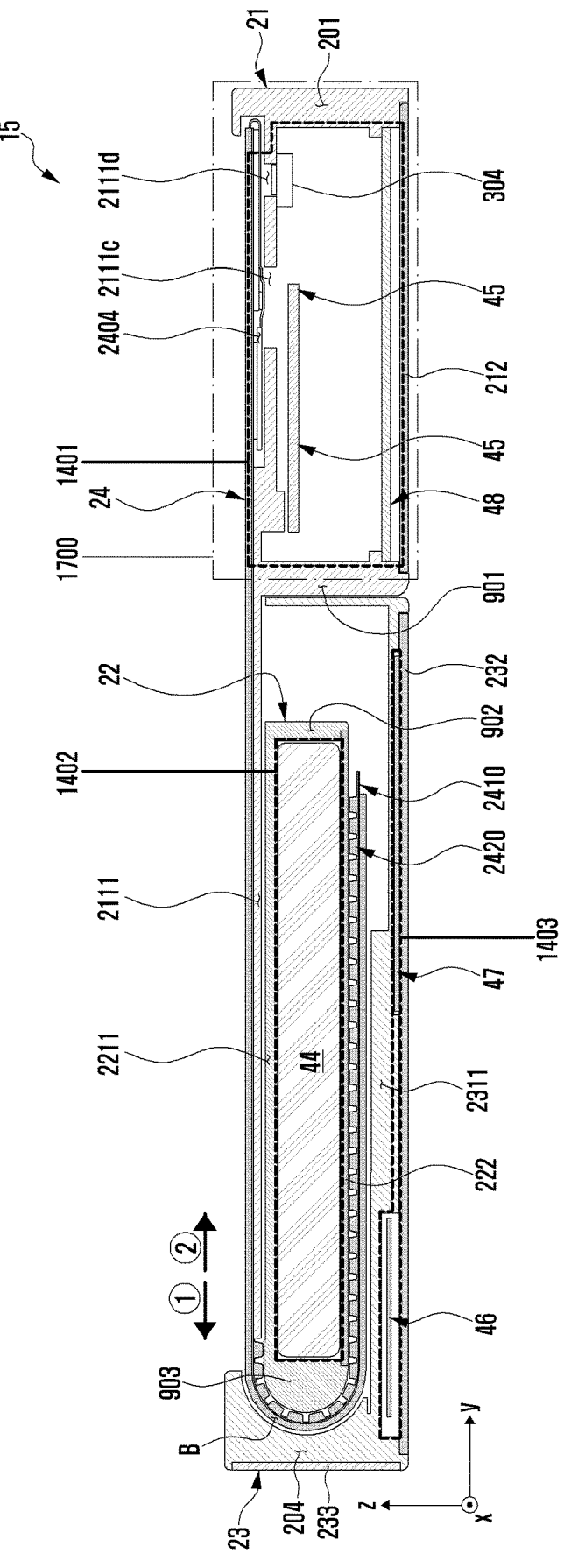
FIG. 15 is a cross-sectional view illustrating a slidable electronic device in a closed state according to various embodiments of the disclosure.
Figure 16:
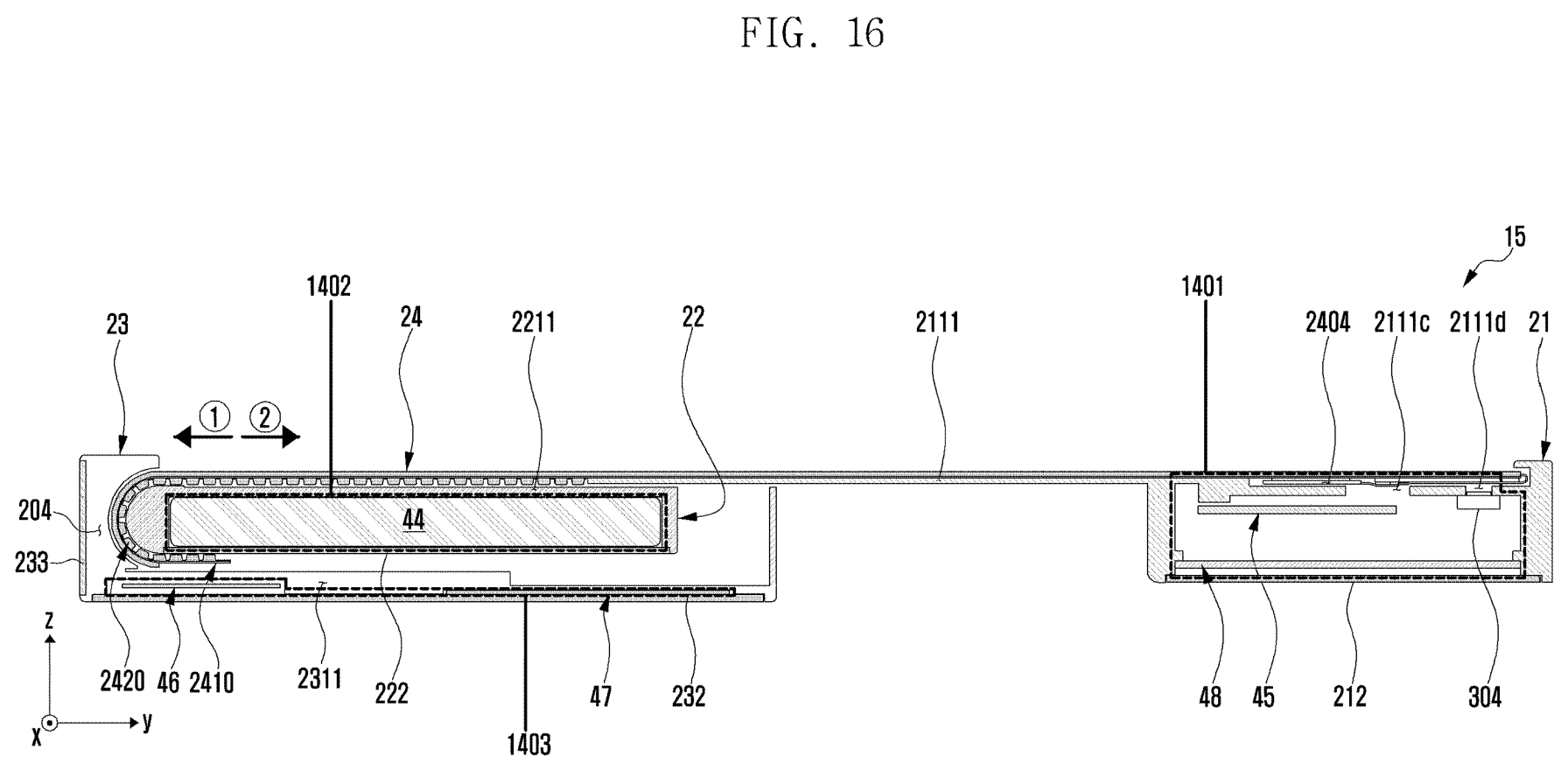
Figure 17:
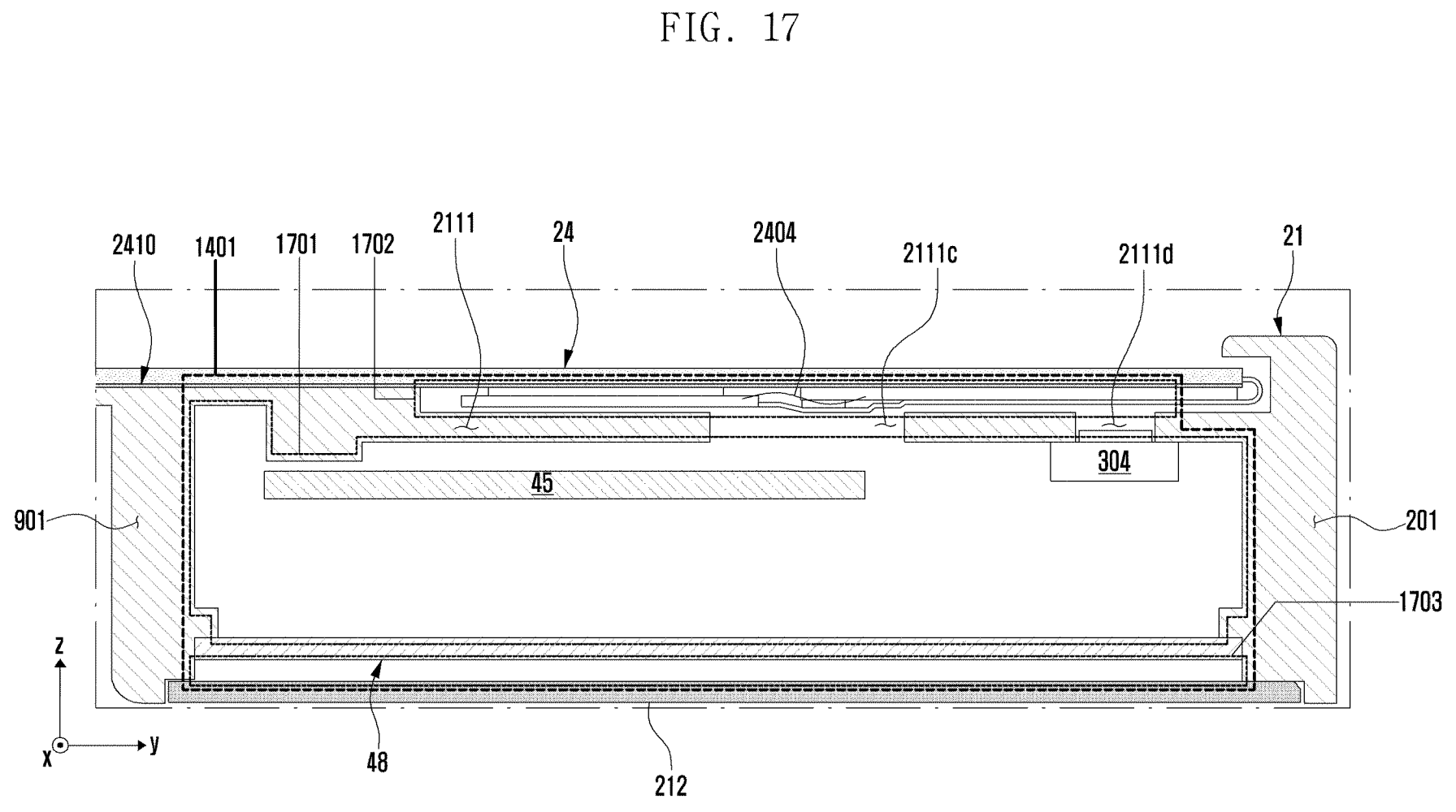

FIG. 15 is a cross-sectional view illustrating a slidable electronic device 15 according to various embodiments of the disclosure in a closed state. FIG. 16 is a cross-sectional view illustrating the slidable electronic device 15 according to various embodiments of the disclosure in an open state. FIG. 17 is an enlarged view illustrating the portion indicated by reference numeral "1700" in FIG. 15, according to various embodiments of the disclosure.

Referring to FIGS. 15, 16, and 17, the slidable electronic device 15 is a modification of the slidable electronic device 2 illustrated in FIGS. 2A to 2F. In comparison with the slidable electronic device 2 illustrated in FIGS. 11 and 12, the slidable electronic device 15 is implemented such that in the closed state, a portion of the first housing 21 protrudes in a second direction ② relative to the third housing 23. In the closed state of the slidable electronic device 15, a portion of the first housing 21 protruding in the second direction ② relative to the third housing 23 (e.g., a portion of the second side wall 202, a portion of the third side wall 203, and a portion the first cover 212) may provide a portion of the outer surface of the slidable electronic device 15. In the closed state of the slidable electronic device 15, the rear surface of the slidable electronic device 15 may include an outer surface area formed by the first cover 212 and an outer surface area formed by the third cover 232. The outer surface area provided by the first cover 212 and the outer surface area provided by the third cover 232 may be provided without a substantial difference in height.

According to an embodiment, the slidable electronic device 15 may be provided with a first waterproof area (or first waterproof space) 1401 (e.g., the first waterproof area 1201 in FIG. 11) for the first housing 21, a second waterproof area (or second waterproof space) 1402 for the second housing 22 (e.g., the second waterproof area 1202 in FIG. 11), and/or a third waterproof area (or third waterproof space) 1403 (e.g., the third waterproof area 1203 in FIG. 11). The first waterproof area 1401 is the first area of the flexible display module 24 (ⓐ) and the first cover 212 may be a limited space between the first partial waterproof area 1701 (e.g., the first partial waterproof area 1301 in FIG. 13), the second partial waterproof area 1702 (e.g., the second partial waterproof area 1302 in FIG. 13), and/or a third partial waterproof area 1703 (e.g., the third partial waterproof area 1303 in FIG. 13).

Figure 18B:
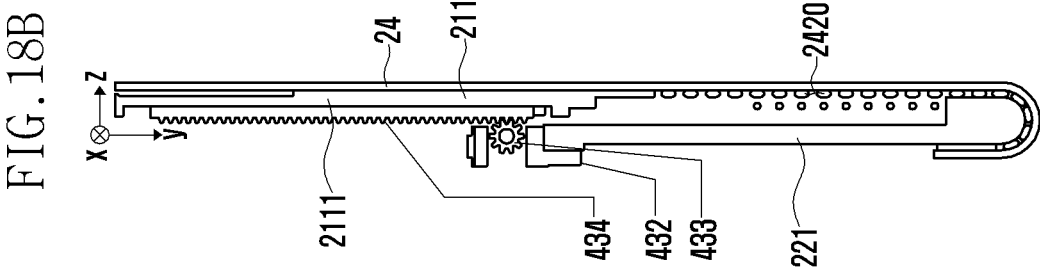
FIGS. 18A and 18B illustrate a plan view and a cross-sectional view of a slidable electronic device in an open state, respectively, according to an embodiment of the disclosure
Figure 18A:
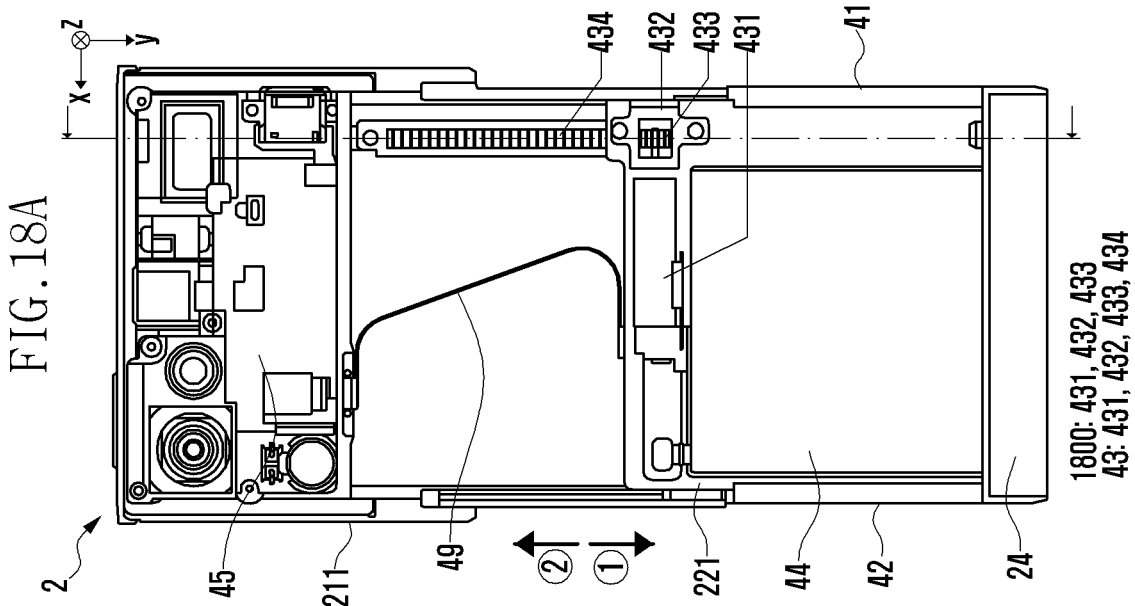
Figure 18D:
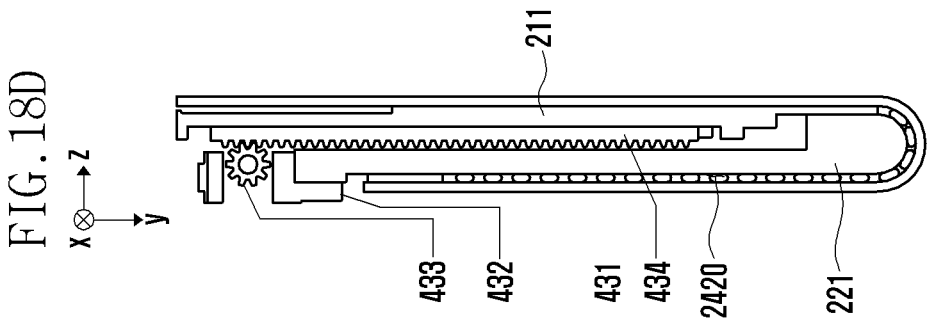
FIGS. 18C and 18D illustrate a plan view and a cross-sectional view of the slidable electronic device in FIGS. 18A and 18B in a closed state, respectively, according to an embodiment of the disclosure.
Figure 18C:
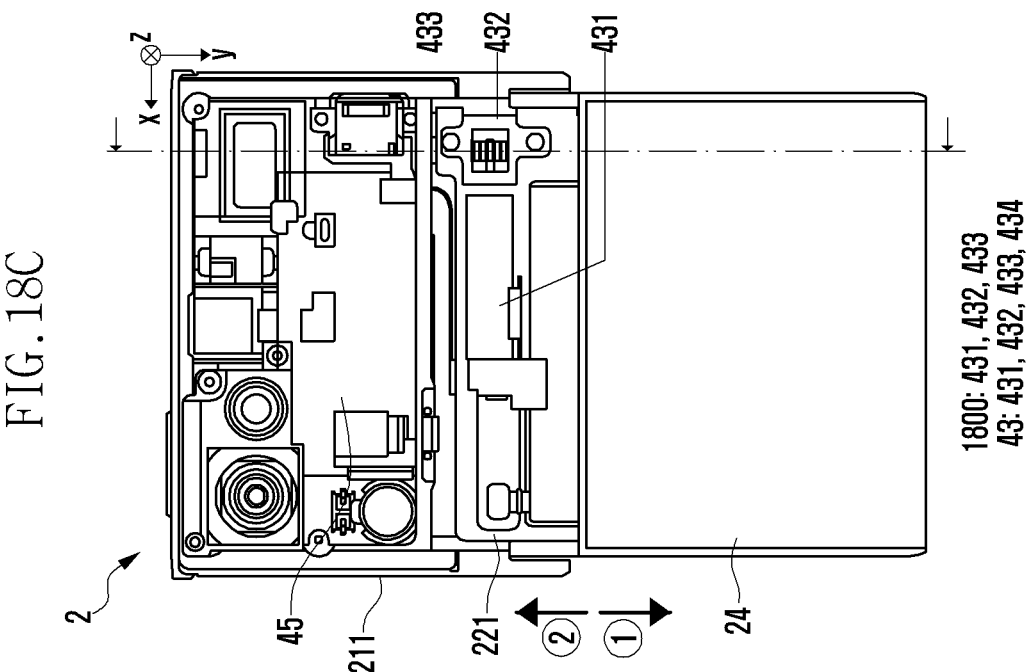

FIGS. 18A and 18B illustrate views and cross-sectional views of a slidable electronic device 2 in an open state and the slidable electronic device 2 in a closed state according to an embodiment of the disclosure.

Referring to FIGS. 18A and 18B, the slidable electronic device 2 may include a first frame 211, a second frame 221, a flexible display module 24, a first guide rail 41, a second guide rail 42, a sliding driver 43, a battery 44, a first printed circuit board 45, and/or a flexible printed circuit board 49.

According to an embodiment, the sliding driver 43 may include a motor assembly 431, a bracket 432, a circular gear 433, and a linear gear 434. The motor assembly 431, the bracket 432, and the circular gear 433 may be disposed on the second frame 221. The linear gear 434 corresponding to the circular gear 433 may be disposed on the first frame 211. The circular gear 433 may perform rotation movement by driving the motor assembly 431, and the linear gear 434, which is engaged with the circular gear 433, may perform linear movement. The rotation movement of the circular gear 433 may be converted into the linear movement of the linear gear 434 to provide mutual sliding between the first frame 211 coupled with the linear gear 434 and the second frame 221 coupled with the motor assembly 431. A driving part (or power part) 1800 including the motor assembly 431, the bracket 432, and the circular gear 433 may be a part which actually provides power for sliding of the second frame 221 relative to the first frame 211. Since the driving part 1800 disposed on the second frame 221 should be operatively connected to the linear gear disposed on the first frame 211, the driving part 1800 may reduce the airtightness of the second waterproof area 1202 (see FIG. 11). Hereinafter, in order to ensure the airtightness of the second waterproof area 1202, the waterproof structure related to the driving part 1800 will be described with reference to FIGS. 19, 20, 21, 22, 23, and 24.

Figure 19:
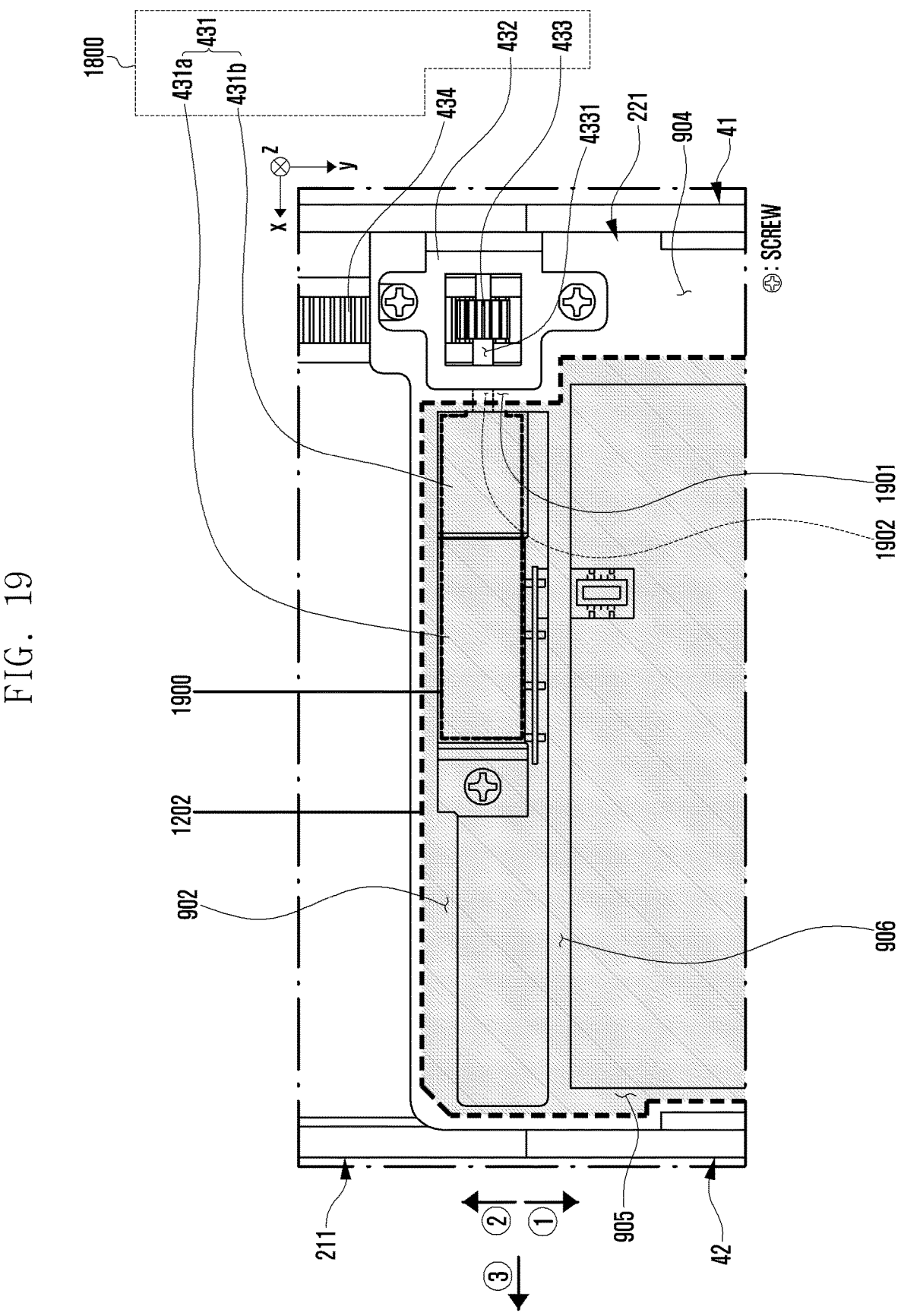
FIG. 19 is an enlarged plan view illustrating a slidable electronic device according to an embodiment of the disclosure.
Figure 20:
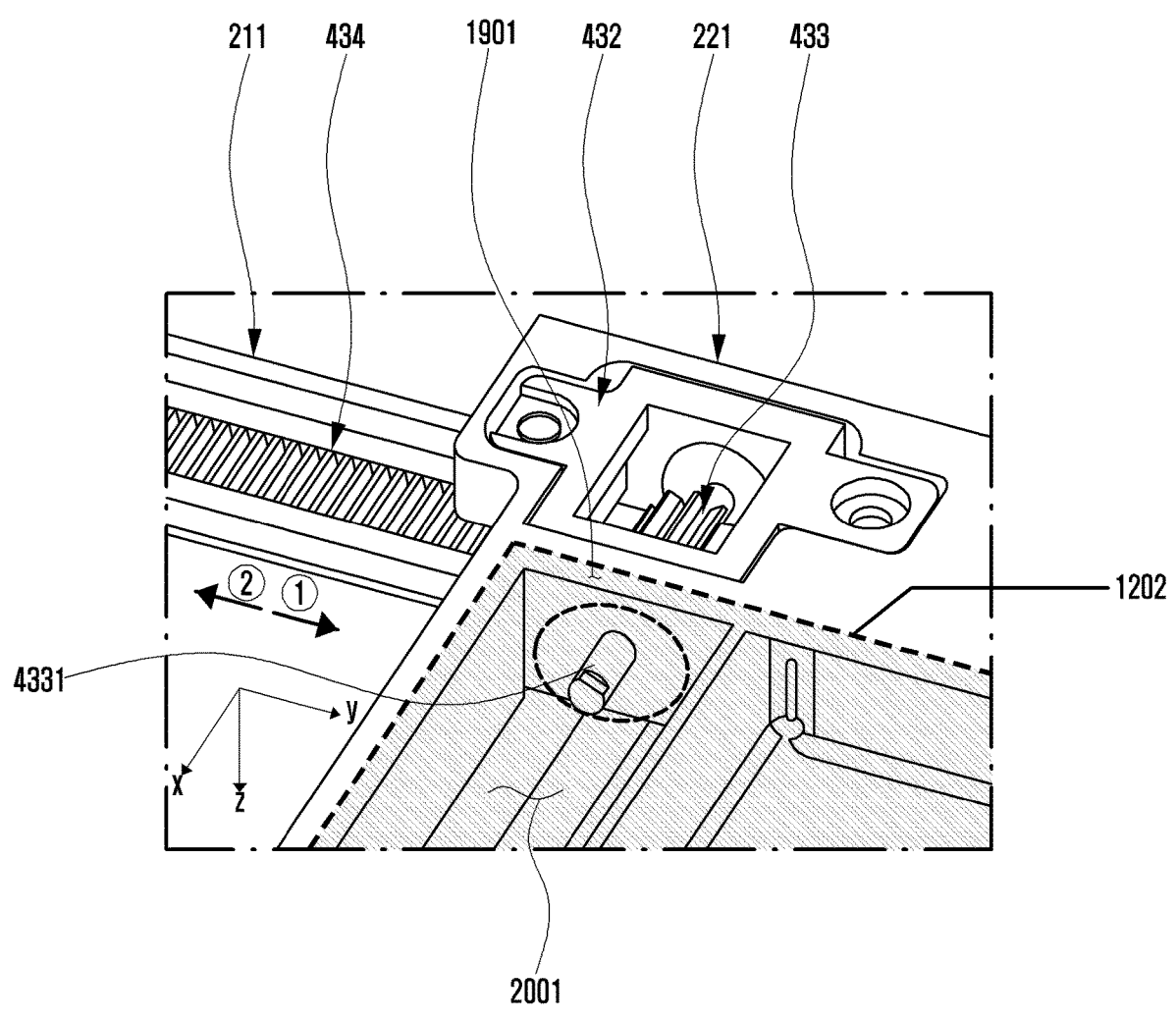
FIGS. 20 and 21 are partial perspective views of a slidable electronic device according to an embodiment of the disclosure.
Figure 21:
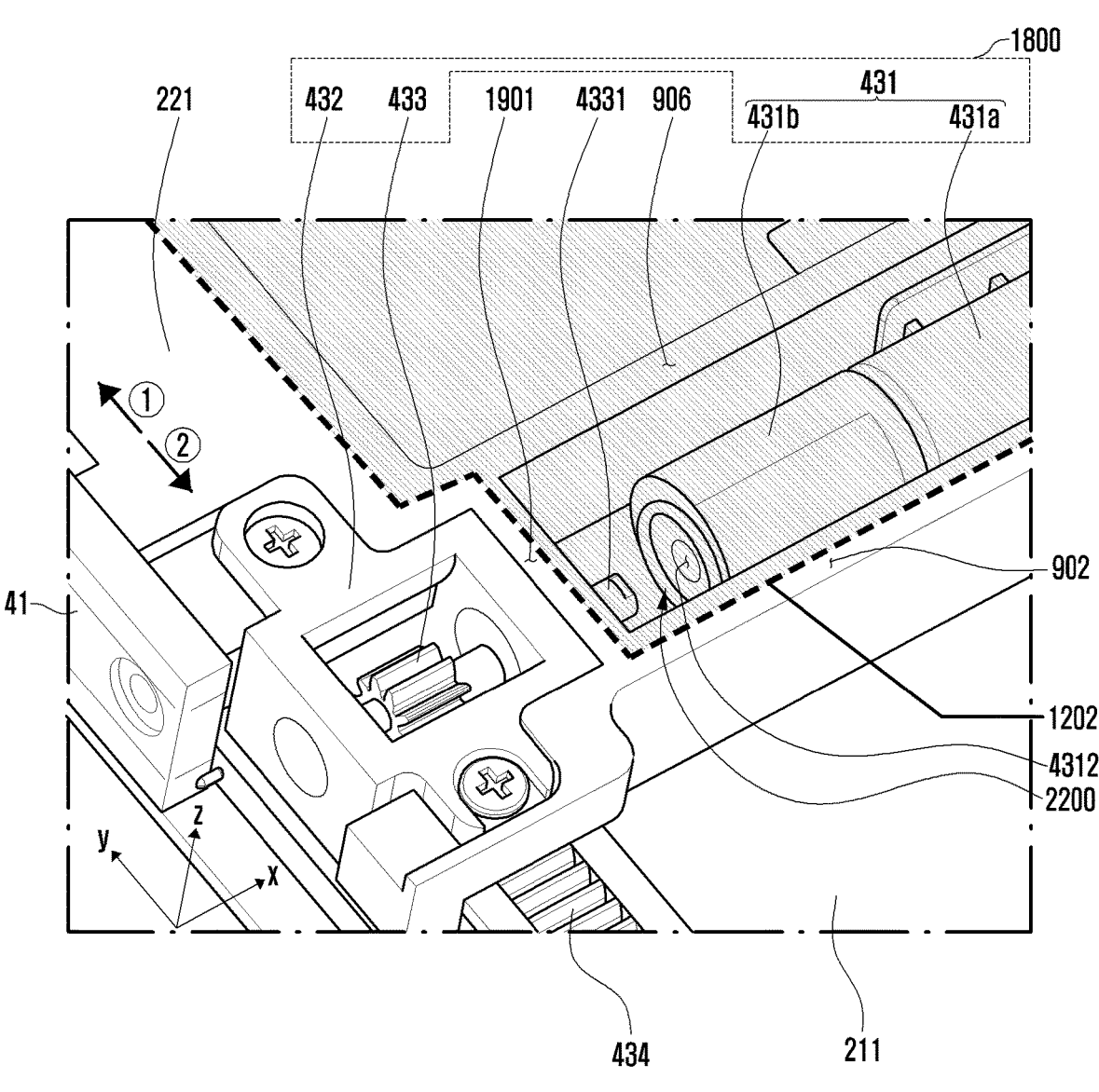
Figure 22:
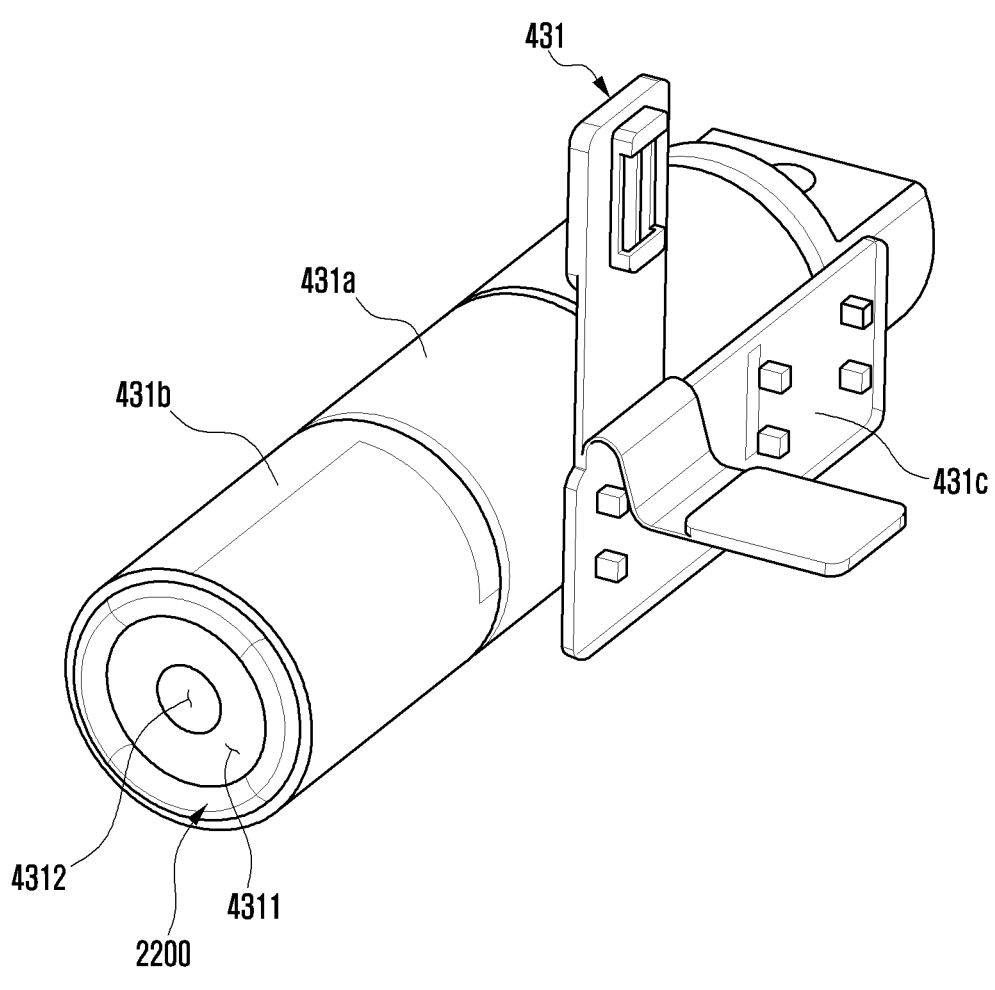
FIG. 22 is a perspective view of a motor assembly according to an embodiment of the disclosure.

FIG. 19 is a view illustrating the electronic device 2 according to an embodiment of the disclosure. FIGS. 20 and 21 are partial perspective views of the slidable electronic device 2 according to an embodiment of the disclosure. FIG. 22 is a perspective view of a motor assembly 431 according to an embodiment of the disclosure.

Referring to FIGS. 19, 20, 21, and 22, the slidable electronic device 2 may include a first frame 211, a second frame 221, a first guide rail 41, a second guide rail 42, and/or a sliding driver 43.

According to an embodiment, the second frame 221 may include a sixth wall 906 interconnecting the fourth wall 904 and the fifth wall 905. A second waterproof area 1202 provided by a second housing 22 may be divided into two areas by the sixth wall (e.g., a partition) 906. With reference to the sixth wall 906, a battery 44 (see FIG. 5) is disposed in one area of the second waterproof area 1202, and the motor assembly 431 may be disposed in the remaining area of the second waterproof area 1202. The motor assembly 431 may be positioned between the second wall 902 and the sixth wall 906, and the battery 44 may be positioned between the sixth wall 906 and the third wall 903 (see FIG. 9). The sixth wall 906 may support the battery 44 and/or the motor assembly 431 so that the battery 44 and/or the motor assembly 431 can be stably seated on the second frame 221.

According to an embodiment, the motor assembly 431 may include a motor 431a, a gear structure 431b connected to the motor 431a, and/or a flexible printed circuit board 431c. The gear structure 431b may operatively interconnect the motor 431a and the circular gear 433 between the motor 431a and the circular gear 433. For example, the gear structure 431b may be connected to a first rotation shaft (or first shaft or input shaft) of the motor 431a and may be connected to a second rotation shaft (or second shaft or output shaft) 4331. The rotation speed or number of rotations of the second rotation shaft 4331 relative to the first rotation shaft may be adjusted by the gear structure 431b. In an embodiment, the gear structure 431b may include a reduction gear. The reduction gear may, for example, allow the second rotation shaft 4331 to rotate at a slower rotation speed or smaller number of rotations than the first rotation shaft. The reduction gear may reduce the power of the first rotation shaft to increase the torque of the second rotation shaft 4331. The gear structure (e.g., the reduction gear) may contribute to stable sliding of the second housing 22 relative to the first housing 21 by increasing torque while reducing the speed of the second rotation shaft 4331 relative to the first rotation shaft. The power for sliding the second housing 22 relative to the first housing 21 is output from the second rotation shaft 4331, and the second rotation shaft 4331 may be defined or interpreted as the rotation shaft, driving shaft, or power transmission shaft of the motor assembly 431. In some embodiments, the circular gear 433 may be defined or interpreted as a portion of the gear structure. In some embodiments, the motor may be implemented as an integrated form including the gear structure. In some embodiments, the gear structure may be omitted, in which case the first rotation shaft of the motor may be connected with the circular gear 433. The motor assembly 431 may be electrically connected to components at other positions via the flexible printed circuit board 431c.

According to an embodiment, the circular gear 433 may be rotatably disposed on the bracket 432, and the rotation of the circular gear 433 may be supported by the bracket 432. In order to reduce the loss of movement or force due to friction between the second rotation shaft 4331 and the bracket 432, a rotation member such as a bearing may be positioned between the second rotation shaft 4331 of the circular gear 433 and the bracket 432. As another example, a lubricant (e.g., grease) may be disposed (e.g., applied) between the second rotation shaft 4331 and the bracket 432 of the circular gear 433, or the friction surfaces between the second rotation shaft 4331 and the bracket 432 the surfaces may be formed by a lubricating coating (e.g., a coating using various lubricating materials such as Teflon).

According to an embodiment, the second frame 221 may include a partition 1901 between a first area 2001 where the motor assembly 431 is disposed and a second area where the bracket 432 is disposed. The first area 2001 where the motor assembly 431 is disposed may be included in the second waterproof area 1202, and the second area where the bracket 432 is disposed may not be included in the second waterproof area 1202. The first area 2001 where the motor assembly 431 is disposed may be a recess-shaped space in which the motor assembly 431 can be stably seated. The second area where the bracket 432 is disposed may be a recess-shaped space in which the bracket 432 can be stably seated. The motor assembly 431 may be seated in the first area 2001 and coupled to the second support portion 2211 (see FIG. 9) of the second frame 221 via a screw. The bracket 432 may be seated in the second area and coupled to the second support portion 2211 via a screw. The partition 1901 may be, for example, a portion of the fourth wall 904.

According to an embodiment, the partition 1901 may include an opening 1902 (e.g., a through hole) corresponding to the second rotation shaft 4331 of the circular gear 433.

The second rotation shaft 4331 may pass through the opening 1902 to be connected to the gear structure 431*b* of the motor assembly 431. The gear structure 431*b* may include a shaft hole 4312 into which the second rotation shaft 4331 can be inserted. The shaft hole 4312 may be provided on one surface 4311 facing the partition 1901. The second rotation shaft 4331 may be inserted into the gear structure 431*b* through the shaft hole 4312 to be operatively connected to one or more gears positioned inside the gear structure 431*b*.

According to an embodiment, a seal member (or waterproof member) 2200 may be disposed between the gear structure 431*b* and the partition 1901. The seal member 2200 may be disposed between the gear structure 431*b* and the partition 1901 while surrounding the second shaft 4331. The seal member 2200 may be a flexible member such as rubber. The seal member 2200 may be flexibly disposed between the gear structure 431*b* and the partition 1901. The motor assembly 431 may be provided in a form including a seal member 2200 disposed on one surface 4311 facing the partition 1901. As another example, the seal member 2200 may be disposed on the partition 1901 as a separate element from the motor assembly 431. The motor assembly 431 may be provided with its interior waterproofed (e.g., applied with a waterproof material). A combination of the motor assembly 431, the partition 1901, and the seal member 2200 may provide an inner watertight area 1900 positioned within the second watertight area 1202. The internal waterproof area 1900 may include, for example, the space between the gear structure 431*b* and the partition 1901, the interior of the gear structure 431*b*, and/or the interior of the motor assembly 431. Moisture may flow in through the opening 1902 of the partition 1901, but does not move to areas other than the inner waterproof area 1900, thereby ensuring the airtightness of the second waterproof area 1202.

In the illustrated example, the motor assembly 431 may be disposed in a third direction ③ with respect to the circular gear 433. Without being limited thereto, the motor assembly 431 may be disposed in a fourth direction opposite to the third direction ③ with respect to the circular gear 433. In this case, the bracket 432 and the circular gear 433 may be positioned closer to the sixth side wall 206 (see FIG. 5) than the fifth side wall 205 (see FIG. 5), and the linear gear 434 may be positioned corresponding to the circular gear 433. When the sliding driver is implemented such that the motor assembly 431 includes the driving part disposed in the fourth direction with respect to the circular gear 433, and the linear gear 434 positioned corresponding to the driving part, a waterproof area (or waterproof structure) which is substantially the same as or similar to the waterproof area (or waterproof structure) based on the partition 1901 may be provided.

According to various embodiments, a sliding driver in which a motor assembly includes a driving part disposed in the fourth direction opposite to the third direction ③ with respect to the circular gear, and a linear gear corresponding to the driving part may be further provided (added). With respect to the sliding driver in which the motor assembly includes the driving part disposed in the fourth direction with respect to the circular gear, and the linear gear corresponding to the driving part, a waterproof area (or waterproof structure) which is substantially the same as or similar to the waterproof area (or waterproof structure) based on the partition 1901 may be provided.

Figures 23A, 23B:
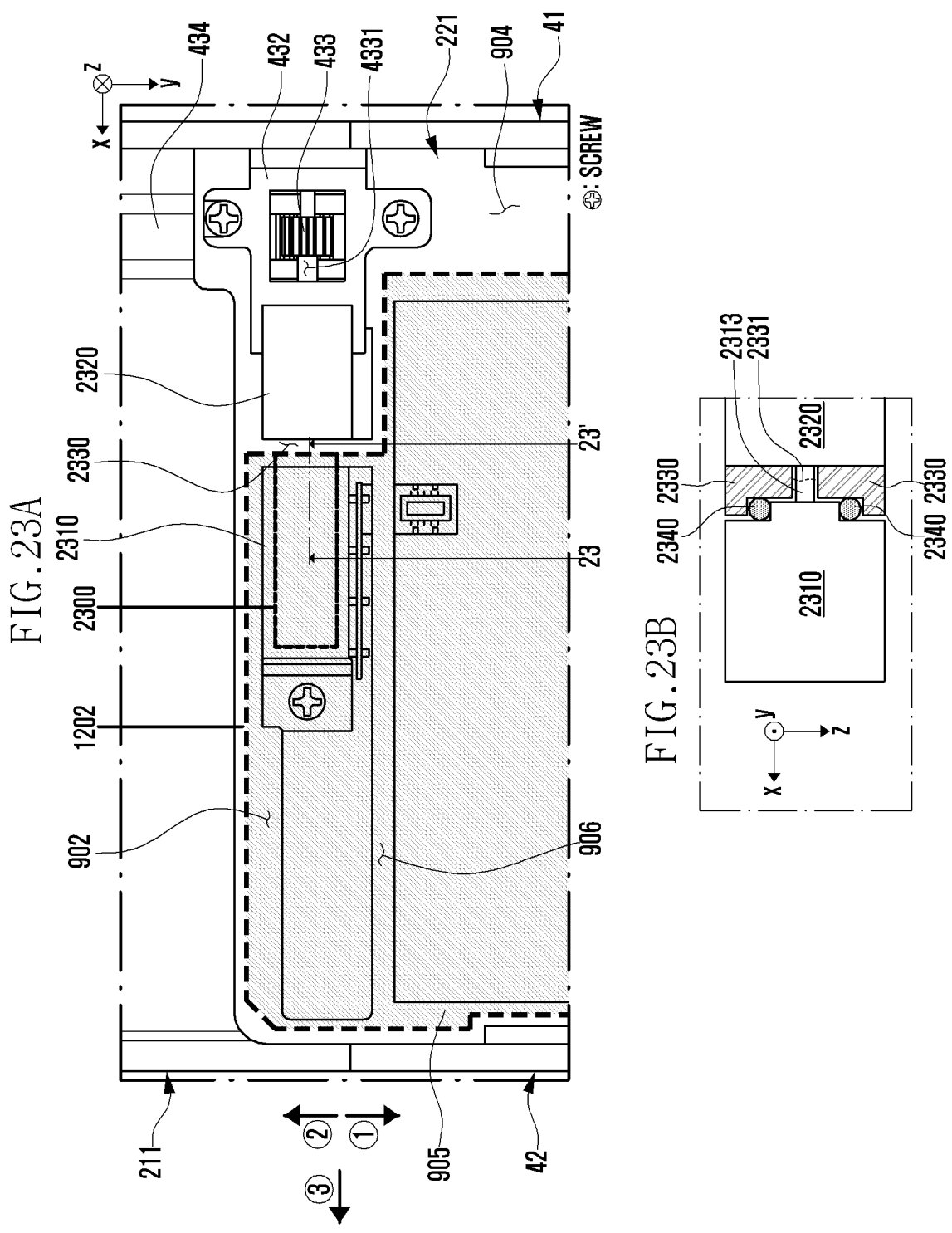
FIG. 23A is a partial plan view and FIG. 23B is an enlarged cross-sectional view taken along line 23-23' of FIG. 23A illustrating a slidable electronic device according to various embodiments of the disclosure.
Figures 24A, 24B, 24C:
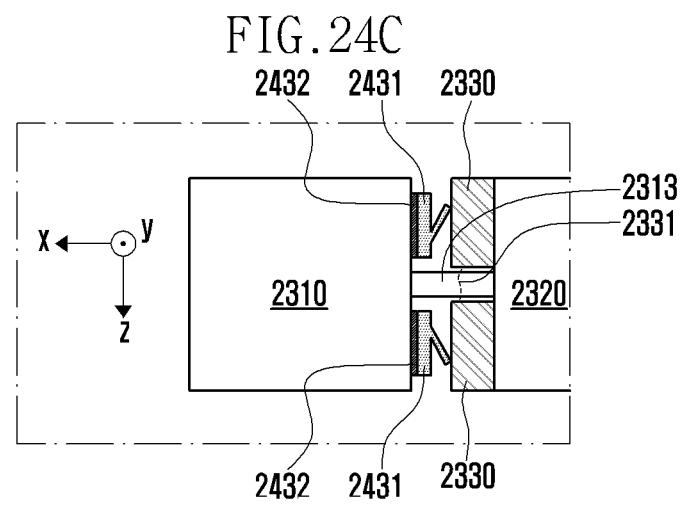
FIGS. 24A to FIG. 24C illustrate enlarged plan views of portions of the slidable electronic device according to various embodiments of the disclosure.

FIGS. 23A and 23B are views illustrating a portion of the slidable electronic device 2 according to various embodiments of the disclosure. FIGS. 24A to 24C illustrate views of portions of the slidable electronic device 2 according to various embodiments of the disclosure.

Referring to FIGS. 23A and 23B, compared to the embodiment of FIG. 19, the partition 2330 which is the boundary of the second waterproof area 1202 may be positioned between the motor 2310 and the gear structure 2320. The partition 2330 may include an opening 2331 through which the rotation shaft 2313 of the motor 2310 passes. The rotation shaft 2313 of the motor 2310 may be connected to the gear structure 2320. The slidable electronic device 2 may include a seal member (or waterproof member) 2340 positioned between the motor 2310 and the partition 2330. The seal member 2340 may be, for example, a flexible member such as rubber (e.g., an O-ring). The flexible member may be elastically disposed between the motor 2310 and the partition 2330. The seal member 2340 may be replaced with various other members. As another example, referring to FIGS. 24A to 24C, a seal member 2411 disposed between the motor 2310 and the partition 2330 may include a liquid gasket. As another example, referring to FIGS. 24A to 24C, a seal member 2421 disposed between the motor 2310 and the partition 2330 may include an adhesive member or a bonding member. As another example, referring to FIGS. 24A to 24C, a seal member 2431 may include an elastic member which provides an elastic structure capable of being elastically disposed between the motor 2310 and the partition 2330. The seal member 2431 may be disposed on the motor 2310 via an adhesive member (or bonding member) 2432 disposed between the seal member 2431 and the motor 2310. A combination of the motor 2310, the partition 2330, and the seal member 2340, 2411, 2421, or 2431 may provide an inner watertight area 2300 positioned within the second watertight area 1202. The inner waterproof area 2300 may include, for example, the space among the motor 2310, the seal member 2340, 2411, 2421, or 2041, and the partition 2330, and the interior of the motor 2310. Moisture may flow in through the opening 2331 of the partition 2330, but does not move to areas other than the inner waterproof area 2300, thereby ensuring the airtightness of the second waterproof area 1202. In various embodiments, the seal member between the motor 2310 and the partition 2330 may be provided separately from the motor 2310 or the partition 2330 and may be attached or disposed between the motor 2310 and the partition 2330. In some embodiments, the seal member between the motor 2310 and the partition 2330 may be provided as an element included in the motor 2310 or an element included in the partition 2303.

According to various embodiments, the motor assembly 431 of the embodiment of FIG. 19 or the embodiment of FIGS. 23A and 23B may be provided in a form which includes multiple motors in place of a single motor 431*a* in order to improve or ensure the driving force. For example, a first motor, a second motor, and gear structure 431*b* may be arranged in the third direction ③, and the second motor may be operatively connected to the first motor and gear structure 431*b* between the first motor and gear structure 431*b*. In an embodiment, a seal member (or waterproof member) may be disposed between the first motor and the second motor to ensure airtightness of the second waterproof area 1202. The seal member between the first motor (or the housing of the first motor) and the second motor (or the housing of the second motor) may vary, for example, as a form according to the embodiment of FIGS. 23A and 23B, or a form according to the embodiment of FIGS. 24A to 24C.

In the illustrated example, the motor 2310 and the gear structure 2320 may be arranged in the third direction ③ with respect to the circular gear 433. Without being limited thereto, the motor 2310 and the gear structure 2320 may be disposed in a fourth direction opposite to the third direction ③ with respect to the circular gear 433. In this case, the bracket 432 and the circular gear 433 may be positioned closer to the sixth side wall 206 (see FIG. 5) than the fifth side wall 205 (see FIG. 5), and the linear gear 434 may be positioned corresponding to the circular gear 433. When the sliding driver is implemented such that the motor 2310 and the gear structure 2320 include the driving part disposed in the fourth direction with respect to the circular gear 433, and the linear gear 434 positioned corresponding to the driving part, a waterproof area which is substantially the same as or similar to the waterproof area (or waterproof structure) based on the partition 2330 may be provided.

According to various embodiments, a sliding driver in which a motor and a gear structure include a driving part disposed in the fourth direction opposite to the third direction ③ with respect to the circular gear, and a linear gear corresponding to the driving part may be further provided (added). With respect to the sliding driver in which the motor and the gear structure include the driving part disposed in the fourth direction with respect to the circular gear, and the linear gear corresponding to the driving part, a waterproof area (or waterproof structure) which is substantially the same as or similar to the waterproof area (or waterproof structure) based on the partition 2330 may be provided.

According to an embodiment, in the embodiment of FIG. 19, the motor assembly 431 may be provided in an integrated form in which waterproofing (e.g., application of a waterproof material) is implemented between the motor 431a and the gear structure 431b. In some embodiments, the gear structure 431b may be provided separately from the motor 431a, rather than in an integrated form. In this case, for airtightness of the second waterproof area 1202, a seal member (or waterproof member) may be disposed between the motor 431a and the gear structure 431b when coupling the motor 431a and the gear structure 431b. The seal member between the motor 431a and the gear structure 431b may vary, for example, as a form according to the embodiment of FIGS. 23A and 23B or a form according to the embodiment of FIGS. 24A to 24C.

Figure 25:
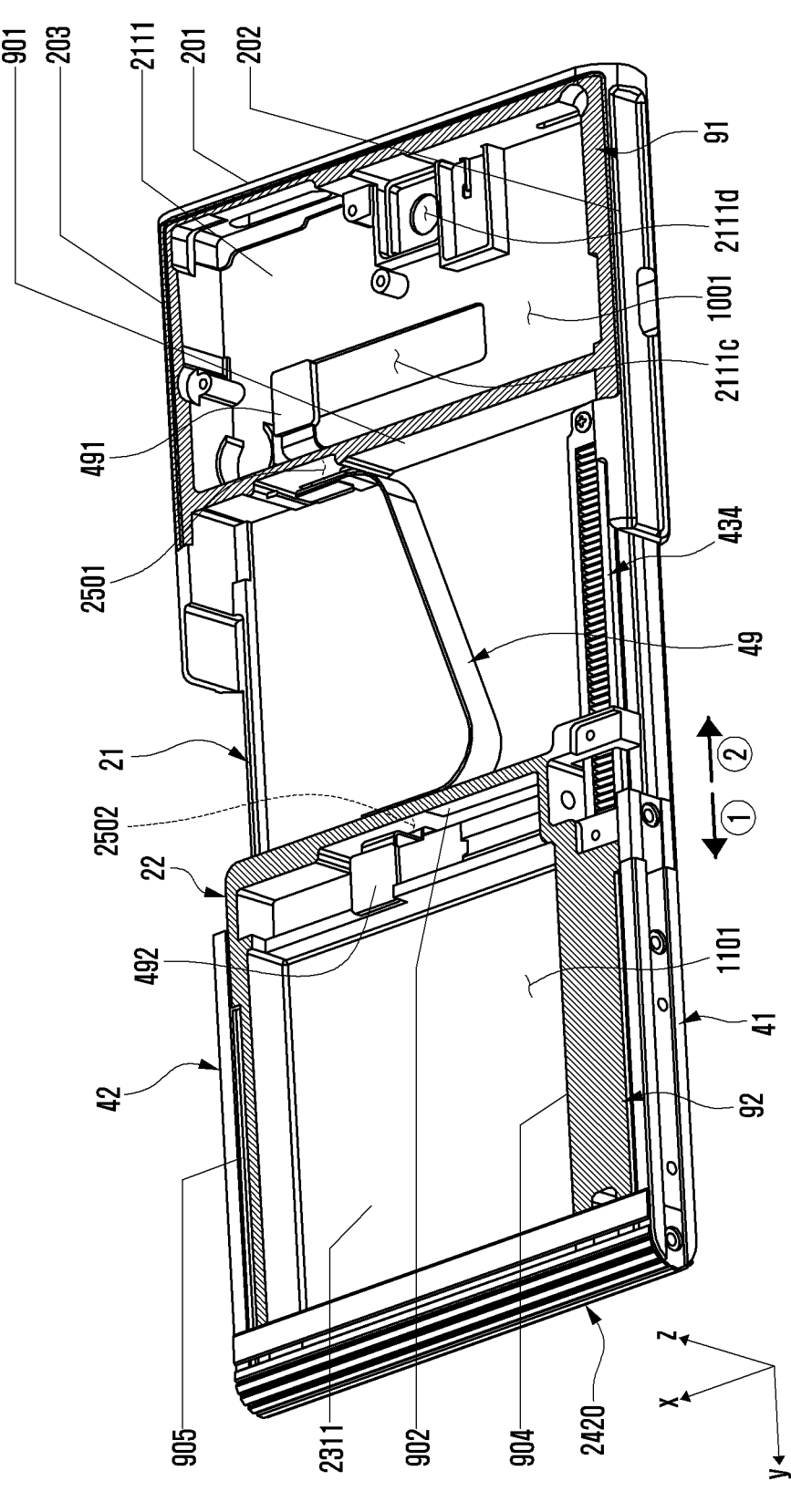
FIG. 25 is a partial perspective view of a slidable electronic device according to an embodiment of the disclosure.
Figure 26:
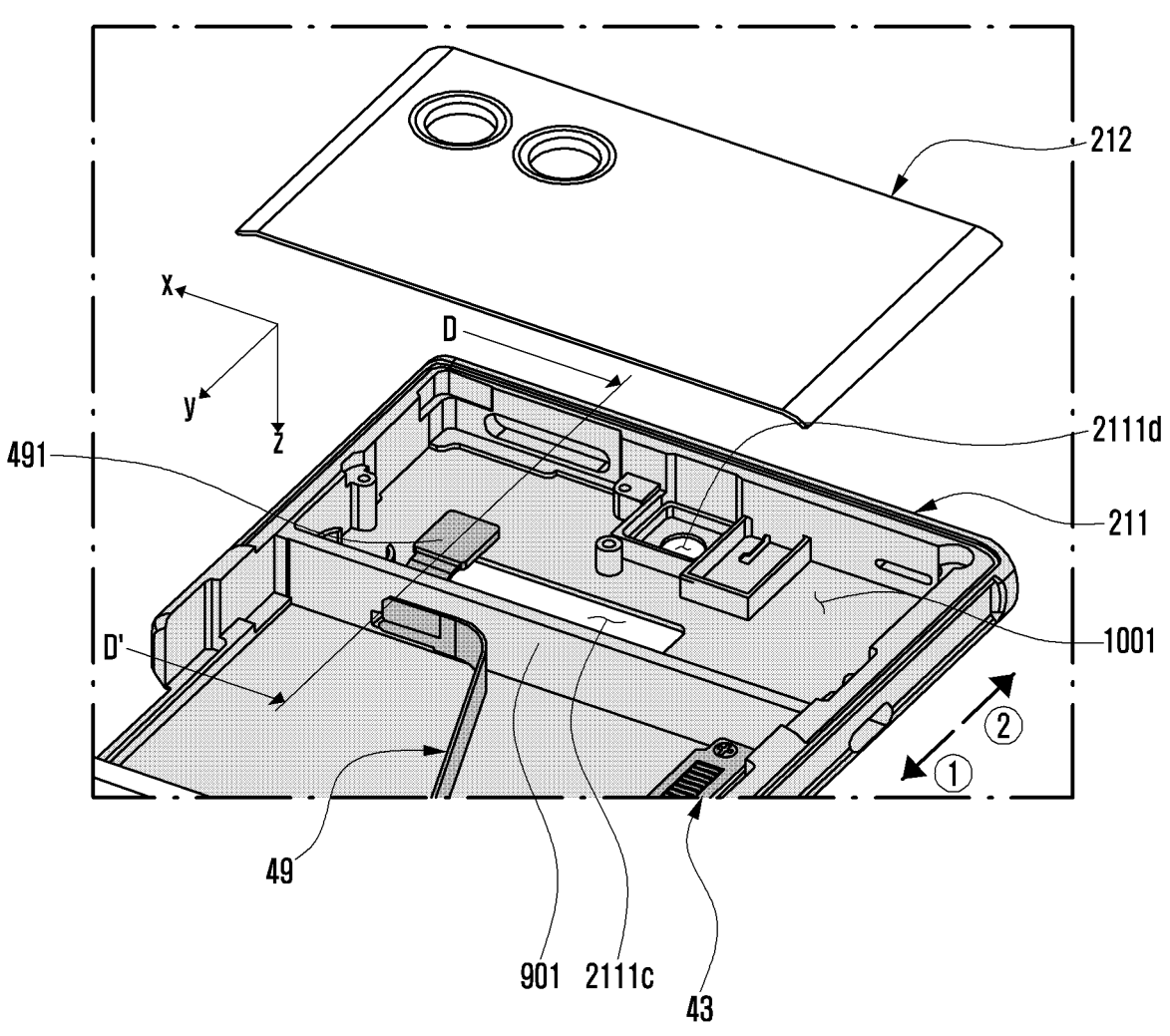
FIG. 26 is a partially exploded perspective view of a slidable electronic device according to an embodiment of the disclosure.
Figure 27:
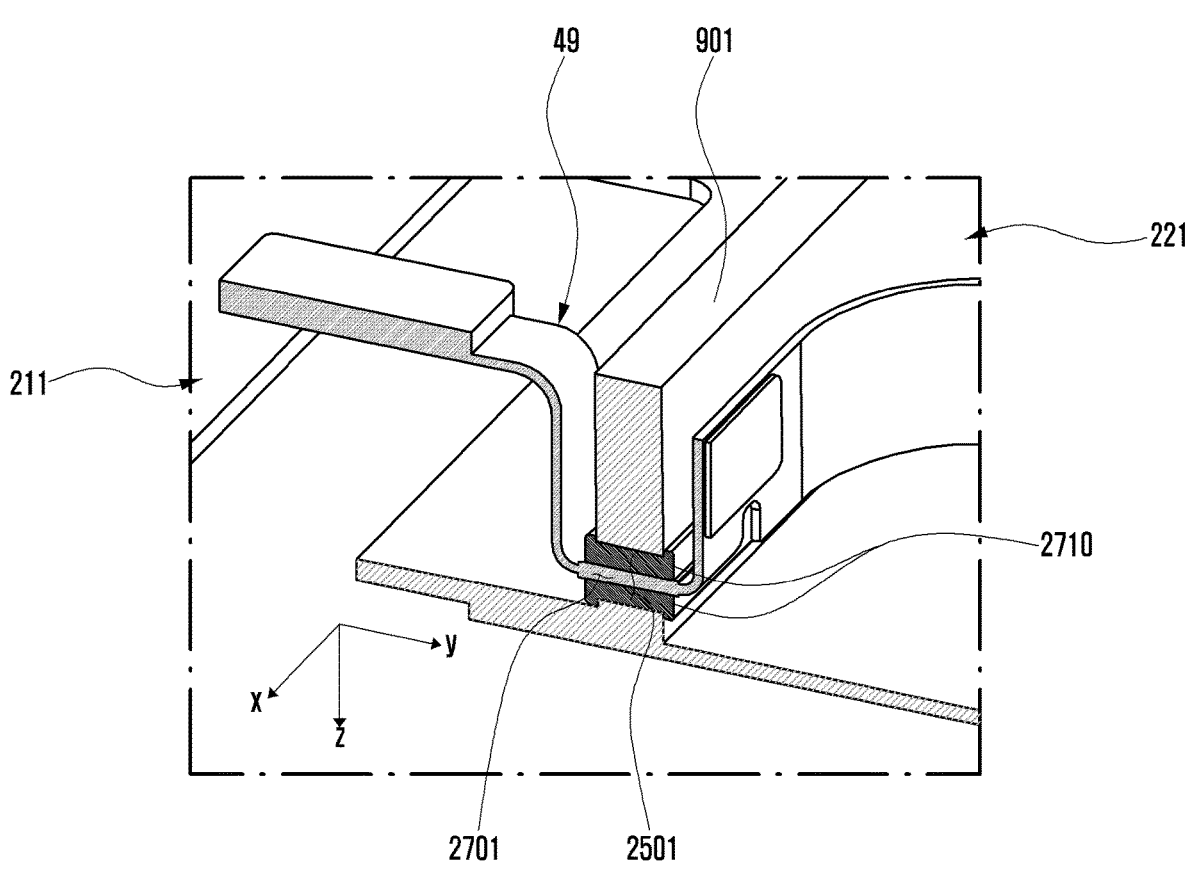
FIG. 27 is a cross-sectional view taken along line D-D' in FIG. 26, according to an embodiment of the present disclosure.
Figures 28A, 28B:
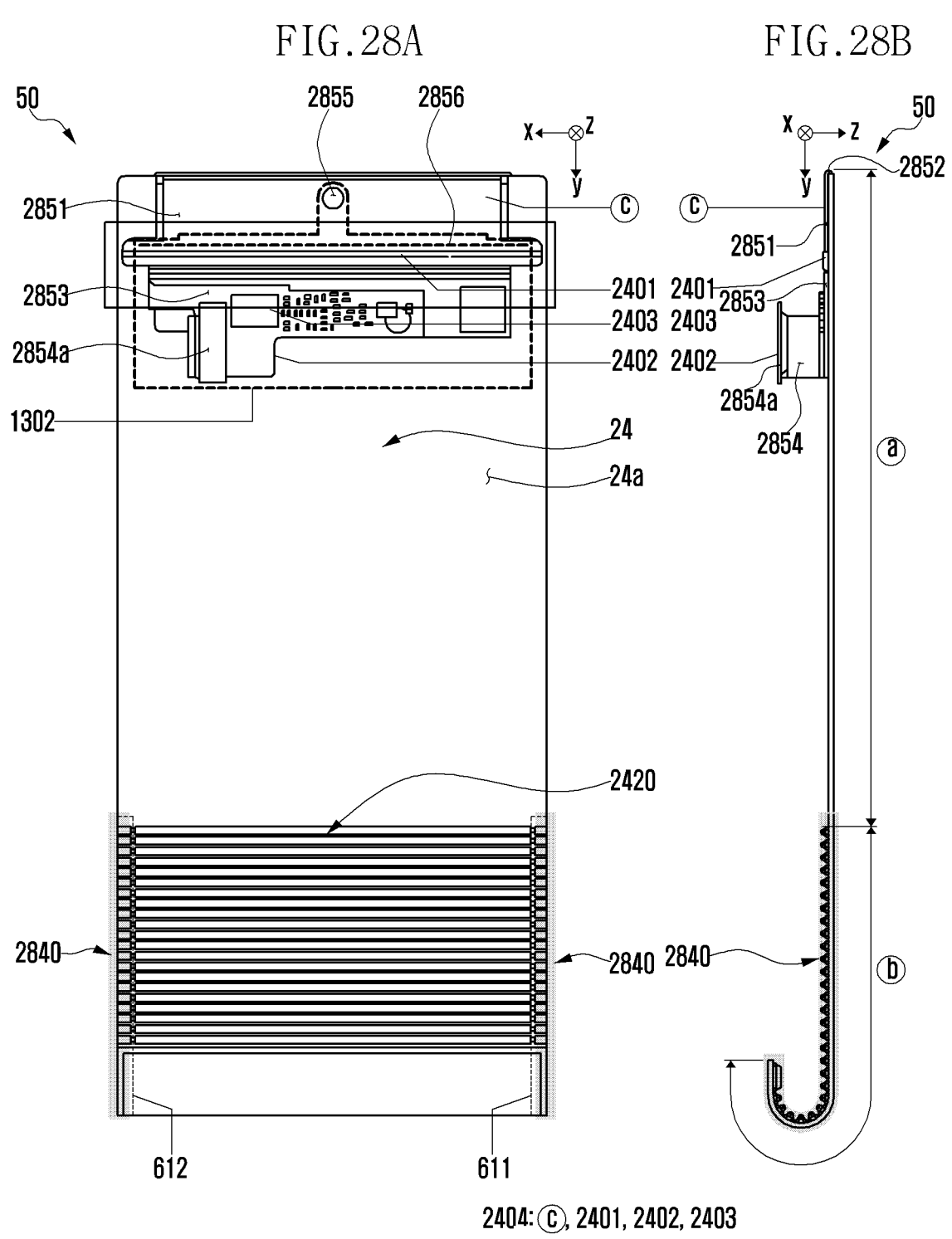
FIGS. 28A and 28B illustrate a plan view and a cross-sectional view of a slidable electronic device in an open state, respectively, according to an embodiment of the disclosure.

FIG. 25 is a partial perspective view of the slidable electronic device 2 according to an embodiment of the disclosure. FIG. 26 is a partially exploded perspective view of the slidable electronic device 2 according to an embodiment of the disclosure. FIG. 27 is a cross-sectional view taken along line D-D' in FIG. 26, according to an embodiment of the present disclosure.

Referring to FIGS. 25, 26, and 27, the slidable electronic device 2 may include a first frame 211, a first cover 212, a second frame 221, a second cover 222, a first guide rail 41, a second guide rail 42, a linear gear 434, and/or a flexible printed circuit board 49.

According to an embodiment, the flexible printed circuit board 49 may electrically interconnect components positioned in the first housing 21 and components positioned in the second housing 22. The flexible printed circuit board 49 may be disposed to be bent depending on the relative position between the first housing 21 and the second housing 22.

According to an embodiment, a first end 491 of the flexible printed circuit board 49 may be positioned in the first space 1001 (or the first waterproof area 1201 in FIG. 11) of the first frame 211, and a second end 492 of the flexible printed circuit board 49 may be positioned in the second space 1101 (or the second waterproof area 1202 in FIG. 11) of the second frame 221. The first end 491 may be electrically connected to a first component positioned in the first space 1001 (or the first waterproof area 1201 in FIG. 11). The second end 492 may be electrically connected to a second component positioned in the second space 1101 (or the second waterproof area 1202 in FIG. 11). The first end 491 and the second end 492 may include an FPCB connector.

According to an embodiment, the flexible printed circuit board 49 may be positioned through a first opening 2501 provided in the first wall 901 of the first frame 211. The flexible printed circuit board 49 may be positioned through a second opening 2502 provided in the second wall 902 of the second frame 221. A seal member (or waterproof member) 2710 may be disposed in the first opening 2501 through which the flexible printed circuit board 49 passes, thereby reducing or preventing moisture from flowing into the first space 1001 (or the first waterproof area 1201 in FIG. 11) through the first opening 2501. The seal member 2710 (e.g., a fifth waterproof member) positioned in the first opening 2501 is able to improve airtightness for the first waterproof area 1201. A seal member (e.g., a sixth waterproof member) (not illustrated) may be disposed in the second opening 2502 through which the flexible printed circuit board 49 passes, thereby reducing or preventing moisture from flowing into the second space 1101 (or the second waterproof area 1202 in FIG. 11) through the second opening 2502. The seal member positioned in the second opening 2502 is able to improve airtightness for the second waterproof area 1202.

According to an embodiment, the seal member 2710 may be provided as a flexible member (or elastic member) such as rubber which surrounds the first portion 2701 positioned corresponding to the first opening 2501 of the flexible printed circuit board 49. The seal member 2710 may be elastically disposed in the first opening 2501. In some embodiments, the first portion 2701 may be provided to be substantially rigid.

According to an embodiment, the seal member may be provided as a flexible member (or elastic member) such as rubber which surrounds the second portion (not illustrated) positioned corresponding to the second opening 2502 of the flexible printed circuit board 49. The seal member may be elastically disposed in the second opening 2502. In some embodiments, the second portion may be implemented to be substantially rigid.

FIGS. 28A to 28D illustrates views of a display assembly 50 in the open state of the slidable electronic device 2 according to an embodiment of the disclosure (see FIGS. 3A to 3F).

Referring to FIGS. 28A to 28D, the display assembly 50 may include a flexible display module 24, a display circuit part 2404, and/or a display support structure 2420.

According to an embodiment, the display circuit part 2404 may include a third area ⓒ, a display driving circuit 2401, a flexible printed circuit board 2402, and/or a touch sensor IC 2403. The third area ⓒ may extend from the first area ⓐ of the flexible display module 24. The third area ⓒ may include a first portion 2851 disposed on the rear surface 24a of the flexible display module 24, and a second part 2852 between the first portion 2851 and the first area ⓐ. The second portion 2852 may be a portion bent in one side of the third area ⓒ of the flexible display module such that the first portion 2851 can be disposed on the rear surface 24a of the flexible display module 24. The display driving circuit 2401 (e.g., a DDI) is disposed in the third area ⓒ. The flexible printed circuit board 2402 may electrically interconnect the third region ⓒ and the first printed circuit board 45 (see FIG. 5). The flexible printed circuit board 2402 may include a third portion 2853 disposed on the rear surface 24*a* of the flexible display module 24, and a fourth portion 2854 connected to the third portion 2853 or extending from the third portion 2853. The third portion 2853 may be electrically connected to the third area ⓒ, and the fourth portion 2854 may include a connector 2854*a* for electrical connection to the first printed circuit board 45. The fourth portion 2854 passes through an opening (not illustrated) provided in the first support portion 2111 (see FIG. 5) of the first frame 211 to be electrically connected to the first printed circuit board 45 positioned in the first partial waterproof area 1301 (see FIG. 13). The touch sensor IC 2403 may be disposed on the flexible circuit board 2402. At least a portion of the display circuit part 2404 positioned between the first support portion 2111 of the first frame 211 (see FIG. 5) and the flexible display module 24 may be positioned in the second partial waterproof area 1302.

According to an embodiment, the first portion 2851 of the third area ⓒ may be connected to the flexible printed circuit board 2402 through anisotropic conductive film (ACF) bonding. The ACF may be an anisotropic conductive film made by mixing fine conductive particles (e.g., Ni, carbon, or solder balls) with an adhesive resin (or bonding resin) (e.g., a thermosetting resin) to create a film state such that electricity is conducted in only one direction. When the ACF is placed between the flexible printed circuit board 2402 and the third area ⓒ and pressed by applying heat and pressure, a conductive pattern (not illustrated) formed in the third area ⓒ may be electrically connected to a conductive pattern formed on the flexible printed circuit board 2402, and the adhesive resin (or bonding resin) may bond the third area ⓒ to the flexible printed circuit board 2402. The electrical paths included in the third area ⓒ may electrically interconnect at least one TFT and the flexible printed circuit board 2402. For example, the electrical paths may be provided by a TFT film 241*b* (see FIGS. 4A and 4B) based on LTPS, LTPO, or a-Si, together with the TFT.

According to an embodiment, an ACF bonding area 2856 interconnecting the third area ⓒ and the flexible printed circuit board 2402 may be positioned inside the second partial waterproof area 1302 (or the third waterproof member 93 in FIG. 9) when viewed from above the front surface of the slidable electronic device 2 (e.g., when viewed in the −z-axis direction).

According to an embodiment, the display assembly 50 may include a light transmission area 2855 provided at a position aligned with a first camera module 304 (e.g., a front camera module). The light transmission area 2855 may overlap the third area ⓒ when viewed from above the front surface of the slidable electronic device 2 (e.g., when viewed in the −z-axis direction). The light transmission area 2855 may be positioned inside the second partial waterproof area 1302 (or the third waterproof member 93 in FIG. 9) when viewed from above the front surface of the slidable electronic device 2.

According to an embodiment, the second area ⓑ of the flexible display module 24 may include a first edge area (or first border area) 611 and a second edge area (or second border area) 612. The first edge area 611 may be positioned corresponding to one side portion of the display support structure 2420 positioned on the first guide rail 41 (see FIGS. 4A, 4B and 5). The second edge area 612 may be positioned corresponding to the other side portion of the display support structure 2420 positioned on the second guide rail 42 (see FIGS. 4A, 4B and 5). The adhesive material (or bonding material) between the multiple layers included in the flexible display module 24 may have a modulus to ensure the bending characteristic of the flexible display module 24. Due to the fatigue caused by stress in the flexible display module 24 from the repetitive sliding operation of the slidable electronic device 2, and the decrease in adhesive strength (or bonding strength) of the adhesive material (or bonding material) (e.g., OCA or pressure-sensitive adhesive (PSA)) due to moisture permeation, at least two of the multiple layers of the flexible display module 24 may delaminate in the first edge area 611 and/or the second edge area 612. In an embodiment, a seal member (or waterproof member) 2840 may be disposed (e.g., coated) on the first edge area 611 and the second edge area 612. The seal member 2840 may be liquid as a liquid waterproof member. The seal member 2840 may reduce or prevent delamination in the first edge area 611 and the second edge area 612. The seal member 2840 may include, for example, a water-repellent material which is capable of reducing, preventing, or delaying moisture permeation into the adhesive material (or bonding material) between the multiple layers of the flexible display module 24. The seal member 2840 may include a reinforcing material which is capable of reducing or preventing delamination in the first edge area 611 and the second edge area 612.

According to an embodiment of the disclosure, a slidable electronic device may include a flexible display module. The slidable electronic device may include a first housing including a first frame on which a first area of the flexible display module is disposed, and a first cover coupled to the first frame. The slidable electronic device may include a second housing which is slidable relative to the first frame. The second housing may include a second frame supporting a second area of the flexible display module, and a second cover coupled to the second frame. The slidable electronic device may include a sliding driver connected to the first frame and the second frame. The sliding driver may include a motor configured to provide a driving force for sliding. The slidable electronic device may include a first waterproof member disposed between the first frame and the first cover. The slidable electronic device may include a second waterproof member disposed between the second frame and the second cover. Here, a first housing includes a first cover which faces and is coupled to the first frame, a second housing includes a second frame slidable relative to the first frame and a second cover which faces and is coupled to the second frame, a flexible display module including a first area on the first frame and slidable together with the first housing relative to the second housing, and a second area slidable along the second frame and slidable together with the first area.

According to an embodiment of the disclosure, the slidable electronic device may include a third waterproof member disposed between the first area and the first frame. The slidable electronic device may further include a display driving circuit positioned between the first area and the first frame. The display driving circuit may be positioned in a space surrounded by the first area, the first frame, and the third waterproof member. Here, the first area, the first frame and the third waterproof member together surround a first space, and a display driving circuit is in the first space which is surrounded by the first area, the first frame and the third waterproof member.

According to an embodiment of the disclosure, the space surrounded by the first frame, the first cover, and the first waterproof member may be connected to the space surrounded by the first area, the first frame, and the third waterproof member through at least one opening included in the first frame. Here, the first frame, the first cover and the first waterproof member together surround a second space, and the second space is connected to the first space through an opening defined in the first frame.

According to an embodiment of the disclosure, the flexible display module may include a third area extending to the first area and disposed between the first area and the first frame. The slidable electronic device may further include a flexible printed circuit board electrically connected to the third area and positioned through the opening included in the first frame. The display driving circuit may be disposed in the third area. A portion of the third area and a portion of the flexible printed circuit board may be positioned in the space surrounded by the first area, the first frame, and the third waterproof member. Here, the flexible display module includes a third area, the first area and the second area in order, the third area being between the first area and the first frame, a flexible printed circuit board is electrically connected to the flexible display module at the third area, the flexible printed circuit board extended through the opening which is defined in the first frame, the display driving circuit corresponds to the third area of the flexible display module, and a portion of the third area and a portion of the flexible printed circuit board is in the first space which is surrounded by the first area, the first frame and the third waterproof member.

According to an embodiment of the disclosure, an ACF bonding area where the third area and the flexible printed circuit board are electrically connected may be positioned in the space surrounded by the first area, the first frame, and the third waterproof member. Here, an anisotropic conductive film bonding area is defined where the third area and the flexible printed circuit board are electrically connected to each other, and the anisotropic conductive film bonding area is in the first space which is surrounded by the first area, the first frame and the third waterproof member.

According to an embodiment of the disclosure, the slidable electronic device may further include a third housing which accommodates the second housing. The third housing may be coupled with the second housing.

According to an embodiment of the disclosure, the third housing may include a third frame and a third cover coupled to the third frame. The slidable electronic device may further include a fourth waterproof member disposed between the third frame and the third cover.

According to an embodiment of the disclosure, the slidable electronic device may further include a printed circuit board positioned in the space surrounded by the third frame, the third cover, and the fourth waterproof member. Here, the third frame, the third cover and the fourth waterproof member together surrounding a third space, and a printed circuit board or an antenna structure is in the third space.

According to an embodiment of the disclosure, the slidable electronic device may further include an antenna structure positioned in the space surrounded by the third frame, the third cover, and the fourth waterproof member.

According to an embodiment of the disclosure, the sliding driver may include a motor assembly disposed on the second frame and including a motor. The sliding driver may include a circular gear connected to the motor. The sliding driver may include a linear gear disposed on the first frame. The linear gear may be engaged with the circular gear.

According to an embodiment of the disclosure, the second frame may include a partition positioned between the motor assembly and the circular gear. The rotation shaft interconnecting the motor assembly and the circular gear may be positioned through an opening provided in the partition. The motor assembly may be positioned in the space surrounded by the second frame, the second cover, and the second waterproof member. Here, a rotation shaft interconnects the motor assembly and the circular gear and extends through an opening defined in the partition, and the motor assembly is in the fourth space.

According to an embodiment of the disclosure, the slidable electronic device may further include a flexible member or an adhesive member positioned between the motor assembly and the partition.

According to an embodiment of the disclosure, the motor assembly may include a motor and a gear structure including at least one gear connected to the motor. The gear structure may be positioned between the motor and the partition and may be connected to the circular gear via the rotation shaft.

According to an embodiment of the disclosure, the motor assembly may include a motor and a gear structure including at least one gear connected to the motor. The gear structure may be positioned between the motor and the circular gear. The second frame may include a partition positioned between the motor and the gear structure. The rotation shaft interconnecting the gear structure and the circular gear may be positioned through the opening provided in the partition. The motor may be positioned in the space surrounded by the second frame, the second cover, and the second waterproof member.

According to an embodiment of the disclosure, the slidable electronic device may further include a flexible member, an adhesive member, or a bonding member positioned between the gear structure and the partition.

According to an embodiment of the disclosure, the slidable electronic device may further include a battery positioned in the space surrounded by the second frame, the second cover, and the second waterproof member.

According to an embodiment of the disclosure, the slidable electronic device may further include a first element positioned in the first space surrounded by the first frame, the first cover, and the first waterproof member. The first element may vary, for example, as the first printed circuit board 45 positioned in the first partial waterproof area 1301 in FIG. 13, the display circuit part 2404 positioned in the second partial waterproof area 1302 in FIG. 13, or the antenna radiator positioned in the third partial waterproof area 1303 in FIG. 13.

The slidable electronic device may further include a second element positioned in the second space surrounded by the second frame, the second cover, and the second waterproof member. The second element may vary, for example, as the battery 44 in FIG. 5 or the motor assembly 431 in FIG. 19. The slidable electronic device may further include a flexible printed circuit board which electrically interconnects the first element and the second element. The flexible printed circuit board may be positioned through a first opening provided in the first frame and a second opening provided in the second frame. The slidable electronic device may further include a fifth waterproof member positioned in the first opening and a sixth waterproof member positioned in the second opening.

That is, a first opening is defined in the first frame, a second opening is defined in the second frame, a first electrical component is in a first space surrounded by the first frame, the first cover and the first waterproof member, a second electrical component is in a second space surrounded by the second frame, the second cover and the second waterproof member, a flexible printed circuit board extends through the first opening and the second opening to electrically interconnect the first element to the second element, a fifth waterproof member is in the first opening, and a sixth waterproof member is in the second opening According to an embodiment of the disclosure, the slidable electronic device may further include multiple bars disposed on the rear surface of the flexible display module. The slidable electronic device may further include a first guide rail on which one side portions of the multiple bars are positioned and which is coupled to the second frame. The slidable electronic device may further include a second guide rail on which the other side portions of the multiple bars are positioned and which is coupled to the second frame.

According to an embodiment of the disclosure, the flexible display module may include a first edge area positioned on the first guide rail side, and a second edge area positioned on the second guide rail side. The slidable electronic device may further include a liquid waterproof member disposed in the first edge area and the second edge area.

That is, a multi-bar assembly is on a rear surface of the flexible display module, a first guide rail is coupled to the second frame and along which side portions of the multi-bar assembly slide, and a second guide rail is coupled to the second frame and along which other side portions of the multi-bar assembly which are opposite to the side portions slide, the flexible display module includes a first edge area corresponding to the first guide rail and a second edge area corresponding to the second guide rail. A liquid waterproof member is on the first edge area and on the second edge area.

In an embodiment, an exposed area of the second area is expandable and contractable by sliding of the first housing relative to the second housing along a sliding direction.

In an embodiment, the first waterproof member may be disconnected from the second waterproof member and slidable together with the first housing relative to the second waterproof member. The third waterproof member may be disconnected from the second waterproof member and slidable together with the first housing relative to the second waterproof member.

According to an embodiment, an electronic device includes a first housing including a first frame and a first cover which is coupled to a rear of the first frame, a second housing including a second frame and a second cover which is coupled to a rear of the second frame, a display module coupled to the first housing and slidable together with the first housing relative to the second housing, a first waterproof space which is defined between the display module and the first cover and in which circuit parts are disposed, and a second waterproof space which is defined between the second cover and the second frame and in which a circuit part is disposed.

Here, the first waterproof space may include waterproof sub-spaces including a first partial waterproof space which is defined between the first frame and an internal support member (e.g., support member 48) adjacent to the first cover and in which a first circuit part among the circuit parts is disposed, a second partial waterproof space which is defined between a front of the first frame and the display module, and a third partial waterproof space which is defined between the internal support member and the first cover. Each of the waterproof sub-spaces is slidable relative to the second waterproof space.

The electronic device may further include a third housing coupled to the second housing, the third housing including a third frame and a third cover which is coupled to a rear of the third frame, and a third waterproof space which is defined between the third frame and the third cover, Here, the third waterproof space may be slidable together with the first waterproof space relative to the second waterproof space.

The display module of the electronic device may include a display screen which is expandable and contractable by sliding of the first housing relative to the second housing along a sliding direction, and expansion or contraction of the display screen slides the first waterproof space together with the second waterproof space.

According to an embodiment of the disclosure, a slidable electronic device may include a flexible display module. The slidable electronic device may include a first housing including a first frame on which a first area of the flexible display module is disposed, and a first cover coupled to the first frame. The slidable electronic device may include a second housing which is slidable relative to the first frame. The second housing may include a second frame supporting a second area of the flexible display module, and a second cover coupled to the second frame. The slidable electronic device may include a third housing which accommodates the second housing. The third housing may include a third frame coupled to the second housing and a third cover coupled to the third frame. The slidable electronic device may include a sliding driver connected to the first frame and the second frame. The sliding driver may provide a driving force for sliding. The slidable electronic device may include a first waterproof member disposed between the first frame and the first cover. The slidable electronic device may include a second waterproof member disposed between the second frame and the second cover. The slidable electronic device may include a third waterproof member disposed between the first area and the first frame. The slidable electronic device may include a fourth waterproof member disposed between the third frame and the third cover. The slidable electronic device may further include a first electrical element positioned in the first space surrounded by the first frame, the first cover, and the first waterproof member. The slidable electronic device may further include a second electrical element positioned in the second space surrounded by the second frame, the second cover, and the second waterproof member. The slidable electronic device may further include a third electrical element positioned in the third space surrounded by the first area, the first frame, and the third waterproof member. The slidable electronic device may further include a fourth electrical element positioned in the fourth space surrounded by the third frame, the third cover, and the fourth waterproof member.

According to an embodiment of the disclosure, the sliding driver may include a motor assembly disposed on the second frame. The motor assembly may include a motor. The sliding driver may include a circular gear connected to the motor. The sliding driver may include a linear gear disposed on the first frame. The linear gear may be engaged with the circular gear. The second frame may include a partition positioned between the motor assembly and the circular gear. The rotation shaft interconnecting the motor assembly and the circular gear may be positioned through an opening included in the partition. The motor assembly may be positioned in the second space.

Embodiments disclosed in the disclosure and drawings are merely presented as examples to easily describe technical content and aid understanding of the disclosure, and are not intended to limit the scope of the disclosure. Accordingly, the scope of the various embodiments of the disclosure should be construed as including changes or modifications of the embodiments in addition to the embodiments disclosed herein. In addition, it will be appreciated that any embodiment(s) described herein may be used with any other embodiment(s) described herein.

What is claimed is:

1. An electronic device comprising:
a first housing comprising a first frame and a first cover which faces and is coupled to the first frame;
a second housing comprising a second frame slidable relative to the first frame and a second cover which faces and is coupled to the second frame;
a flexible display module comprising:
  a first area on the first frame and slidable together with the first housing relative to the second housing, and
  a second area slidable along the second frame and slidable together with the first area;
a first waterproof member between the first frame and the first cover;
a second waterproof member between the second frame and the second cover;
a third waterproof member between the first area of the flexible display module and the first frame of the first housing, wherein the first area, the first frame, and the third waterproof member together surround a first space; and
a display driving circuit disposed in the first space.

2. The electronic device of claim 1, wherein
the first frame, the first cover and the first waterproof member together surround a second space, and
the second space which is surrounded by the first frame, the first cover and the first waterproof member is connected to the first space which is surrounded by the first area, the first frame and the third waterproof member through an opening defined in the first frame.

3. The electronic device of claim 2, further comprising:
the flexible display module further comprising a third area, the first area and the second area in order, the third area being between the first area and the first frame,
a flexible printed circuit board electrically connected to the flexible display module at the third area, the flexible printed circuit board extended through the opening which is defined in the first frame,
the display driving circuit corresponding to the third area of the flexible display module, and
a portion of the third area and a portion of the flexible printed circuit board in the first space which is surrounded by the first area, the first frame and the third waterproof member.

4. The electronic device of claim 3, wherein
an anisotropic conductive film bonding area is defined where the third area and the flexible printed circuit board are electrically connected to each other, and
the anisotropic conductive film bonding area is in the first space which is surrounded by the first area, the first frame and the third waterproof member.

5. The electronic device of claim 1, further comprising:
a third housing coupled to the second housing, the third housing comprising a third frame and a third cover which is coupled to the third frame; and
a fourth waterproof member between the third frame and the third cover.

6. The electronic device of claim 5, further comprising:
the third frame, the third cover and the fourth waterproof member together surrounding a third space, and
a printed circuit board or an antenna structure in the third space which is surrounded by the third frame, the third cover and the fourth waterproof member.

7. The electronic device of claim 1, further comprising a sliding driver connected to the first frame and the second frame, wherein the sliding driver comprises:
a motor configured to provide a driving force for sliding of the first housing relative to the second housing,
a motor assembly on the second frame and comprising the motor;
a circular gear connected to the motor; and
a linear gear on the first frame and engaged with the circular gear.

8. The electronic device of claim 7, wherein
the second frame, the second cover, and the second waterproof member together surround a fourth space,
the second frame comprises a partition between the motor assembly and the circular gear,
a rotation shaft interconnects the motor assembly and the circular gear and extends through an opening defined in the partition, and
the motor assembly is in the fourth space which is surrounded by the second frame, the second cover and the second waterproof member.

9. The electronic device of claim 8, further comprising:
a flexible member or an adhesive member between the motor assembly and the partition.

10. The electronic device of claim 7, wherein
the second frame, the second cover and the second waterproof member together surround a fourth space,
the motor assembly comprises a motor and a gear which is connected to the motor,
the gear is between the motor and the circular gear,
the second frame comprises a partition which is between the motor and the gear,
a rotation shaft interconnects the gear and the circular gear and extends through an opening which is defined in the partition, and
the motor is in the fourth space which is surrounded by the second frame, the second cover and the second waterproof member.

11. The electronic device of claim 10, further comprising:
a flexible member, an adhesive member or a bonding member between the gear and the partition.

12. The electronic device of claim 1, further comprising:
the second frame, the second cover and the second waterproof member together surrounding a fourth space, and
a battery in the fourth space which is surrounded by the second frame, the second cover and the second waterproof member.

13. The electronic device of claim 1, further comprising:
a first opening defined in the first frame;
a second opening defined in the second frame;
a first electrical component in a space surrounded by the first frame, the first cover and the first waterproof member;
a second electrical component in a space surrounded by the second frame, the second cover and the second waterproof member;
a flexible printed circuit board which extends through the first opening and the second opening to electrically interconnect the first element to the second element;
a fifth waterproof member in the first opening; and
a sixth waterproof member in the second opening.

14. The electronic device of claim 1, further comprising:
a multi-bar assembly on a rear surface of the flexible display module;

a first guide rail which is coupled to the second frame and along which side portions of the multi-bar assembly slide; and a second guide rail which is coupled to the second frame and along which other side portions of the multi-bar assembly which are opposite to the side portions slide, the flexible display module comprising a first edge area corresponding to the first guide rail and a second edge area corresponding to the second guide rail, and wherein a liquid waterproof member is on the first edge area and on the second edge area.

15. The electronic device of claim 1, wherein an exposed area of the second area is expandable and contractable by sliding of the first housing relative to the second housing along a sliding direction.

16. The electronic device of claim 1, wherein the first waterproof member is disconnected from the second waterproof member and slidable together with the first housing relative to the second waterproof member.

17. The electronic device of claim 1, wherein the third waterproof member is disconnected from the second waterproof member and slidable together with the first housing relative to the second waterproof member.

18. An electronic device comprising:

a first housing comprising a first frame and a first cover which is coupled to a rear of the first frame;

a second housing comprising a second frame and a second cover which is coupled to a rear of the second frame;

a display module coupled to the first housing and slidable together with the first housing relative to the second housing;

a first waterproof space which is defined between the display module and the first cover and in which circuit parts are disposed; and a second waterproof space which is defined between the second cover and the second frame and in which a circuit part is disposed, wherein the first waterproof space comprises a plurality of waterproof sub-spaces including:

a first partial waterproof space defined between the first frame and an internal support member adjacent to the first cover, a second partial waterproof space defined between a front of the first frame and the display module, and a third partial waterproof space defined between the internal support member and the first cover, wherein each of the waterproof sub-spaces is slidable relative to the second waterproof space, and wherein a display driving circuit, which is one of the circuit parts, is disposed in the second partial waterproof space.

19. The electronic device of claim 18, further comprising:

a third housing coupled to the second housing, the third housing comprising a third frame and a third cover which is coupled to a rear of the third frame; and a third waterproof space which is defined between the third frame and the third cover, wherein the third waterproof space is slidable together with the first waterproof space relative to the second waterproof space.

20. The electronic device of claim 18, wherein the display module comprises a display screen which is expandable and contractable by sliding of the first housing relative to the second housing along a sliding direction; and expansion or contraction of the display screen slides the first waterproof space together with the second waterproof space.

*   *   *   *   *